US 8,224,861 B2

(12) United States Patent
Shinjo et al.

(10) Patent No.: US 8,224,861 B2
(45) Date of Patent: Jul. 17, 2012

(54) COUPLED NODE TREE SPLITTING/CONJOINING METHOD AND PROGRAM

(75) Inventors: Toshio Shinjo, Chiba (JP); Mitsuhiro Kokubun, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 133 days.

(21) Appl. No.: 12/453,907

(22) Filed: May 27, 2009

(65) Prior Publication Data
US 2009/0234802 A1 Sep. 17, 2009

Related U.S. Application Data

(63) Continuation of application No. PCT/JP2007/001142, filed on Oct. 19, 2007.

(30) Foreign Application Priority Data

Nov. 28, 2006 (JP) ................................ 2006-319407
Jun. 27, 2007 (JP) ................................ 2007-169459

(51) Int. Cl.
*G06F 17/30* (2006.01)
(52) U.S. Cl. ....................................................... 707/796
(58) Field of Classification Search ........................ None
See application file for complete search history.

(56) References Cited

U.S. PATENT DOCUMENTS

| | | | | |
|---|---|---|---|---|
| 5,261,088 A * | 11/1993 | Baird et al. | ............................. | 1/1 |
| 6,175,835 B1 * | 1/2001 | Shadmon | ............................. | 707/696 |
| 6,292,795 B1 * | 9/2001 | Peters et al. | ............................. | 1/1 |
| 6,438,562 B1 * | 8/2002 | Gupta et al. | ................... | 707/696 |
| 6,675,163 B1 * | 1/2004 | Bass et al. | ............................. | 1/1 |
| 6,859,455 B1 * | 2/2005 | Yazdani et al. | ............... | 370/392 |
| 6,862,599 B2 * | 3/2005 | King | ..................... | 1/1 |
| 7,574,411 B2 * | 8/2009 | Suontausta et al. | ............. | 706/27 |
| 2003/0204513 A1 * | 10/2003 | Bumbulis | ...................... | 707/100 |
| 2008/0114787 A1 * | 5/2008 | Kashiyama et al. | ........... | 707/100 |

FOREIGN PATENT DOCUMENTS

| | | |
|---|---|---|
| JP | H07-210569 A | 8/1995 |
| JP | 2001-202277 A | 7/2001 |
| JP | 2001-357070 A | 12/2001 |
| JP | 2003-224581 A | 8/2003 |
| JP | 2006-293619 A | 10/2006 |
| JP | 2008-015872 A | 1/2008 |

(Continued)

OTHER PUBLICATIONS

Daichi Goto, "*Sawatte Manabu Data Kozo, Tsukatte Mini Tsuku Algorithm Kochira Java API Kenkyusho!*" Java Press, vol. 34, pp. 202-210 (Feb. 15, 2004).

(Continued)

*Primary Examiner* — Bai D. Vu
(74) *Attorney, Agent, or Firm* — Rader, Fishman & Grauer PLLC

(57) ABSTRACT

The minimum value or the maximum value of the index keys of a coupled node tree of a processing source is determined, and the index keys are successively deleted until the index key that is to be the splitting point is reached, the deleted index keys being inserted into the coupled node tree of the processing target, thereby splitting the coupled node tree. Deletion processing is done of one coupled node tree, taking as the processing source in the above-noted splitting method, and insertion processing is done of the other, taken as the processing target, thereby conjoining the coupled node trees.

17 Claims, 42 Drawing Sheets

FOREIGN PATENT DOCUMENTS

| JP | 2008-112240 A | 5/2008 |
| WO | WO 2008/004335 A1 | 1/2008 |
| WO | WO 2008/053583 A1 | 5/2008 |

OTHER PUBLICATIONS

Shigeaki Yazaki, "*Zu De Wakaru! Programming No. 10 Dai Kisochishiki Data Kozo*," Nikkei Software, vol. 6, No. 2, pp. 44-45 (Jan. 24, 2003).

R. Sedgewich, Algorithm, vol. 1, 1st edition, Kindai Kagaku Sha Co., Ltd. pp. 49-54 (Oct. 10, 1990).

"*Patorishia Tsuri (Patricia Tree)*", vol. 11, No. 2, pp. 337-339, Journal of Japanese Society for Artificial Intelligence (Mar. 1, 1996).

Akira Nakamori, "*Memori no Gainen wo Rikai suru (Understanding Memory Concept)*," vol. 32, No. 2, pp. 44-53, Interface (Feb. 2, 2006) (In particular, the portion of the article entitled "Hairetsu o Shitei suruto Memory Ryoiki o Kakuho suru," pp. 49-50 of the same.).

Alfred V. Aho et al., "*Arugorizumu no Sekkei to Kaiseki I (The Design and Analysis of Computer Algorithms I), First Edition*", pp. 132-136, Saiensu-Sha Co. Ltd., Japan (Oct. 30, 1977).

English translation of Office Action issued by Japan Patent Office in connection with Application No. 2006-293619.

International Search Report (Aug. 14, 2007) for PCT/JP/2007/000639.

International Search Report (Jan. 8, 2008) for PCT/JP2007/001120.

International Search Report (Jan. 8, 2008) for PCT/JP2007/001142.

Communication from European Patent Office for application No. 07827921.3 dated Mar. 16, 2010.

P. Bumbulis et al., "A Compact B-tree", Proceedings of the 2002 ACM Sigmod International Conference on Management of Data, Online Jun. 3-6, 2002, pp. 533-541.

Jung M., et al., "A Dynamic Construction Algorithm for the Compact Patricia trie using the Hierarchical Structure", Information Processing & Management, Elsevier, Barking, GB, vol. 38, No. 2, Mar. 1, 2002, pp. 221-236.

Nilsson et al., "IP-Address Lookup Using LC-Tries", IEEE Journal on Selected Areas in Communications, vol. 17, No. 6, Jun. 1999, pp. 1083-1092.

Li, et al., "Stateful Inspection Firewall Session Table Processing", School of Computer Science and Technology, Harbin Institute of Technology, International Journal of Information Technology, vol. 11, No. 2, pp. 21-30 (2005).

\* cited by examiner (a) PROCESSING SOURCE (b) PROCESSING TARGET (a) PROCESSING SOURCE (b) PROCESSING TARGET

COUPLED NODE TREE SPLITTING/CONJOINING METHOD AND PROGRAM

CROSS-REFERENCE TO RELATED APPLICATION

This application is a continuation of PCT/JP2007/001142 filed on Oct. 19, 2007, and is based and claims the benefit of priority of the prior Japanese Patent Application Nos. 2006-319407 and 2007-169459, filed on Nov. 28, 2006 and Jun. 27, 2007 respectively, the entire contents of which are incorporated herein by reference. The contents of PCT/JP2007/001142 are incorporated herein by reference in their entity.

BACKGROUND OF THE INVENTION

1. Field of the Invention

The present invention relates to a searching method for searching for a desired bit string from a set of bit strings using a tree-type data structure in which bit strings are stored, and more particularly to a coupled node tree splitting/conjoining method and program proposed by the applicant in Japanese Patent Application 2006-187827.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database.

In order to perform the above-noted searching for bit strings at high speed, conventional art makes various refinements on the data structure in which bit strings are stored. One of these is a tree structure known as a Patricia tree.

FIG. 1 describes an example of a Patricia tree used for searching processing in the above-noted conventional art. A node of a Patricia tree is formed to include an index key, a test bit position for a search key, and right and left link pointers. Although it is not explicitly described, a node of course includes information for the purpose of accessing a record corresponding to the index key.

In the example described in FIG. 1, the node 1750*a* that holds the index key "100010" is a root node, the test bit position 1730*a* of which is 0. The node 1750*b* is connected to the left link 1740*a* of the node 1750*a*, and the node 1750*f* is connected to the right link 1741*a* of the node 1750*a*.

The index key held by the node 1750*b* is "010011," and the test bit position 1730*b* is 1. The node 1750*c* is connected to the left link 1740*b* of the node 1750*b*, and the node 1750*d* is connected to the right link 1741*b* of the node 1750*b*. The index key held by the node 1750*c* is "000111," and the test bit position is 3. The index key held by the node 1750*d* is "011010," and the test bit position is 2.

The parts connected to the node 1750*c* by a solid lines show the right and left link pointers of the node 1750*c*, and the left pointer 1740*c* that is not connected by the dotted line indicates that that field is blank. The dotted line connection destination of the right pointer 1741*c* that is connected by a dotted line expresses the address indicated by the pointer, and in this case this indicates that the right pointer points to the node 1750*c*.

The right pointer 1741*d* of the node 1750*d* points to the node 1750*d* itself, and the node 1750*e* is connected to the left link 1740*d*. The index key held by 1750*e* is "010010," and the test bit position is 5. The left pointer 1740*e* of the node 1750*e* points to the node 1750*b*, and the right pointer 1741*e* of the node 1750*e* points to the node 1750*e*.

The index key held by the node 1750*f* is "101011," and the test bit position 1730*f* is 2. The node 1750*g* is connected to the left link 1740*f* of the node 1750*f* and the node 1750*h* is connected to the right link 1741*f* of the node 1750*f*.

The index key held by the node 1750*g* is "100011," and the test bit position 1730*g* is 5. The left pointer 1740*g* of the node 1750*g* points to the node 1750*a*, and the right pointer 1741*g* of the node 1750*g* points to the node 1750*g*.

The index key held by the node 1750*h* is "101100," and the test bit position 1730*h* is 3. The left pointer 1740*h* of the node 1750*h* points to the node 1750*f*, and the right pointer 1741*h* of the node 1750*h* points to the node 1750*h*.

In the example of FIG. 1, the configuration is such that, as the tree is traversed downward from the root node 1750*a* the test bit position of successive nodes increases.

When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links described by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

Art such as disclosed in Japanese Laid-Open Patent Application Publication 2001-357070 exists as an attempt to solve these problems of the Patricia tree. In the Patricia tree described in Japanese Laid-Open Patent Application Publication 2001-357070, in addition to reducing the storage capacity for pointers by storing in the downstream left and right nodes in contiguous regions, the back link decision processing is reduced by providing a bit at each node that indicates whether the next link is or is not a back link.

Even in the art disclosed in Japanese Laid-Open Patent Application Publication 2001-357070, however, because one node always occupies an index key region and a pointer region, and because there is one pointer by storing down string left and right nodes in contiguous regions, there is not that great an effect of reducing the storage capacity, for example, it being necessary to assign the same capacity to the left pointer 1740*c* and the right pointer 1741*h*, which are lowermost parts in FIG. 1. In addition, there is no improvement of the problem of delay in search processing caused by back links, and the difficulty of adding and deleting a node.

SUMMARY OF THE INVENTION

In order to solve the above-described problems with conventional searching methods of the past, the applicant, in Japanese Patent Application 2006-187827 proposed a coupled node tree that is a tree used for bit string searching formed by a root node and a node pair that is a branch node and a leaf node, or branch nodes, or leaf nodes disposed in adjacent memory storage areas, wherein the root node is a node that expresses a starting point of the tree and which is a leaf node when there is one node in the tree and a branch node when there are two or more nodes in the tree, the branch node including a discrimination bit position in a search key for performing bit string searching and position information indicating a position of one node of a node pair of a link target, and the leaf node including an index key that is a bit string that is the target of a search.

The above-noted patent application shows, among other things, basic searching methods using a coupled node tree, such as a method for generating a coupled node tree from a given set of index keys, and a basic method for searching for a single index key from a coupled node tree.

Searching for a bit string includes various requests, such as the determining of a minimum value or a maximum value, or determining values within a given range. Given this, the applicant, in Japanese Patent Application 2006-293619, proposed, among other things, a method for determining the minimum/maximum value of an index key included in an arbitrary subtree of a coupled node tree.

In recent years, accompanying advances in information processing technology, demands for information services have diversified and become more severe. While, configuring databases and extracting information from databases are basic to providing information services, the amount of information stored in databases is continuously increasing, resulting in huge sizes.

Although the searching method previously proposed by the applicant enables high-speed searching of databases that are continuously growing in size, as databases become very large, even though the corresponding coupled node trees can be smaller in capacity than tree structures of the past, they are still large. The storage capacities of various storage means each have their limits, and in order to configure a system economically, it is necessary to use a combination of storage means having various access speeds and storage capacities.

It is also possible to divide a database physically to implement a distributed system.

It is therefore necessary to be able to split and rejoin (conjoin) a single coupled node tree.

Accordingly, an object of the present invention is to provide a method for splitting a coupled node tree into two or conjoin two coupled node trees.

One aspect of the present invention provides a method for splitting a coupled node tree by specifying a split key that establishes the index key that serves as the splitting point, determining the minimum value or the maximum value of the index key in the processing source coupled node tree and successively deleting index keys until the index key just deleted becomes the splitting point, and inserting the deleted index keys into the processing target coupled node tree.

According to another aspect of the present invention, in the above-noted processing to successively determine the minimum value or maximum value of an index key of the processing source coupled node tree in the above-noted splitting method, the searching start node is set by the search path history when the minimum value or maximum value is determined.

Yet another aspect of the present invention provides a method for conjoining two coupled node trees by performing deletion processing of one of the coupled node trees as the processing source in the above-noted splitting method, and performing insertion processing of the other of the coupled node trees as the processing target.

Yet another aspect of the present invention provides a method for splitting a coupled node tree, by specifying a split key that establishes the index key the serves as the splitting point, determining the split node that is the root node of the largest subtree of the processing source subtrees having the split key as the maximum value or minimum value, generating a new processing target coupled node tree by inserting the split node tree that is the subtree having the split node as the root node, and deleting the split node tree from the above-noted processing source coupled node tree.

A further aspect of the present invention provides a method for conjoining two coupled node trees by determining the split/conjoin node tree that is a subtree split from the processing source coupled node tree and conjoined to the processing target coupled node tree based on the difference bit position between the maximum value or minimum value of the index key of the processing source coupled node tree and the minimum value or maximum value of the processing target coupled node tree, and conjoining the splitting/joining node tree to the processing target coupled node tree based on the difference bit position.

A further aspect of the present invention provides a program for execution by a computer of the method for splitting a coupled node tree or the method for conjoining coupled node trees as described above.

According to the present invention, it is possible to perform splitting and conjoining of coupled node trees with good efficiency, and to facilitate handling even if the size of the coupled node trees becomes large.

DESCRIPTION OF THE PREFERRED EMBODIMENTS

First the coupled node tree premised in this invention and proposed by this inventor previously in the above cited application is described using an example of storing a coupled node tree in an array. Although it is possible to use address information in a storage device as the data indicating the position of a link target held by a branch node, by using an array formed by array elements that can store the larger of the occupied storage capacity area between a branch node and a leaf node, it is possible to express the node position as an array element number, enabling a reduction of the amount of position information.

Figure 2A:
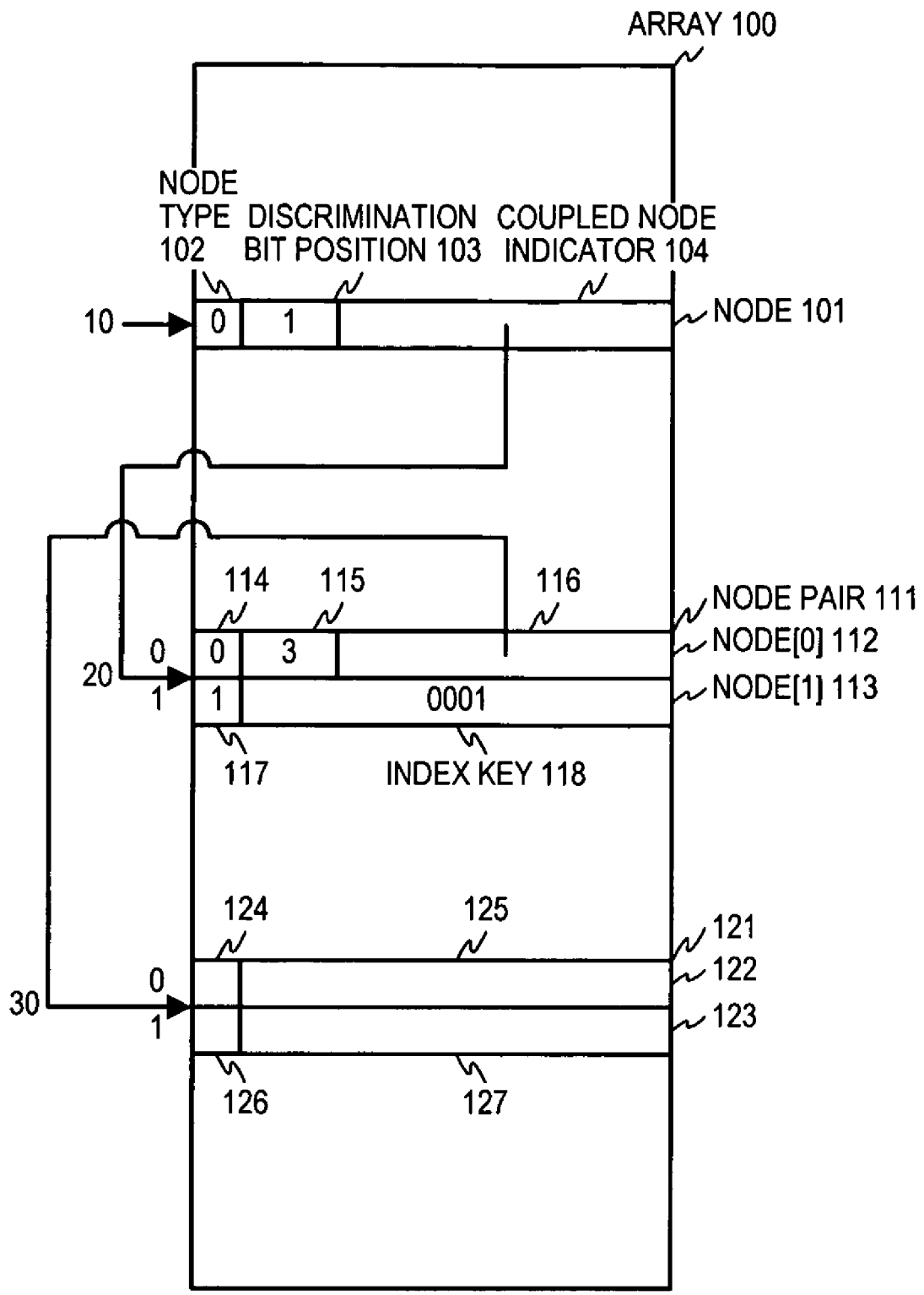
FIG. 2A is a drawing describing an exemplary configuration of a coupled node tree stored in an array.

FIG. 2A is a drawing that describes an exemplary configuration of a coupled node tree that is stored in an array.

Referring to FIG. 2, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0]112, which is the primary node of the node pair 111. The secondary node [1]113 forming a pair with the primary node is stored into the next, adjacent, array element (array element number 20+1). The value 0 is stored in the node type 114 of the node [0]112, the value 3 is stored in the discrimination bit position 115, and the value 30 is stored in the coupled node indicator 116. The value 1 is stored in the node type 117 of the node [1]113, thereby indicating that the node 1[113] is a leaf node. The value "0001" is stored in the index key 118. In the same manner as in a Patricia tree described above, although information for accessing a record corresponding to an index key is of course included in a leaf node, this is omitted from the notation.

Primary nodes are indicated as the node [0], and secondary nodes that are paired therewith are indicated as the node [1]. Also the node stored in an array element with some array element number is called the node of that array element number and the array element number stored in the array element of that node is also called the array element number of the node.

The contents of the node pair 121 formed by the node 122 and the node 123 that are stored in the array elements having array element numbers 30 and 31 are not shown.

The 0 or 1 that is appended to the node [0]112, the node [1]113, the node 122, and the node 123 indicates respectively to which node of the node pair linking is to be done when performing a search using a search key. Linking is done to the node having an array element number that is derived by adding the 0 or 1, which is the bit value of the search key at the discrimination bit position of the immediately previous branch node, to the coupled node indicator of the branch node.

Therefore, by adding the bit value of the discrimination bit position of the search key to the coupled node indicator of the immediately previous branch node, it is possible to determine the array element number of an array element storing a node at the link target.

Although in the above-noted example the smaller of the array element numbers at which the node pair is located is used as the coupled node indicator, it will be understood that it is also possible to use the larger of the array element numbers in the same manner.

Figure 1:
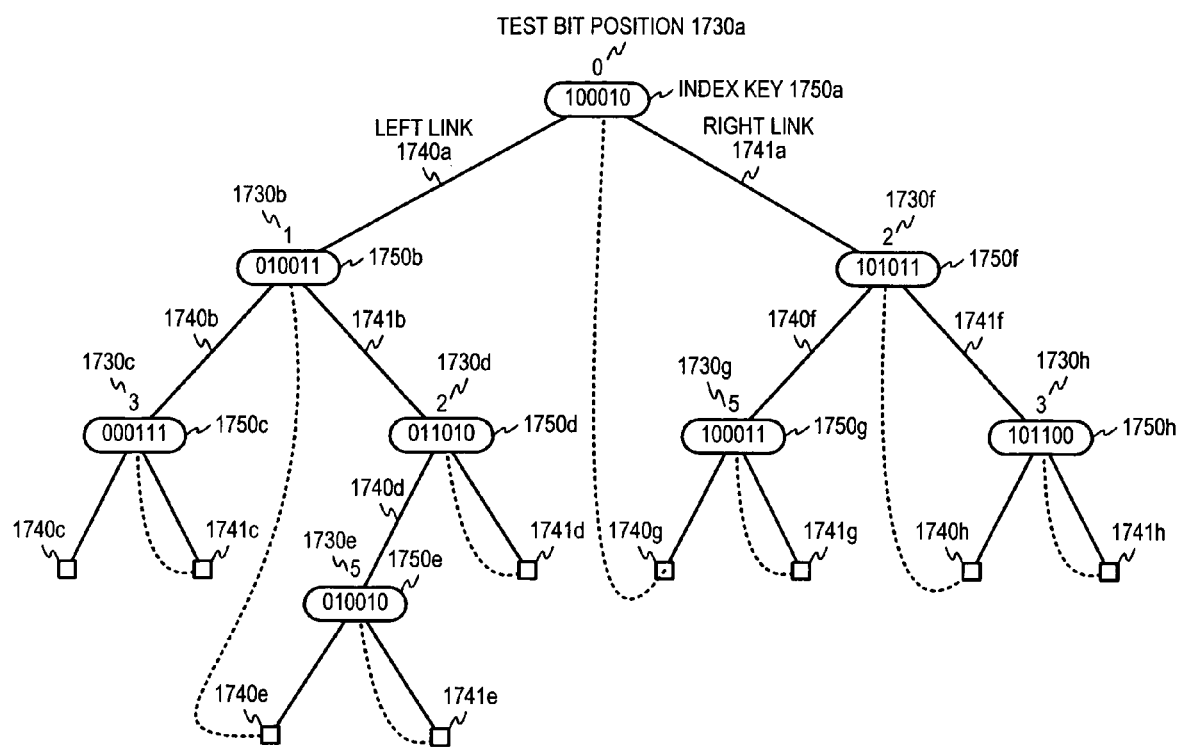
FIG. 1 is a drawing describing an example of a Patricia tree used in searching in the conventional art.
Figure 2B:
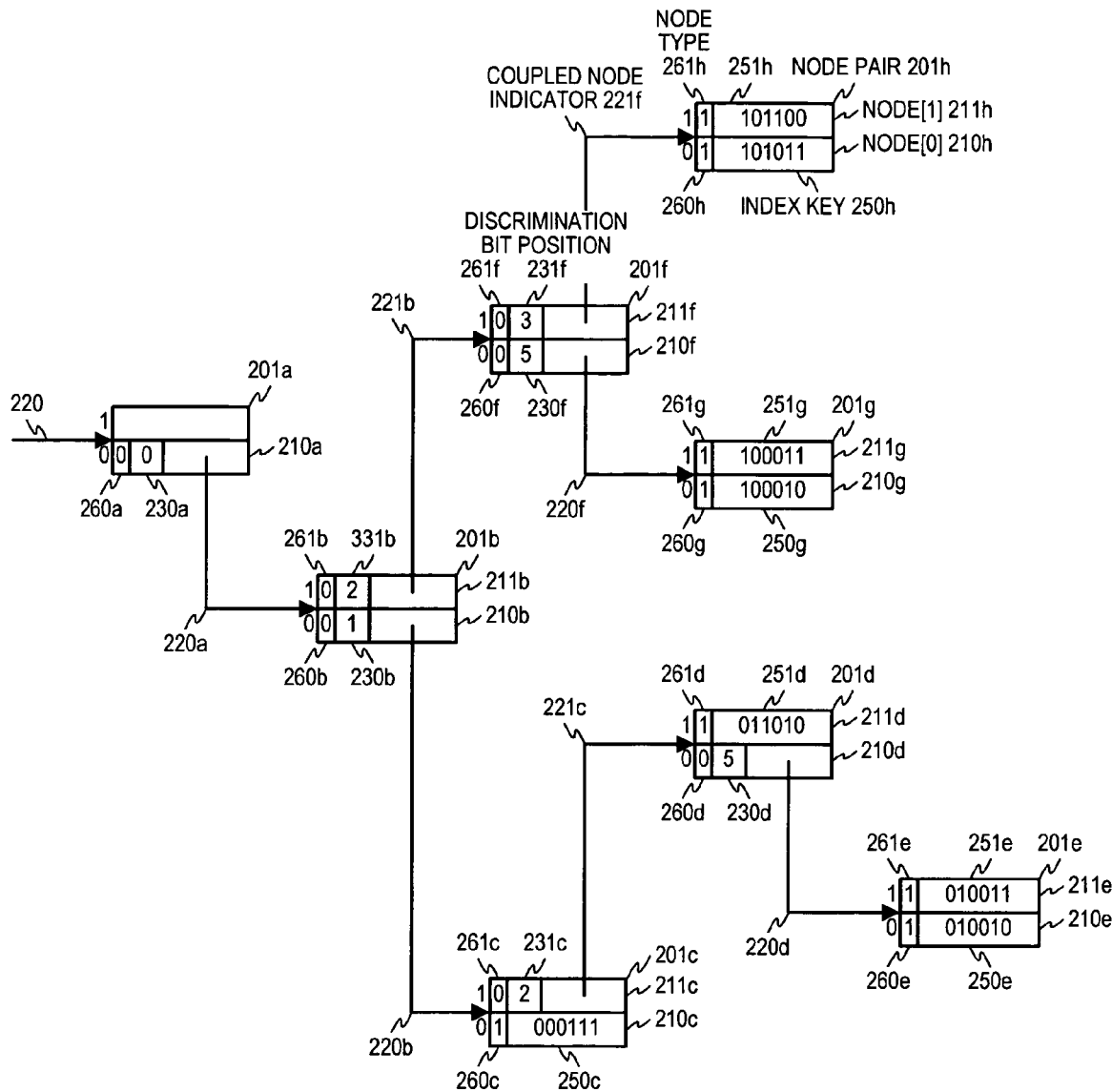
FIG. 2B is a drawing describing a tree structure of a coupled node tree.

FIG. 2B is a drawing that conceptually describes an embodiment of a tree structure of a coupled node tree. The 6-bit index key that is illustrated is the same that of the Patricia tree described as an example in FIG. 1.

The reference numeral 210a shows the root node. In the example described, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 2A. The tree is traversed in accordance with the bit values at discrimination bit positions of the search key, so that the leaf node of the search for item is found.

In the example described, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes an index key. "000111" is stored in the index key 250c. The node type 261c of the node 211c is 0, the discrimination bit position 231c of the node 211c is 2, and in the coupled node indicator is stored the array element number 221c of an array element in which is stored the primary node 210d of the node pair 201d.

The node type 260d of the node 210d is 0, the discrimination bit position 230d of the node 210d is 5, and in the coupled node indicator is stored the array element number 220d of an array element in which is stored the primary node 210e of the node 201e. The node type 261d of the node 211d that is paired with the node 210d is 1, and "011010" is stored in the index key 251d.

The node types 260e and 261e of the nodes 210e and 211e of the node pair 201e are both 1, indicating that both are leaf nodes. In the index keys 250e and 251e of each are stored "010010" and "010011" respectively as index keys.

The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the discrimination bit positions 230f and 231f of each are stored 5 and 3, respectively. The array element number 220f of the array element in which is stored the primary node 210g of the node pair 201g is stored in the coupled node indicator of the node 210f, and the array element number 221f of an array element in which is stored the node [0]210h, which is the primary node of the node pair 201h, is stored in the coupled node indicator of the node 211f.

The node types 260g and 261g of the nodes 210g and 211g of the node pair 201g are both 1, indicating that both are leaf nodes, and "100010" and "100011" are stored in the index keys 250g and 251g thereof, respectively.

In the same manner, the node types 260h and 261h of the node [0]210h of the node pair 201h, and the node [1]211h, which is paired therewith, are both 1, indicating that both are leaf nodes, and "101011" and "101100" are stored in the index keys 250h and 251h thereof, respectively.

The processing flow in searching for the index key "100010" from the above-noted tree is briefly described below. The discrimination bit positions are numbered 0, 1, 2, ... and so on from the left.

First, processing is started from the root node 201a using the bit string "100010" as the search key. Because the discrimination bit position 230a of the root node 210a is 0, examining the bit value of the discrimination bit position 0 reveals 1. This being the case, 1 is added to the array element number 220a stored in the coupled node indicator and linking is done to the node 211b stored in the resulting array element number. Because 2 is stored in the discrimination bit position 231b of the node 211b, examination of the bit value of the discrimination bit position 2 reveals 0, resulting in linking to the node 210f stored in the array element having the array element number 221b stored in the coupled node indicator.

Because 5 is stored in the discrimination bit position 230f of the node 210f, and because examination of the bit value of the discrimination bit position 5 of the search key "100010" reveals 0, linking is done to the node 210g stored in the array element having the array element number 220f stored in the coupled node indicator.

Because the node type 260g of the node 210g is 1, indicating a leaf node, the index key 250g is read out and a comparison is performed with the search key, thereby revealing coincidence between the two, both of which are "100010". Searching is performed in this manner using the coupled node tree.

Next, the significance of the configuration of the coupled node tree will be described, with reference made to FIG. 2B.

The configuration of the coupled node tree is defined according to a set of index keys. In the example of FIG. 2B, the discrimination bit position of the root node 210a is 0 because there is an index key having a 0 at the 0th bit and an index key having a 1 at the 0th bit in the index keys described in the embodiment example of FIG. 2B. The group of index keys having 0 at the 0th bit is classified under the node 210b, and the group of index keys having 1 at the 0th bit is classified under the node 211b.

That the discrimination bit position of the node 211b is 2 reflects a property of the index keys, this being that the 1st bits of all the nodes 211h, 210h, 211g, and 210g are the same value 0, a difference therebetween first occurring at the 2nd bit.

Similar to the case of the 0th bit, the cases of the 2nd bit being 1 are classified on the node 211f side, and the cases of the 2nd bit being 0 are classified on the node 210f side.

Then because index keys having a 2nd bit that is 1 differ with regard to the 3rd bit, 3 is stored in the discrimination bit position of the node 211f, and because the 3rd and 4th bits of index keys having 0 as the 2nd bit are the same and differ at the 5th bit, 5 is stored in the discrimination bit position of the node 210f.

At the link target of the node 211f, because there is only one having a 3rd bit of 1 and one having a 3rd bit of 0, nodes 210h and 211h are leaf nodes, with "101011" and "101100" stored in the index keys 250h and 251h, respectively.

Even in the event that the index key set includes "101101" or "101110" in place of "101100," because there is equality with "101100" up until the 3rd bit, only the index key stored in the node 211h would change, there being no change in the structure of the tree itself. However, if "101101" is included in addition to "101100," the node 211h would become a branch node, the discrimination bit position thereof being 5. If the index key to be added is "101110," the discrimination bit position would be 4.

As described above, the coupled node tree structure is determined by the bit values of each bit position of the index keys included in the set of index keys.

To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "101100" for the index key 251h of the node 211h, "101011" for the index key 250h of the node 210h, and "000111" for the index key 250c of the node 210c, these being sorted in descending order.

That is, in a coupled node tree the index keys are disposed in the tree in a sorted sequence.

When searching using a search key, the index key is followed over a path disposed on a coupled node tree, and in the case, for example of a search key "101100" it is possible to reach the node 211h. As can be imagined from the above-noted description, even if the search key is made "101101" or "101110," the node 211h will be reached, and a comparison with the index key 251h will result in the search failing.

Also, even in the case in which searching is done with "100100," in the link path of nodes 210a, 211b, and 210f, because the 3rd and 4th bits of the search key are not used and the 5th bit is 0, the node 210g will be reached, similar to the case searching with "100010." In this manner, the discrimination bit positions are used in accordance with bit makeup of the index keys stored in the coupled node tree to perform branching.

Figure 3:
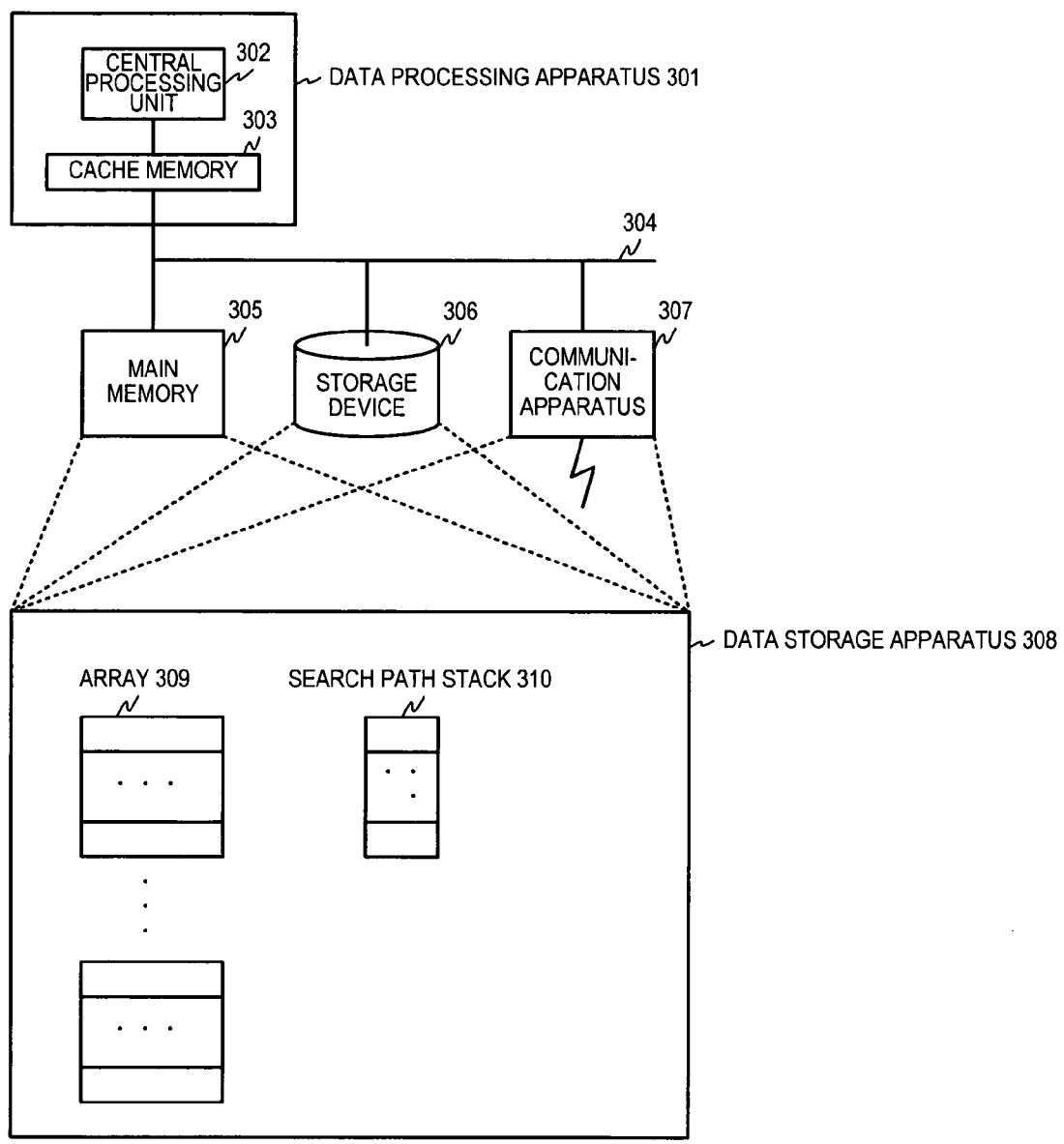
FIG. 3 is a drawing describing an exemplary hardware configuration for embodying the present invention.

FIG. 3 is a drawing describing an example of a hardware configuration for embodying the present invention.

Search processing and data maintenance are implemented with the searching apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search, can be implemented by a main memory 305 or a storage device 306, or alternatively, by using a remotely disposed apparatus connected via a communication apparatus 307.

In the example described in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and the search path stack 310 can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing.

Next, in the above-described patent applications, the basic searching processing using the coupled node tree proposed by the current applicant, the insertion and deletion processing in the coupled node tree, and applied processing such as the processing for determining the maximum and minimum value of index keys included in the coupled node tree will be described, with references made to FIG. 4 to FIG. 11B to the extent that is necessary for an understanding of the present invention.

Figure 4:
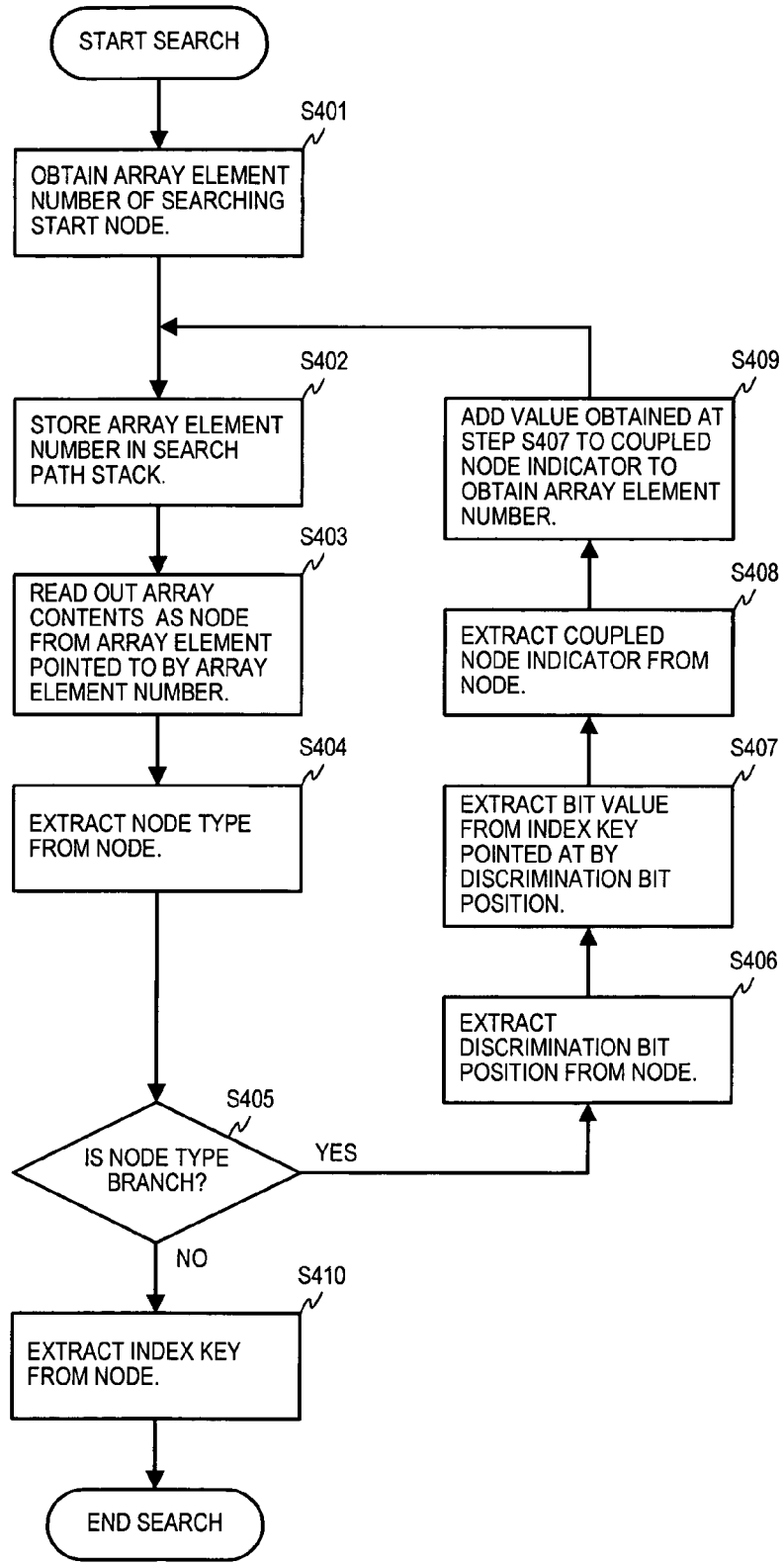
FIG. 4 is a flowchart describing the basic operation of a bit string search.

FIG. 4 is a flowchart showing the basic operation of the bit string searching proposed in the above-noted Japanese Patent Application 2006-293619.

First, at step S401, the array element number of the searching start node is obtained. The array element corresponding to the obtained array element number stores an arbitrary node of the coupled node tree. The specification of the searching start node is performing in various applied searches to be described below.

Next, at step S402, the obtained array element number is stored in the search path stack 310, and at step S403 the array element is read out as the node to be referenced corresponding to the array element number. Then, at step S404 the node type is extracted from the read-out node, and at step S405 a determination is made as to whether or not the node type is branch node.

In the determination at step S405, if the read-out node is a branch node, processing proceeds to step S406, at which information regarding the discrimination bit position is extracted from the node and, at step S407 the bit value corresponding to the extracted discrimination bit position is extracted from the search key. Then, at step S408, the coupled node indicator is extracted from the node, and at step S409 the bit value extracted from the search key and the coupled node indicator are added, thereby obtaining a new array element number, at which point return is made to S402.

Thereafter, the processing from step S402 to step S409 is repeated until the determination at step S405 is that the node is a leaf node and processing proceeds to step S410. At step S410, the index key is extracted from the leaf node, and processing ends.

Figure 5:
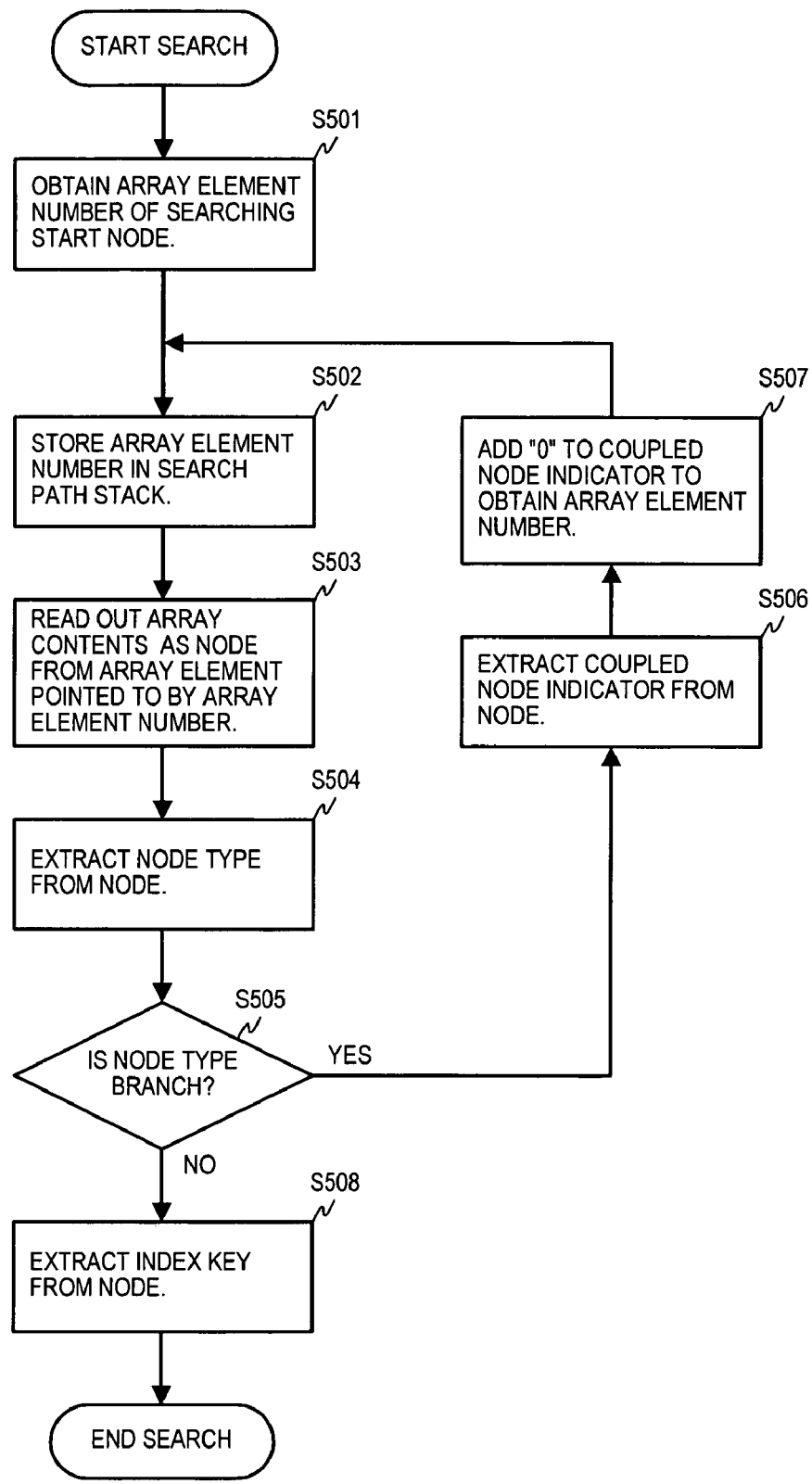
FIG. 5 is a flowchart describing the processing to determine the minimum index key value stored in a coupled node tree.

FIG. 5 is a flowchart showing the processing for determining the minimum value of the index key stored in the coupled node tree (including a subtree) proposed by the above-noted Japanese Patent Application 2006-293619 filed by the applicant of the present invention. Because of the disposition of index keys on the tree as described above, the processing to determine the minimum value of index key corresponds to traversing node [0] from the searching start node until reaching the leaf node.

First, from the obtaining of the array element number of the searching start node at step S501 until the node type determination at step S505 is similar to the processing from step S401 to step S405 of FIG. 4.

If the node type is determined to be branch node at the node type determination made at step S505, processing proceeds to step S506, at which the coupled node indicator of the array is extracted from the node and, at step S507, the value "0" is added to the extracted coupled node indicator and taken as the new array element number, after which return is made to step S502. Thereafter, the processing from step S502 to step S507 is repeated until the node is determined to be leaf node at step S505, and at step S508 the index key is extracted from the leaf node, at which time processing ends.

In the above-noted processing shown in FIG. 5, in order to traverse the node [0], "0" is always added to the coupled node indicator. That is, according to the processing of FIG. 5, the node of a link target is always taken as the node [0] of a node pair, and branching is done to the node storing the index key with the smaller value. By doing this, the tree structure enables extraction of the minimum index key of the coupled node tree, which is a sequentially configured as described above.

Figure 6:
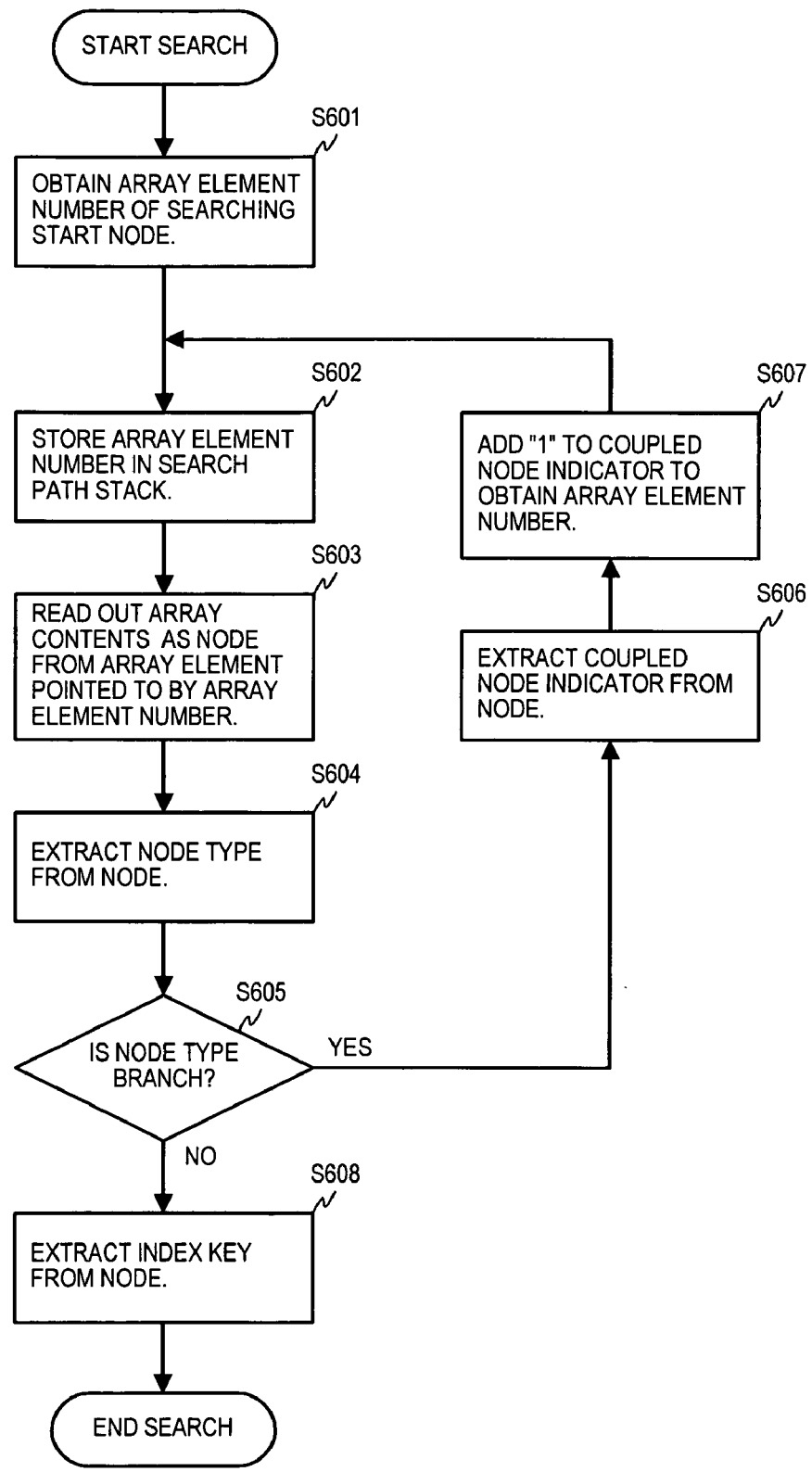
FIG. 6 is a flowchart describing the processing to determine the maximum index key value stored in a coupled node tree.

FIG. 6 is a flowchart showing the processing for determining the maximum value of the index key stored in the coupled node tree (including a subtree) proposed in the above-noted Japanese Patent Application 2006-293619, which was filed by the applicant of the present application.

The processing to determine the maximum index key value corresponds to sequentially traversing up until a leaf node, with regard to the node [1] of the nodes of the tree. The processing for determining the maximum index key in an arbitrary subtree is described below, with a comparison being made to the determining of the minimum index key, focusing on the points of difference therebetween.

Of the processing sequence shown in FIG. 6, the processing from step S601 to step S606 and that of step S608 corresponds, respectively to, and performs similar processing as, the processing from step S501 to step S506 and that of step S508 in FIG. 5. The difference with respect to the processing in FIG. 5 for determination of the minimum value is that, at step S607, the value "1" is added to the coupled node indicator. By doing this, linking is always done to the node [1] of a node pair pointed by the coupled node indicator, and by repeating the processing successively from step S602 to step S607, it is possible to obtain the maximum value of the index key.

As shown in FIG. 4 to FIG. 6, when executing the basic operation of searching for an index key that coincides with a search key and search processing for the minimum/maximum value of the index key, array element numbers of the array elements referred to are successively stored into the search path stack 310.

Also, in the search processing for the minimum/maximum value of the index key referencing FIG. 5 and FIG. 6, although the example used is that of the coupled node tree being stored in an array, it is not essential that the coupled node tree be stored in an array, it being clear that it is possible to search for the minimum/maximum value of an index key by linking to only the primary node of the two nodes forming a node pair or linking to only the node located in a memory area adjacent area for the primary node in order to reach a leaf node.

Figure 7A:
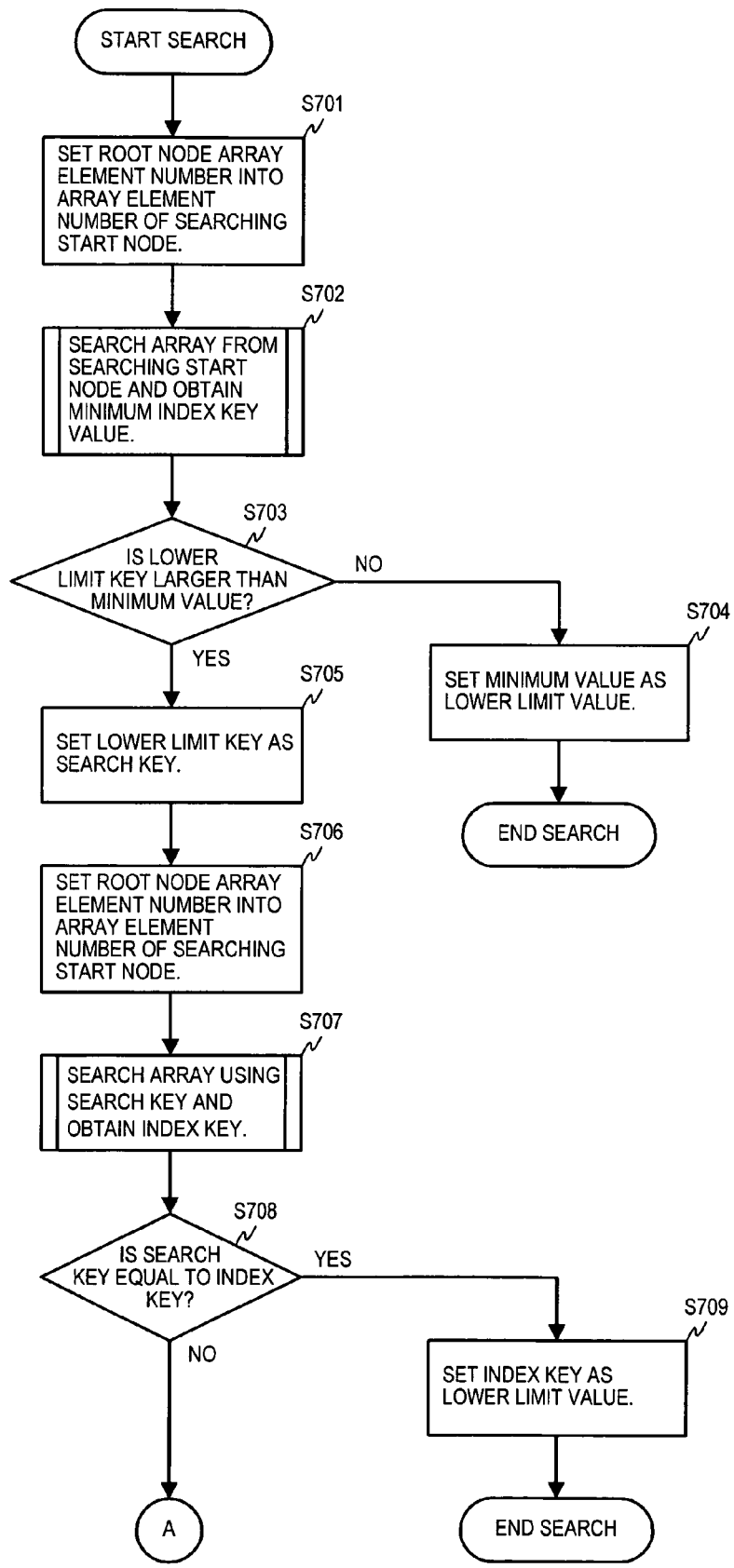
FIG. 7A is a flowchart describing the beginning stage of processing for determining the lower limit value of the index key.
Figure 7B:
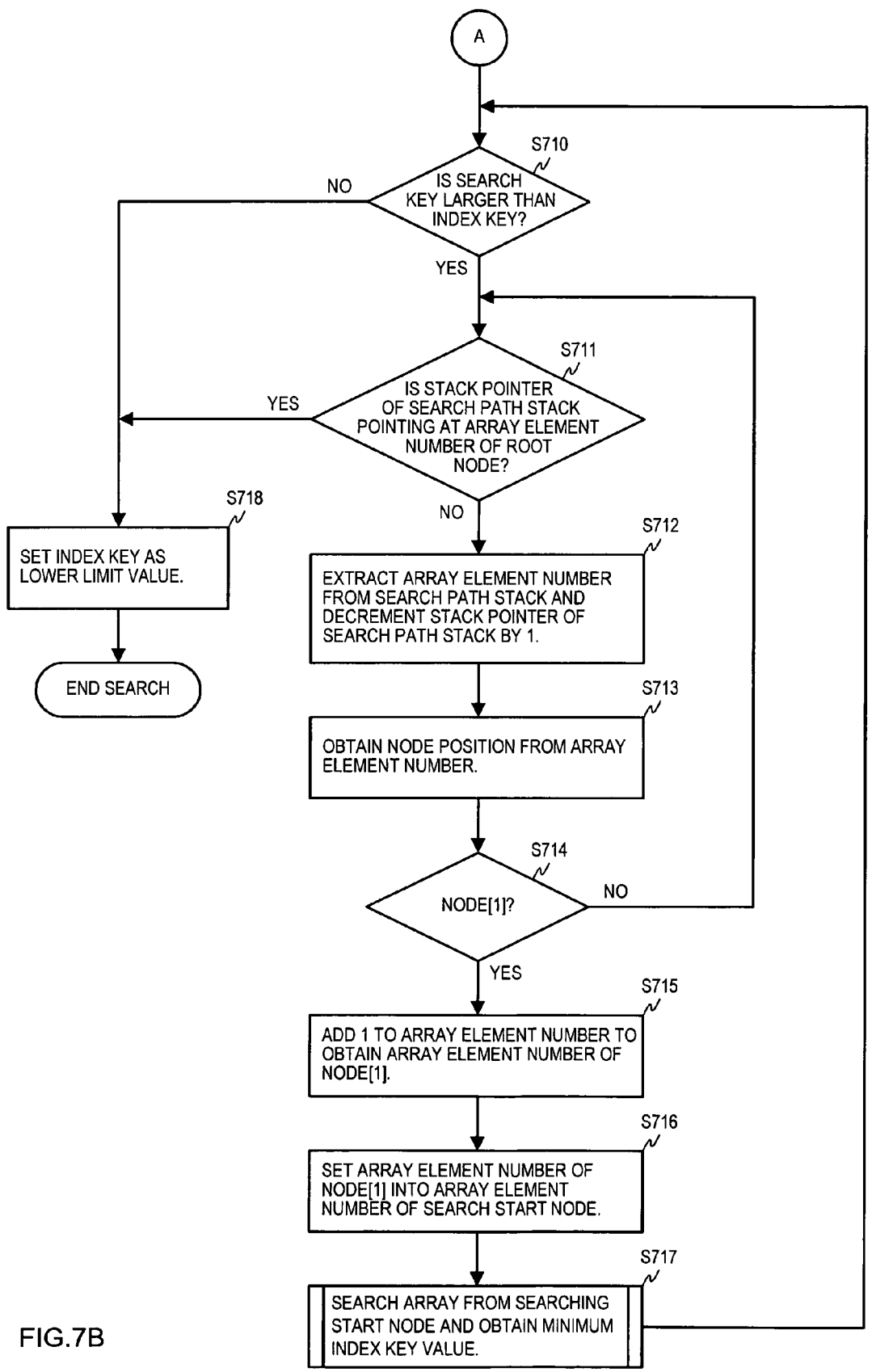
FIG. 7B is a flowchart describing the latter stage of processing for determining the lower limit value of the index key.

FIG. 7A and FIG. 7B are flowcharts showing the processing for determining the lower limit value of an index key stored in the coupled node tree proposed in the Japanese Patent Application 2006-293619, which was filed by the applicant of the present invention. In this case, the term lower limit value is the minimum value of the index key that is equal to or greater than a specified lower limit key. In the processing for determining the lower limit value shown in FIG. 7A and FIG. 7B, when performing a search with regard to a searching range specified by a user or the like, a range in which the index key cannot take on values is not searched, the actual search being performed only over a range of values within which the index key is included. In FIG. 7A and FIG. 7B, the processing for obtaining the specified lower limit key and upper limit key is omitted. Various subsequent applied searches are omitted in the same manner.

First, at step S701 the array element number of the root node is set into the array element number of the searching start node, and at step S702 minimum value search processing is performed to obtain the minimum index key value. Then, at step S703 a comparison is performed between the lower limit key and the minimum value obtained at step S702 to determine whether or not the lower limit key is larger than the minimum value. If the lower limit key is equal to or less than the minimum value, processing proceeds to step S704, at which the minimum value determined at step S702 is set as the lower limit value, and processing is ended.

At step S703 if the determination is made that the lower limit key is greater than the minimum value determined at step S702, processing proceeds to step S705, at which the lower limit key is set as the search key. Then, at step S706, the root node array element number is set into the array element number of the search start node, and at step S707 the index key is searched for using the bit string searching method described by FIG. 4 and FIG. 5. Then, at step S708 a comparison is made between the search key and the index key obtained as a result of the search at step S707 to determine whether or not the values coincide. If the determination is made that the search key and the index key are equal, processing proceeds to step S709, at which the index key obtained by the search is set as the lower limit value, and processing is ended. If the determination is made that the search key and the index key are not equal, processing proceeds to step S710 in FIG. 7B.

At step S710, the relative size relationship between the search key and the index key is determined. At this point, if the search key is larger than the index key, the index key is smaller than the search key, that is, smaller than the lower limit key, meaning that it is not included in the search range specified by the user or the like. However, if the search key is smaller than the index key, this means that the index key is within the specified search range. That being the case, if the determination is made that the search key is smaller than the index key, processing proceeds to step S718, the index key being set as the lower limit value, and the processing ending.

At step S710, if the determination is made that the search key is larger than the search key, processing proceeds to step S711. The processing from step S711 to step S717 is processing that extracts the index keys in ascending order, and by the processing from step S711 to step S717 the index keys stored in the coupled node tree are successively extracted, and when an index key having a value that is larger than the lower limit key is obtained, that index key is set as the lower limit value.

Figure 8A:
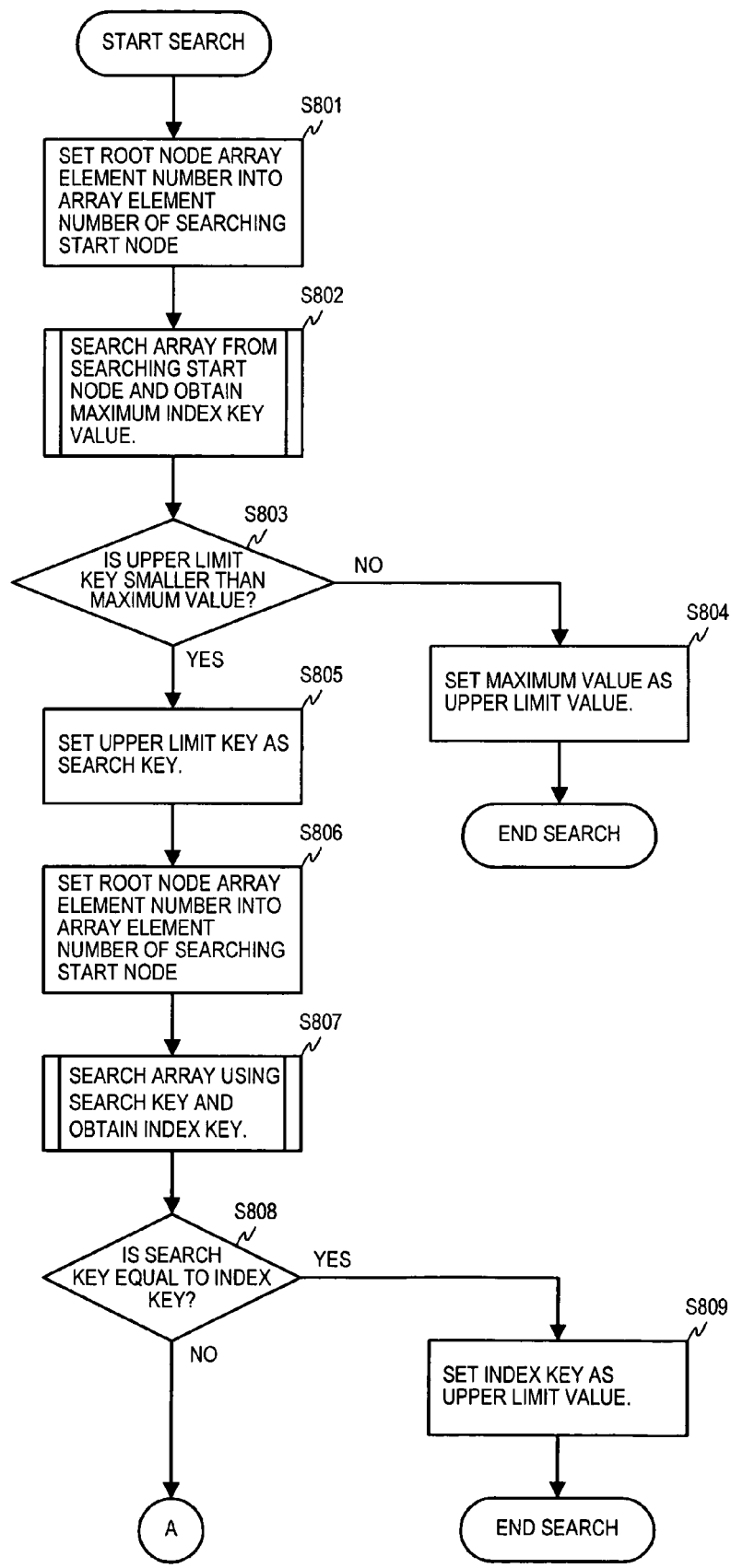
FIG. 8A is a flowchart describing the beginning stage of processing for determining the upper limit value of the index key.
Figure 8B:
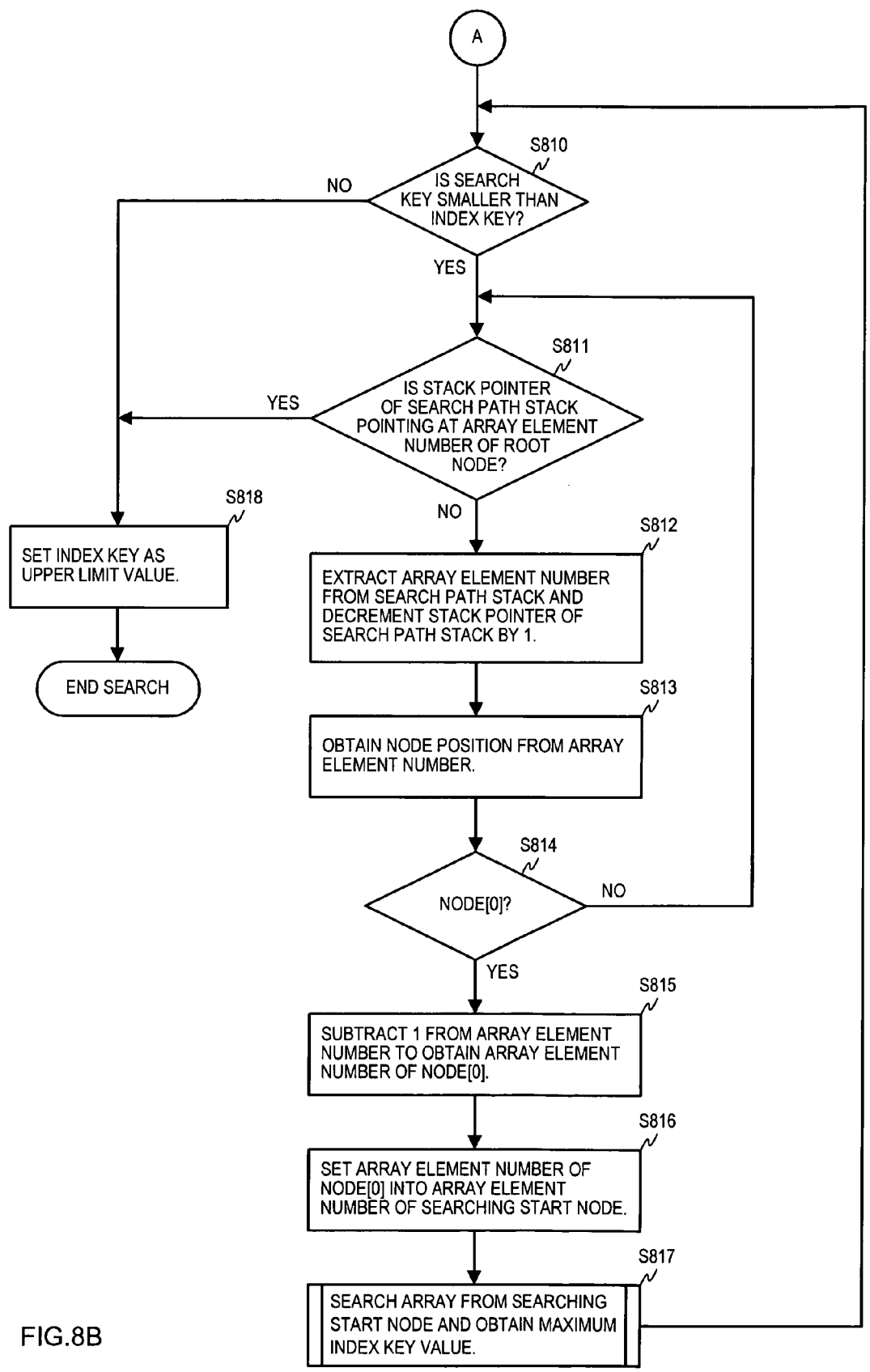
FIG. 8B is a flowchart describing the latter stage of processing for determining the upper limit value of the index key.

FIG. 8A and FIG. 8B are flowcharts showing the processing for determining the upper limit value of the index keys stored in the coupled node tree proposed in the above-noted Japanese Patent Application 2006-293619 filed by the applicant of the present invention. The term upper limit value used herein is the maximum value of the index keys that is less than or equal to the specified upper limit key. Similar to the processing for determining the lower limit value, in the processing for determining the upper limit value shown in FIG. 8A and FIG. 8B, when performing a search with regard to a searching range specified by a user or the like, a range in which the index key cannot take on values is not searched, the actual search being performed only over a range of values within which the index key is included.

First, as step S801, processing to search for the root node as the searching start node is similar to processing for determining the lower limit value of the index key, and processing of step S802 and thereafter corresponds to processing of the above-noted step S702 and thereafter.

That is, in the processing to determine the lower limit value described using FIG. 7A and FIG. 7B, the processing starting at step S702 searches for the lower limit key specified by the user or the like and an index key taking a value that is equal to or larger than the lower limit key and that is also closest to the lower limit key, of the search key specified by the user or the like and the index keys included in the coupled node tree. In contrast, in the processing for determining the upper limit value shown in FIG. 8A and FIG. 8B, the processing starting at step S802 searches for the index key that takes a value that is equal to or less than the upper limit key specified by the user or the like and is also the closest to the upper limit key.

If a comparison is made with the processing described in FIG. 7A and FIG. 7B, the procedure up until the determination of the lower limit value and the upper limit value are basically the same. The differences lie in the determination of size relationship when a comparison is made between the specified key (lower limit key/upper limit key) and the index key (steps 703 and S710 or steps S803 and S810), the determination of the index key minimum value/maximum value when searching the coupled node tree using the specified key as a search key (step S707 or step S807), and the sequence of obtaining the index keys to be respectively ascending or descending sequence (processing starting at step S711 or step S811), the results of these three processes being reversed.

The specific processing performed starting at step S802 is described below.

When the maximum index key value included in the coupled node tree is determined at step S802, at step S803 a comparison is performed of the maximum value determined at step S802 and the upper limit key, to determine whether or not the upper limit key is greater than the maximum value. If the upper limit key is equal to or greater than the maximum value of the index key, processing proceeds to step S804, at which the maximum value determined at step S802 is set as the upper limit value, and processing is ended.

In the case in which the upper limit key is less than the maximum value, processing proceeds to step S805, at which the upper limit key is set as the search key. Then, at step S806, the root node array element number is set as the array element number of the search start node, and at step S807 a search for the search key is performed, after which processing proceeds to step S808.

At step S808, a determination is made as to whether or not the index key and the search key index key obtained at step S807 are equal. At step S808, if the determination is made that these values are equal, processing proceeds to step S809, at which the index key obtained at step S807 is set as the upper limit value, at which point processing ends. At step S808 if the determination is "not equal," processing proceeds to step S810 of FIG. 8B.

At step S810 a determination is made of the size relationship between the search key and the index key. At this point, if the search key is smaller than the index key, the index key is smaller than the upper limit key, meaning that it is not included in the search range specified by a user or the like. If, however, the search key is larger than the index key, this means that the index key is included within the range specified by the user or the like. This being the case, if the determination is made that the search key is larger than the index key, processing proceeds to step S818, the index key being set as the lower limit value, and the processing ending.

At step S810, if the determination is made that the search key is smaller than the index key, processing proceeds to step S811. The processing starting at step S811 is processing that extracts the index keys in descending order, the processing from step S810 to step S817 being repeated until the determination is made that the search key is larger than the index key.

Figure 9A:
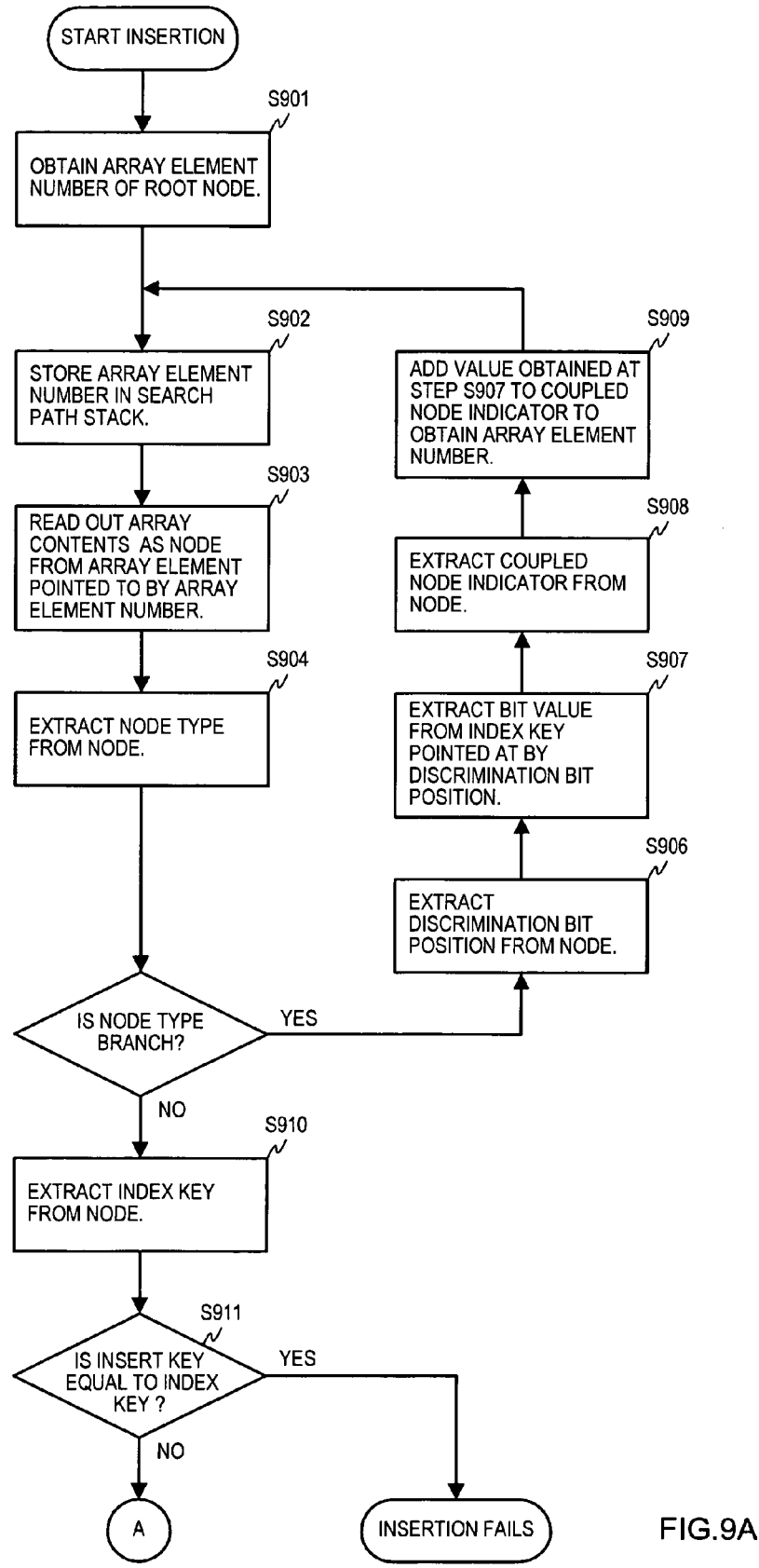
FIG. 9A is a flowchart describing the processing flow for searching processing, which is the beginning stage of insertion processing.
Figure 9B:
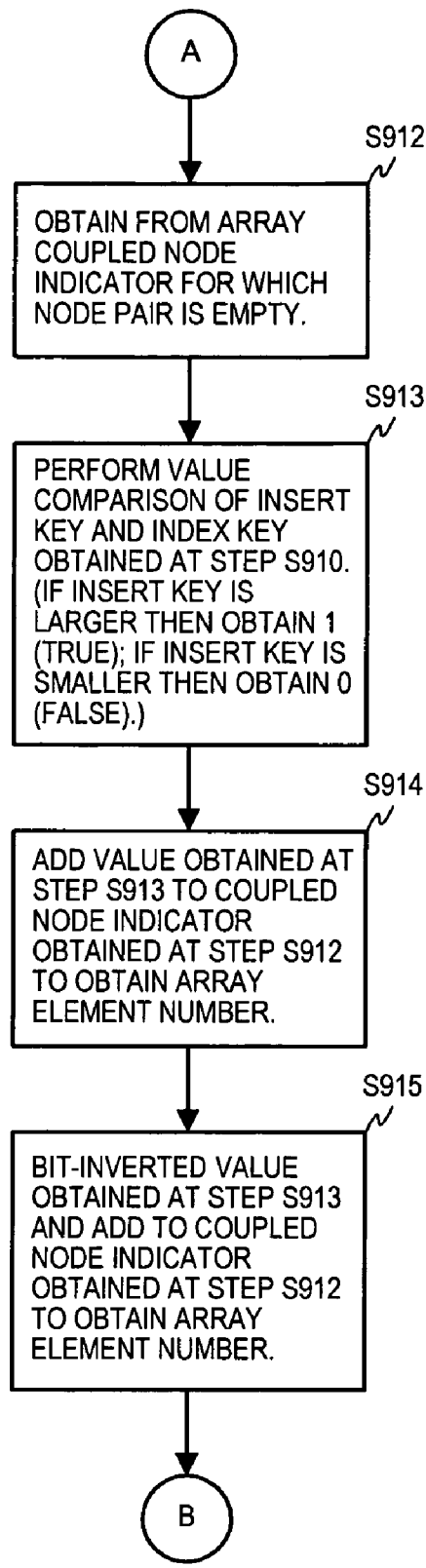
FIG. 9B is a flowchart describing the processing for preparing an array element for a node pair to be inserted.
Figure 9C:
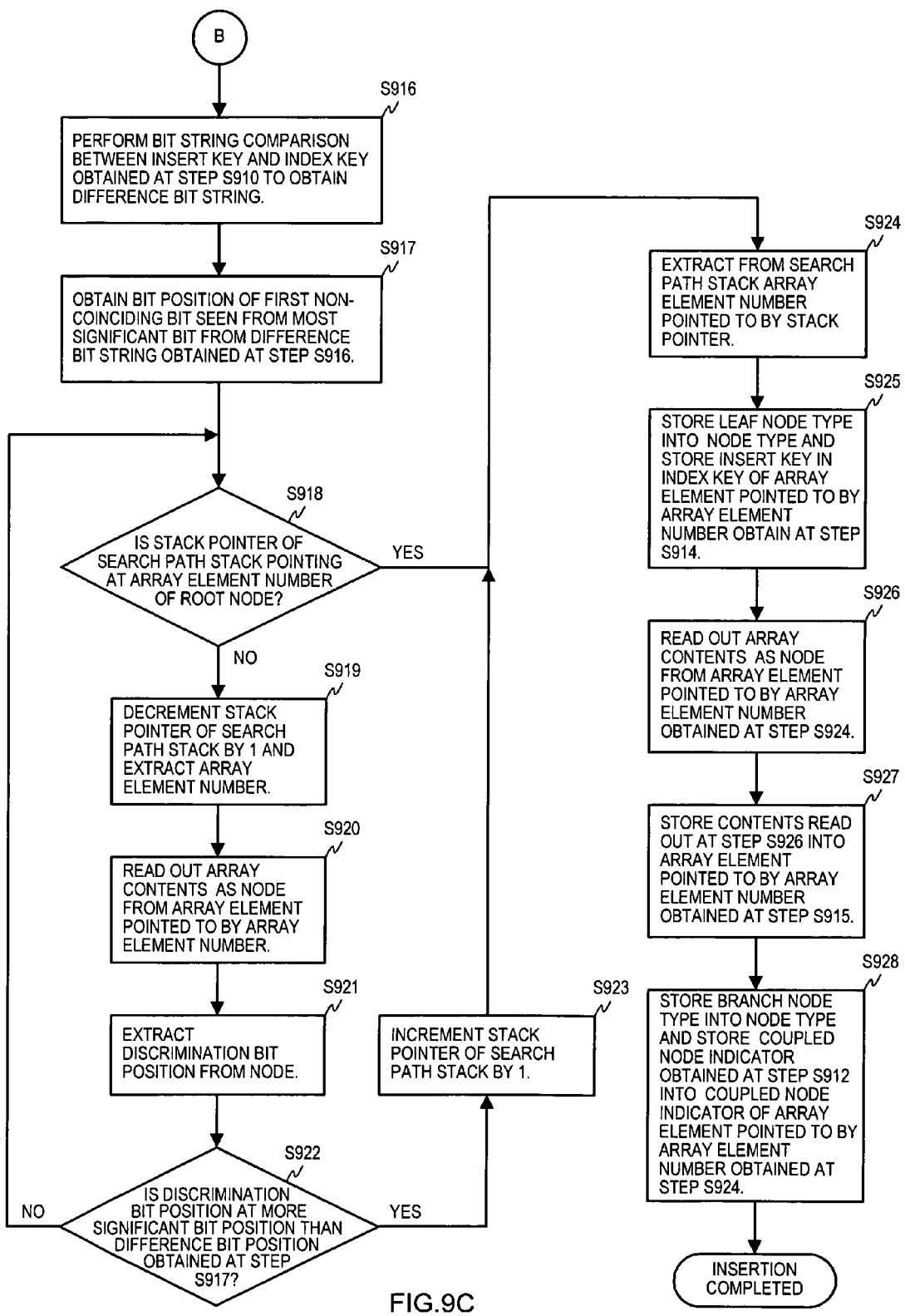
FIG. 9C is a flowchart describing the processing flow for determining the position for inserting a node pair, storing the contents of each node of the node pair, and completing the insertion processing.

Next, the node insertion processing in the coupled node tree proposed in Japanese Patent Application 2006-187872, filed by the applicant of the present invention, will be described, referring to FIG. 9A to FIG. 9C and FIG. 10. FIG. 9A to FIG. 9C describe the usual insertion processing, and FIG. 10 describes the processing for insertion of a root node. By root node insertion processing and usual insertion processing, because a coupled node tree is generated, the description of the node insertion processing is also a description of the processing to generate a coupled node tree.

FIG. 9A is a drawing showing the processing flow for search processing, which is the first stage of insertion processing, this corresponding to the using of an insertion key as a search key in the search processing shown in FIG. 4. Because the processing of step S901 to step S910 corresponds completely to step S401 to step S410 of FIG. 4, these steps will not be explained herein.

At step S911 in FIG. 9A, a comparison is performed between the insertion key and the index key and, because if there is equality the insertion key already exists in the coupled node tree, the insertion fails, and processing ends. If, however, there is no equality, processing proceeds to step S912 and thereafter in FIG. 9B.

FIG. 9B is a processing flowchart describing the processing to prepare array elements for a node pair to be inserted.

At step S912, an empty node pair are obtained from the array, and the array element number of the array element to be made the primary node of the node pair is acquired.

Proceeding to step S913, a value comparison is performed between the insertion key and the index key acquired at step S910 and, in the case in which the insertion key is larger, the Boolean value 1 is obtained, but if the insertion key is smaller, the Boolean value 0 is obtained.

Proceeding to step S914, the Boolean value obtained at step S913 is added to the array element number of the primary node obtained at step S912 to obtain an array element number.

Proceeding to step S915, the logical negation value of the Boolean value obtained at step S913 is added to the array element number of the primary node obtained at step S912 to obtain an array element number.

The array element number obtained at step S914 is the array element number of the array element into which a leaf node having the insertion key as an index key is stored, and the array element number obtained at step S915 is the array element number into which a branch node that formed a pair with that leaf node is stored.

That is, by means of the value relationship between the index key stored in the leaf node obtained by the first stage of search processing and the insertion key, a determination is made of into what node of the node pair to be inserted the leaf node holding the insertion key is to be stored.

For example, in the case in which "011011" is to be inserted into the coupled node tree of FIG. 2B, the index key resulting from the search is the "011010" that is stored in node 211d. A Boolean value is obtained by performing a value comparison between the insertion key "011011" and the index key "011010" stored in the node 211d, and, in this example, because the insertion key is larger, the Boolean value 1 is obtained, so that the leaf node that holds the insertion key is stored in an array element having an array element number obtained by adding 1 to the coupled node indicator of the node pair to be inserted. The index key "011010" is stored in an array element having an array element number obtained by adding the logical negation value of the Boolean value obtained by the value comparison to the coupled node indicator.

When this is done, because the index key "011010" and the insertion key "011011" differ at the 5th bit, the node 211*d* is a branch node, with a discrimination bit position of 5, whose coupled node indicator is the array element number of a primary node of the inserted node pair.

In the case also in which "011001" is to be inserted into the coupled node tree of FIG. 2B, the index key resulting from the search is "011010" that is stored in node 211*d*. In this case, because the insertion key is smaller, the Boolean value 0 is obtained, so that the leaf node that holds the insertion key is stored in an array element having an array element number obtained by adding 0 to the coupled node indicator of the node pair to be inserted. Then, because the index key "011010" and the insertion key "011001" differ at the 4th bit, the node 211*d* is a branch node with a discrimination bit position of 4, whose coupled node indicator is the array element number of a primary node of the inserted node pair. Next, processing proceeds to the processing of step S916 and thereafter in FIG. 9C.

FIG. 9C is a drawing showing the processing flow of storing a node in the array prepared as shown in FIG. 9B, determining the insertion position therein, and changing the contents of an existing node to complete to the insertion processing.

The processing from step S916 to step S923 is processing to determine the position on the coupled node tree for insertion of a node pair, and the processing of step S924 and thereafter is processing for setting data in each node and completing the insertion processing.

At step S916, an exclusive-OR, for example, is obtained of the insertion key and the index key obtained at step S910 so as obtain a difference bit string.

Proceeding to step S917, from the difference bit string obtained at step S916 the first bit position starting from the most-significant 0th bit at which there is a non-coincidence is obtained. This processing can be performed by, for example, a CPU having a priority encoder, the difference bit string being input thereto and the difference bit positions being obtained. It is alternatively possible to perform the equivalent processing using software, to obtain the first bit position at which there is non-coincidence.

Next, proceeding to step S918, a determination is made as to whether the stack pointer of the search path pointer is pointing at an array element number of the root node. If it is, processing proceeds to step S924, but if it is not processing proceeds to step S919.

At step S919, the stack pointer of the search path stack is decremented by 1, and the array element number stacked at that point is extracted.

Proceeding to step S920, the array element at the array element number extracted at step S919 is read out as a node.

Proceeding to step S921, the discrimination bit position is extracted from the node read out at step S920.

Next, proceeding to step S922, a judgment is made as to whether the discrimination bit position read out at step S921 is of higher order than the bit position obtained at step S917. In this case, the term higher order means more to the left in the bit string, that is, having a lower bit position value.

If the result of the judgment at step S922 is negative, return is made to step S918, and repetition is done until either the judgment at step S918 is affirmative or the judgment at step S922 is affirmative. When an affirmative judgment results at step S922, at step S923 the stack pointer search path stack is incremented by 1, and processing proceeds to the processing of step S924 and thereafter.

In the above-described processing at step S916 to step S923, in order to determine the position of insertion of a node pair, a bit string comparison is performed between the index key that is to be inserted and index key obtained by searching, and then a check is made of the relative positional relationship between the leading (most significant) bit position at which the bit value is different in the bit string comparison and the discrimination bit position of the branch node stored in the search path stack. The next branch node link target of the branch node at which the discrimination bit position is a more significant is made the insertion position for the node pair to be inserted.

For example, when inserting "111000" into the coupled node tree of FIG. 2B, the index key resulting from the search is the "101011" stored in the node 210*h*. A bit string comparison between the insertion key "111000" and the index key "101011" stored in the node 210*h* obtains the bit position 1 as the most significant bit position of a bit value that is different. The search path stack is successively traversed in reverse until the relative position relationship between the obtained bit position 1 and the discrimination bit position of the branch node stored in the array element having an array element number stored in the search path stack is such that the discrimination bit position is more significant, so that the root node 210*a* is reached. At that point the search path stack pointer is incremented by 1 to obtain the array element number of the node 211*b*. The insertion key "111000" is inserted into the link target of the node 211*b*.

If the root node is reached by traversing the search path stack in reverse but the discrimination bit position of the root node is not a bit position that is more significant than the bit position of the most significant bit having a different bit value in the previously determined bit string comparison, this is the case in which at the upper-order bit of the index key of the coupled node tree the bits that are more significant than the discrimination bit position of the root node all have equal values. This means that in the index key to be inserted, there is the first bit value that differs with the value of a bit that is more significant than the discrimination bit position of the root node. Therefore, the node pair to be inserted becomes the direct link target of the root node, and the discrimination bit position of the root node changes to the position of the most significant bit of the insertion key, which differs in value from the existing index key.

Next, the processing of step S924 and thereafter, which is the processing to set data at each node and complete the insertion processing, will be described. At step S924, the array element number that is pointed to by the stack pointer of the search path stack is extracted.

At step S925, 1 (leaf node) is stored in the node type of the array element pointed to be the array element number obtained at step S914 and the insertion key is stored in the index key.

Proceeding to step S926, the array element at the array element number obtained at step S924 is read out from the array.

Next, at step S927, the contents read out at step S926 are stored in the array element having the array element number obtained at step S915.

Finally, at step S928, 0 (branch node) is stored in the node type of the array element pointed to by the array element number obtained in step S924, the bit position obtained at step S917 is stored in the discrimination bit position, and the array element number obtained at the step S912 is stored in the coupled node indicator.

In the above-described example of inserting "111000" into the coupled node tree of FIG. 2B, the contents of node 211b are written into the node[0] of the empty node pair that was obtained (step S927) and the node[1] thereof was made a leaf node that holds "111000" (step S925). The bit position 1 of the most significant bit that is the bit value that differs in the bit string comparison is stored in the discrimination bit position of the node 211b, and the array element number of the array element stored in the primary node of the obtained node pair is stored into the coupled node indicator (step S928).

Figure 10:
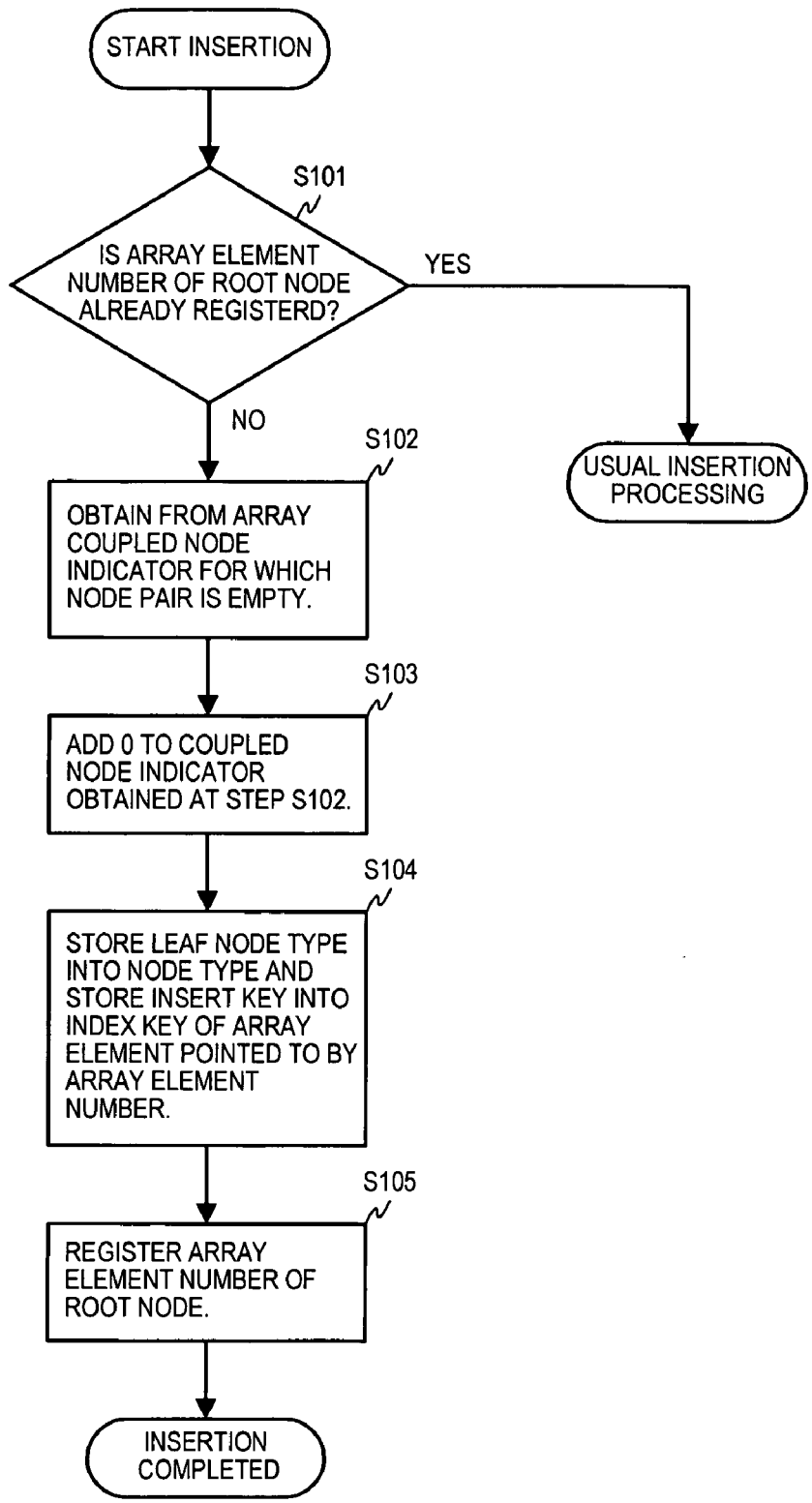
FIG. 10 is a flowchart describing the overall node insertion processing in the case of adding an index key, including processing for inserting a root node.

FIG. 10 is a processing flowchart describing the overall node insertion processing for the case of adding an index key, including insertion of a root node, as proposed in the Japanese Patent Application 2006-187872 by the present applicant.

At step S101, a judgment is made as to whether the array element number of a root node of a coupled node tree that is to be obtained as already been registered. If it has already been registered, the usual insertion processing described using FIG. 9A to FIG. 9C is performed.

At step S101, if the judgment is that the registration has not yet been done, this is the case of the generation and registration of a completely new coupled node tree. First, at step S1102, an empty node pair is requested from the array, and the array element number of the array element to be made the primary node of the node pair is acquired. Next at step S1103, the array element number is determined by adding 0 to the array element number obtained at step S102. (In actuality, this is equal to the array element number obtained at step S102). Further, at step S1104, 1 (leaf node) is stored in the node type of the root node of the array element having the array element number obtained at step S103, and the insertion key is stored in the index key, and at step S105 the processing is completed by registering the array element number of the root node obtained at step S102.

As described above, it will be understood that when there is a set of index keys, the index keys are successively extracted therefrom, and the processing of FIG. 10 and FIG. 9A to FIG. 9C is repeated so as to enable the creation of a coupled node tree according to the present invention corresponding to the set of index keys.

Next, referring to FIG. 11A and FIG. 11B, the processing flow will be described for deleting a specific index key from a set of index keys associated with a coupled node tree, as proposed in the Japanese Patent Application 2006-187872 by the present applicant.

Figure 11A:
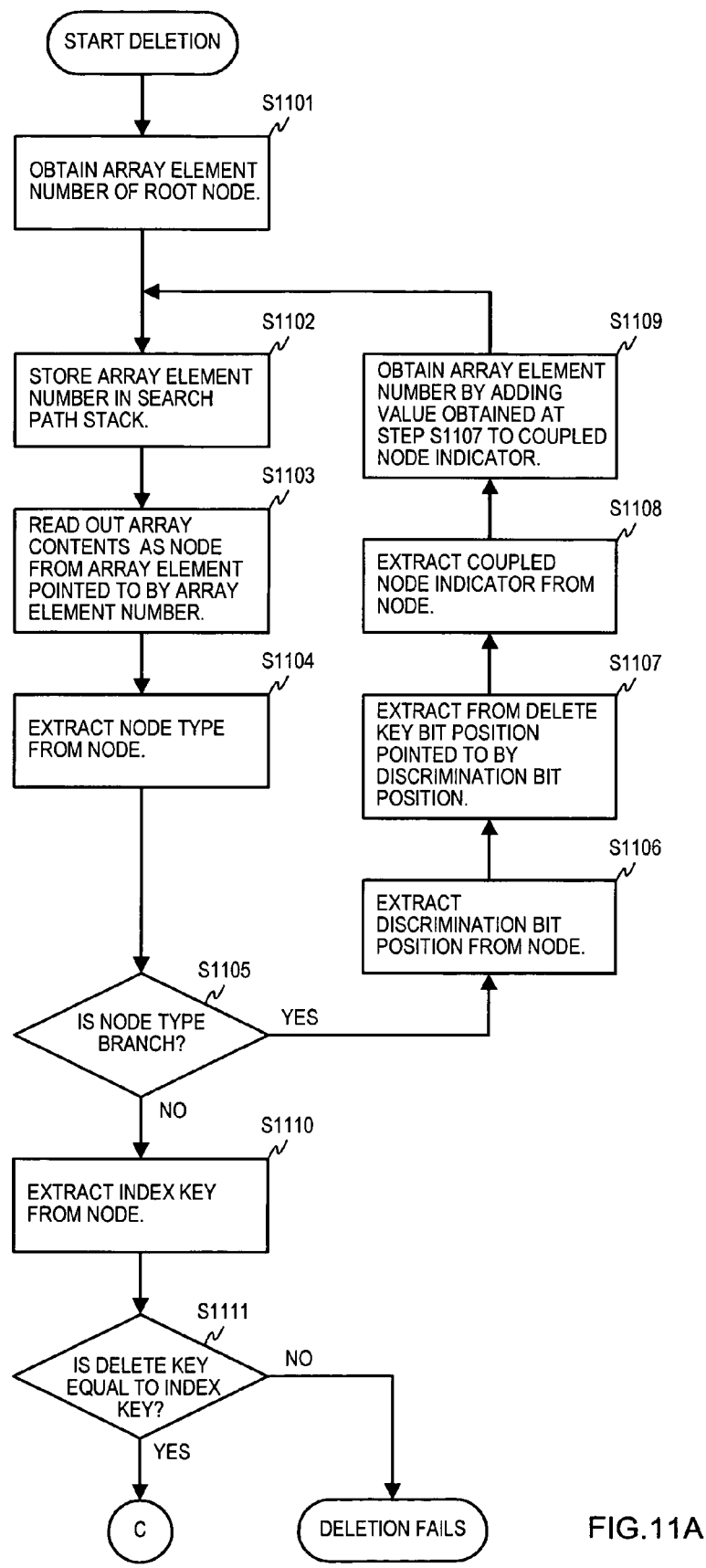
FIG. 11A is a flowchart describing the searching processing flow, which is the beginning stage of deletion processing.

FIG. 11A is a drawing showing the processing flow for search processing, which is the first stage of deletion processing, this corresponding to the using of a deletion key as the search key in the searching processing shown in FIG. 4. Step S1101 corresponds to S401 of FIG. 4 wherein the search start node is the root node and because the processing of step S1102 to step S1110 corresponds completely to step S402 to step S410 of FIG. 4, these steps will not be described herein.

In step S1111 in FIG. 11A, a comparison is performed between the deletion key and the index key and, because if there is no equality the index key to be deleted does not exist in the coupled node tree, the deletion fails, and processing ends. If, however, there is equality, processing proceeds to step S1112 and thereafter in FIG. 11B.

Figure 11B:
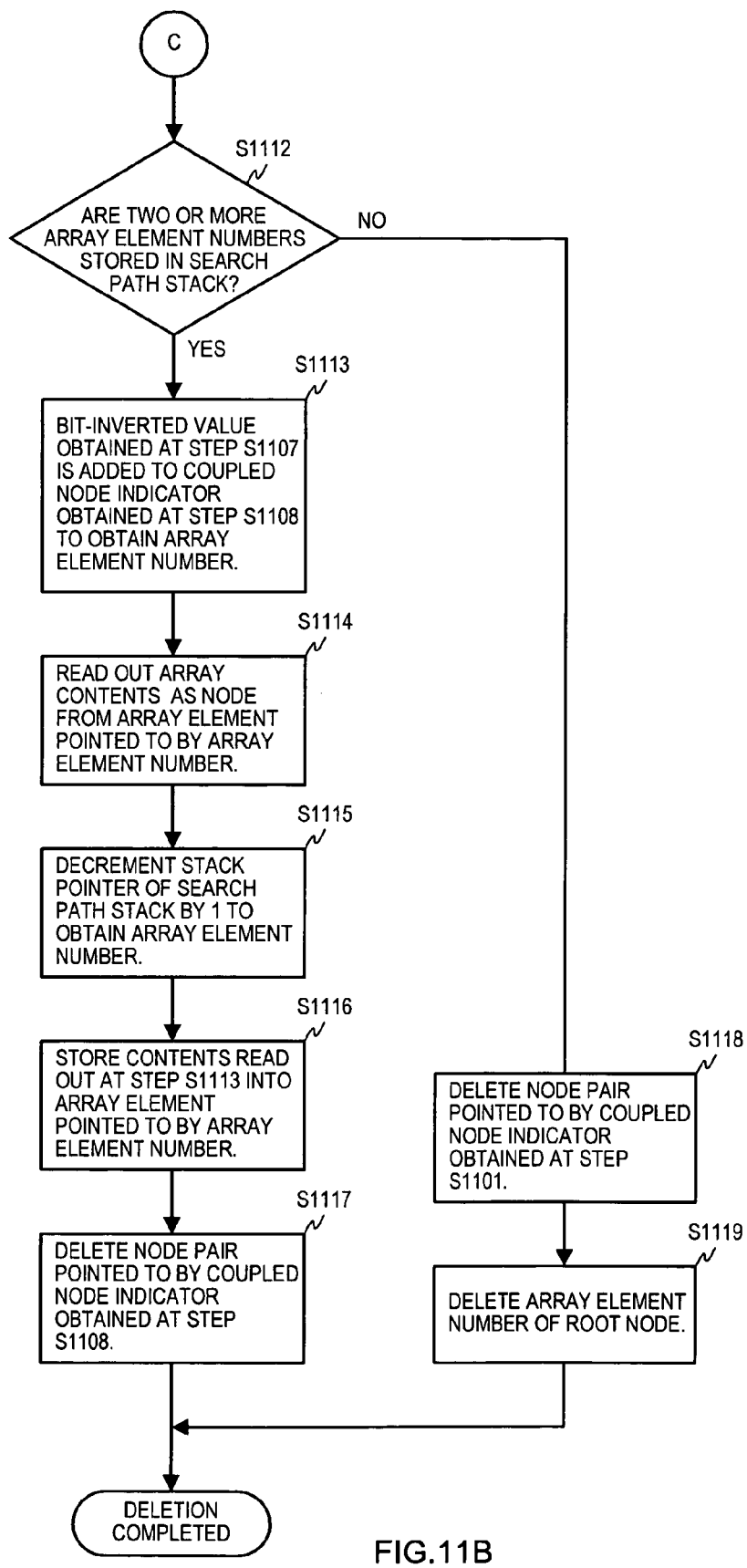
FIG. 11B is a Drawing describing the processing flow that is the latter stage of the deletion processing.

FIG. 11B is a drawing describing the processing flow of the latter stage of the deletion processing.

First, at step S1112, a judgment is made as to whether or not there are at least 2 array element numbers on the search path stack. Stated differently, the condition in which there are fewer than 2 array element numbers is the one in which there is only 1, this being the array element number of the array element in which the root node is stored. In this case, processing proceeds to step S11118, at which the node pair of the array element number of the root node obtained at step S1101 is deleted. Next, proceeding to step S1119, the array element number of the root node that had been registered is deleted, thereby completing the processing.

If at step S1112 the judgment is made that there are two or more array element numbers stored in the search path stack, processing proceeds to step S1113, at which an array element number is obtained by adding the inversion of the value obtained at step S1107 to the coupled node indicator obtained at step S1108. This processing is performed to determine the array element number of a node that forms a pair with a leaf node at which is stored the index key to be deleted.

Next, at step S1114, the contents of the array element having the array element number obtained at step S1113 are read out, and at step S1115 the stack pointer of the search path stack is decremented by 1 and the array element number is extracted.

Next, at step S1116, the contents of the array element having the array element read out at step S1114 are written over the array element having the array element number obtained at step S1115. This processing replaces the branch node that is the link source to the leaf node in which the index key to be deleted with the above-noted node that forms a pair with the leaf node.

Finally, at step S1117, processing is completed by deleting the node pair associated with the coupled node indicator obtained in step S1108.

The foregoing is a description of the art that is the base of the present application with regard to split/conjoin a coupled node tree. If necessary refer to the above-described specifications and drawings.

Next, the method of split/conjoin a coupled node tree of the present invention is described below.

Splitting of a coupled node tree is done when a split key formed by a given bit string is specified, the relative value relationship between the index keys included in the coupled node tree and the split key being used to perform splitting into two groups, thereby generating two coupled node trees formed by index keys that belong to each of the groups.

With regard to splitting by value relationship, although in the description that follows hereunder splitting is done into a group that is larger than the split key and a group that is smaller than or equal to the split key, even in the case in which splitting is done into a group that is larger than or equal to the split key and a group that is smaller than the split key, splitting/conjoining can be done in the same manner, as can be easily understood from the following description.

That is, the split key is a key used to establish where the coupled node tree is to be split.

The conjoining of coupled node trees is the generation of a coupled node tree corresponding to the union of two sets of index keys from two coupled node trees corresponding to the two index key sets. In the present invention, it is assumed that the product set of the two sets of index keys is an empty set.

In the description of three embodiments of the present invention that follows, a coupled node tree is sometimes referred to simply as a tree. In the following first, second, and third embodiments, although it is not necessary that an index key equal to the specified split key be included within the tree to be split, in the case in which the index key corresponding to a specified split key is used as the split key, taking the specified split key as either the upper limit key or the lower limit key, the upper limit value or the lower limit value is determined by the searching method described with reference to FIG. 7A, FIG. 7B, FIG. 8A, and FIG. 8B, and this can be used as the new split key corresponding to the specified split key.

First Embodiment

The first embodiment of the present invention is one in which the minimum index key value in the processing source tree (herein sometimes referred to simply as the processing source) that is to be split is extracted, the extracted minimum index key value is inserted into the processing target tree (sometimes referred to simply as the processing target) generated by splitting the processing source and processing to delete the minimum index key value from the processing source tree is performed repeatedly as long as the minimum value is equal to or less than the split key, to split the processing target from the processing source tree that is to be split.

Figure 12:
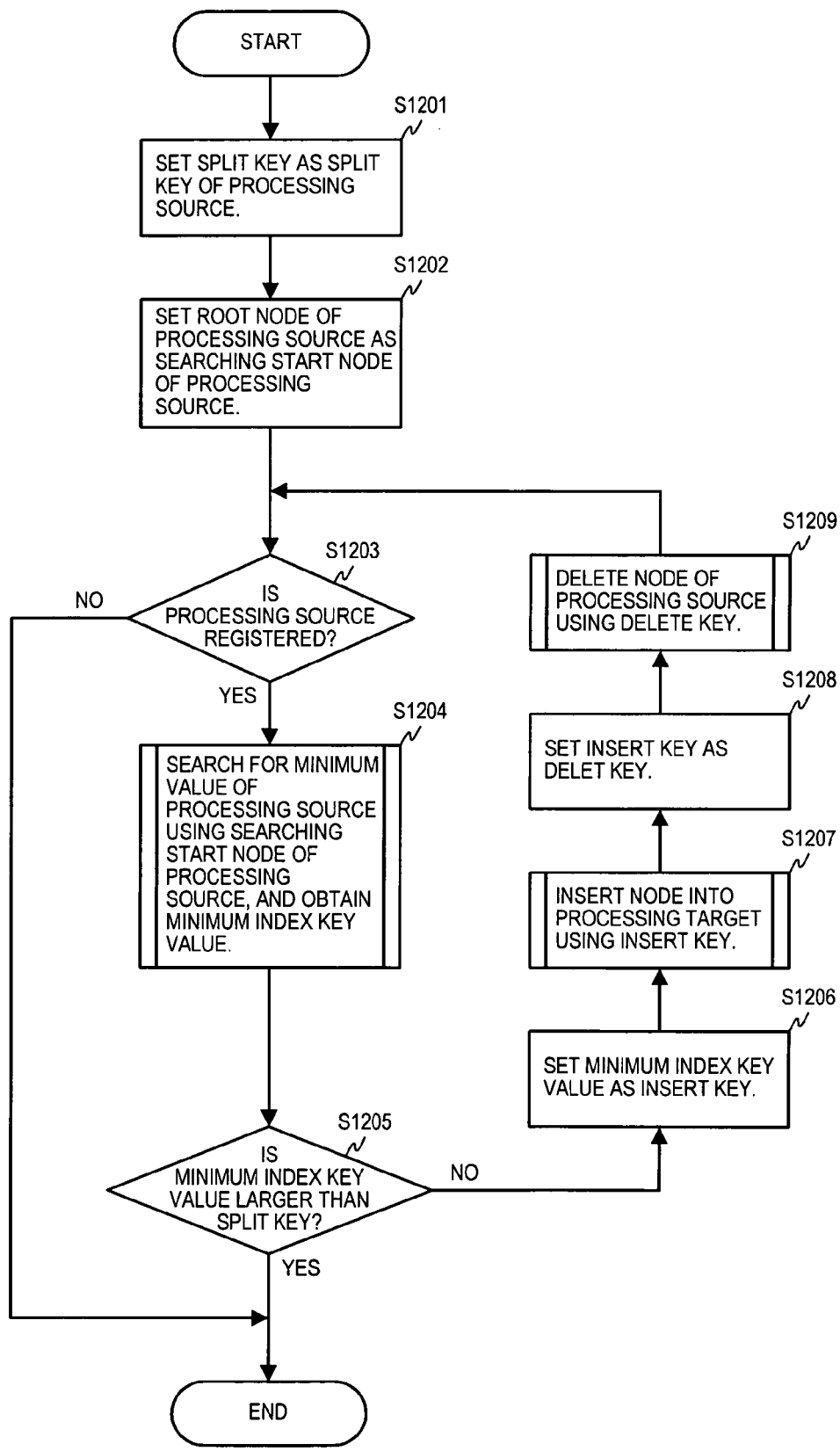
FIG. 12 is a flowchart describing the splitting processing flow for a coupled node tree in the first embodiment.

FIG. 12 is a drawing describing the splitting processing flow for a coupled node tree in the first embodiment of the present invention.

At the first step, step S1201, the specified split key is set as the split key for the processing source. The specification of the split key can be made by external input by an operator, and can also be made as a result of processing by a computer program, or by a remotely issued command. The specified split key is set into an area in memory for holding the split key in the processing source.

Next, at step S1202 the root node of the processing source is set as the searching start node in the processing source and processing proceeds to step S1203.

At step S1203, a determination is made as to whether or not the processing source tree is registered. If the result of the determination is that the processing source tree is not registered, this means that the entire processing source tree has been deleted. So, this is an exceptional case in which the split key is equal to or larger than the maximum index key value in the processing source tree, in which case processing is ended.

If the processing source tree is registered, processing proceeds to step S1204, at which the processing shown in FIG. 5 is executed from the root node that was set as the searching start node at step S1202 to obtain the minimum index key value.

Next, proceeding to step S1205, a determination is made as to whether or not the minimum value obtained at step S1204 is larger than the split key. If the minimum value is larger than the split key, because the tree splitting has been completed, the processing is ended. If it is not larger, however, the generation of a processing target tree and deletion of the node from the processing source tree are executed by step S1206 to step S1209 described below, and return is made to step S1203.

At step S1206, the minimum value obtained at step S1204 is set as the insertion key of the processing target.

Next, at step 1207, the generation of the processing target tree by the insertion key is executed by the tree generation and insertion processing shown in FIG. 9A to FIG. 9C and in FIG. 10.

Then, at step S1208, the insertion key in step S1207 is set as the deletion key of the processing source, and at step S1209 the deletion processing shown in FIG. 11A and FIG. 11B deletes the leaf node that includes the deletion key from the processing source tree.

Although, in the above description of splitting processing, deletion is done successively from the minimum index key of the processing source, it will be clearly understood by a person skilled in the art that it is possible to perform successive deletion from the maximum value of the index key in the same manner. In this case, step S1204 is processing for determining the maximum value of the index key, step S1205 is processing to determine the value relationship between the maximum value and the split key, and at step S1206 the maximum value is set as the insertion key of the processing target.

Although the foregoing is a description of splitting processing, it is possible to execute conjoining processing as well by the processing flow shown in FIG. 12.

Taking one of two trees to be conjoined as the processing source tree, if the split key is taken as equal to or larger than the maximum index key value in the processing source tree, conjoining processing corresponds to the exceptional processing described above, in which the processing source tree is deleted and conjoined to the processing target tree. In the case in which the maximum index key value in the processing source tree is unknown, the split key is determined beforehand by the maximum value search processing shown in FIG. 6.

Because the split key is taken to be equal to or larger than the maximum index key value in the processing source tree, in the value relationship comparison of step S1205, because there is branching to step S1206 because the split key is always larger than the minimum value, it is possible to omit step S1205. If that is the case, because there is no meaning to setting the split key, the result is that step S11201 is also unnecessary, and it is possible to perform conjoining processing by simply repeating the search for the minimum value and the insertion and deletion processing.

As noted with regard to splitting processing, it is clear that conjoining processing can be performed in the same manner by repeating the search for the maximum value and the insertion and deletion processing.

Although the logic of the processing in the first embodiment is simple, because there is repetition of searching for the minimum value by setting the root node of the processing source as the searching start node, and because insertion and deletion are performed for each index key, the number of runtime steps becomes large.

Second Embodiment

Although the second embodiment of the present invention is similar to the first embodiment in that insertion and deletion are done in index key units, a search path stack is used in searching for an index key to be inserted/deleted, so as to reduce the number of runtime processing steps when executing insertion processing and deletion processing.

Figure 13:
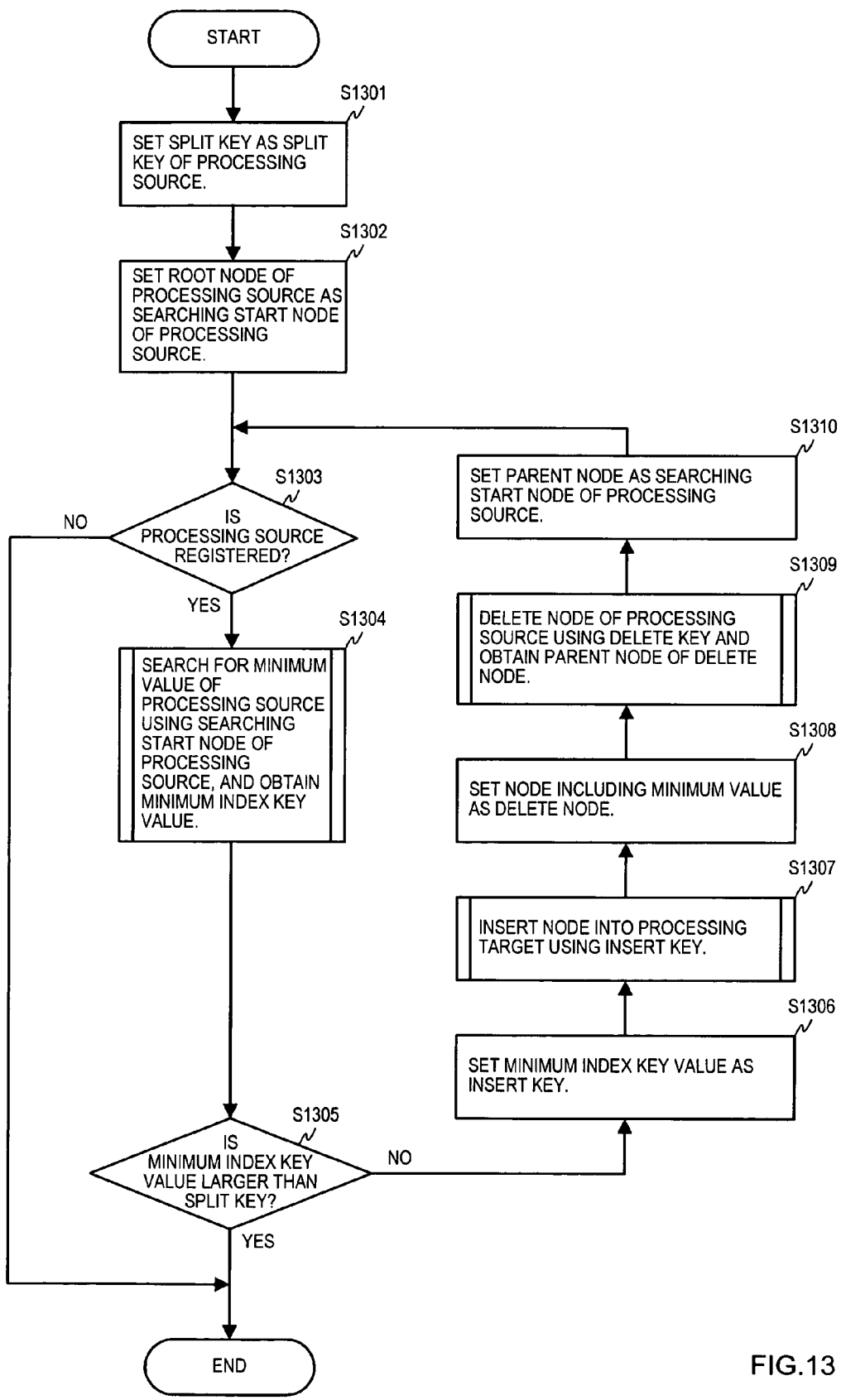
FIG. 13 is a flowchart describing the splitting processing flow for a coupled node tree in the second embodiment.

FIG. 13 describes the processing flow for splitting of a coupled node tree in the second embodiment of the present invention.

Because the processing from step S1301 to step S1306 is exactly the same as the processing from step S1201 to step S1206 of the first embodiment shown in FIG. 12, the explanation thereof is omitted here.

At step S1307, a node is inserted into the processing target using the insertion key. This processing is characteristic of this embodiment, which differs from the insertion processing of step S1207 shown in FIG. 12, and is described below, with reference made to FIG. 14, FIG. 15A, and FIG. 15B.

Next, at step S1308, the node that includes the minimum value obtained at step S1304 is set as the deletion node of the processing source, and at step S1309 the deletion node is deleted from the processing source, thereby obtaining a parent node of the processing source into which the contents of the node that forms a node pair with the deletion node are copied.

Next, at step S1310, the parent node of the processing source obtained at step S1309 is set as the searching start node of the processing source, and return is made to step S1303.

As will be described below, the parent node of the processing source is a branch node that is positioned at the immediately next higher order position from the deletion node. The deletion node includes the minimum value of the index key of the processing source, and from the above-noted sequence of the index keys, the next minimum value to be searched for is lower in order than the parent node of the processing source.

Therefore, by using the parent node of the processing source in place of the root node as the searching start node for the minimum value search on second and subsequent times of step S1304, it is possible to reduce the number of processing steps.

Step S1308 to step S1309 and the parent node of the processing source will be described later, with reference made to FIG. 16.

Figure 14:
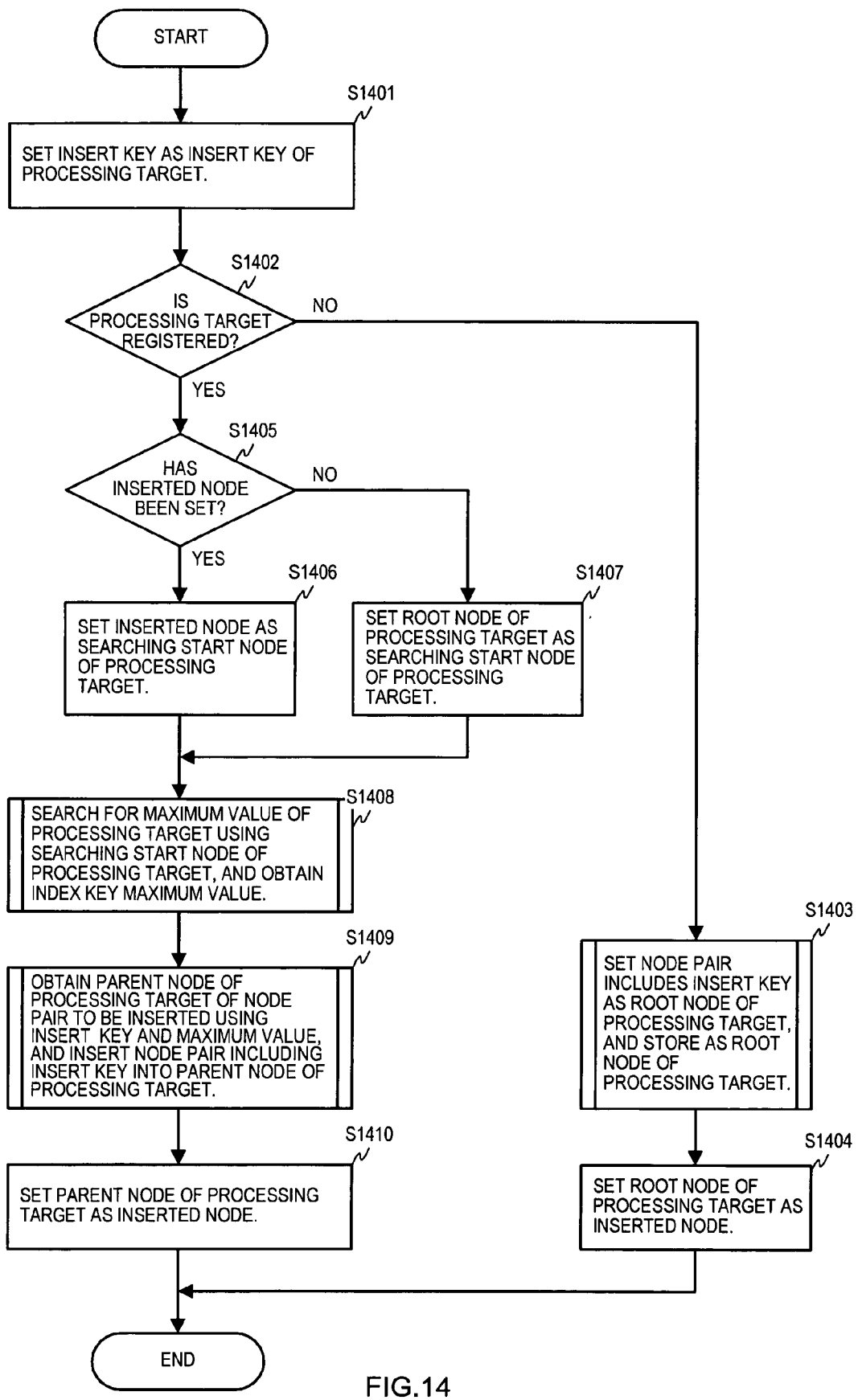
FIG. 14 is a flowchart describing the processing flow for insertion of a node in the second embodiment.

FIG. 14 is a drawing describing the insertion processing flow insertion processing for a node, corresponding to step S1306 and step S1307 shown in FIG. 13.

The first step, step 1401, which is a step of setting the index key as the insertion key of the processing target, is processing corresponding to step S1306 shown in FIG. 13, the minimum value obtained at step S1304 being set into an insertion key setting area in the processing target.

Next, at step S1402, a determination is made as to whether or not the processing target is registered.

In the case in which the processing target is not registered, processing proceeds to step S1403, at which the node pair that includes the insertion key as the root node of the processing target is set, registering the root node of the processing target. Proceeding to step S1404, the root node of the processing target is set as the inserted node, and processing is ended.

If the result of the above-noted step S1402 is that registration has been done, processing proceeds to step S1405. At step S1405, a determination is made as to whether or not the inserted node has been set. This determination processing is required for the tree conjoining processing to be described later. In tree splitting processing, because at the time of the first insertion processing the root node is set as the inserted node at step S1404, the determination result at step S1405 is always "yes." Therefore, if this is only for splitting processing, step S1405 and step S1407 are not essential.

If the result of the determination at step S1405 is "yes," processing proceeds to step S1406, at which the node that is set as the inserted node is set as the searching start node of the processing target, and processing proceeds to step S1408.

If the result of the determination as step S1405 is "no," processing proceeds to step S1407, at which the root node is set as the searching start node of the processing target, and processing proceeds to step S1408.

At step S1408, the maximum value search processing shown in FIG. 6 is used to obtain the maximum value of the index key of the processing target from the searching start node set at either step S1406 or step S1407.

Next, at step S1409, the insertion key set at step S1401 and the maximum value obtained at step S1407 are used to determine the parent node of the processing target of the node pair to be inserted, and the node pair including the insertion key is inserted into the parent node.

Proceeding to step S1410, the parent node of the processing target into which the node pair including the insertion key in step S1409 is inserted is set as the inserted node and processing is ended.

Next, the above-noted step S1403 and step S1409 are described in detail below.

Figure 15A:
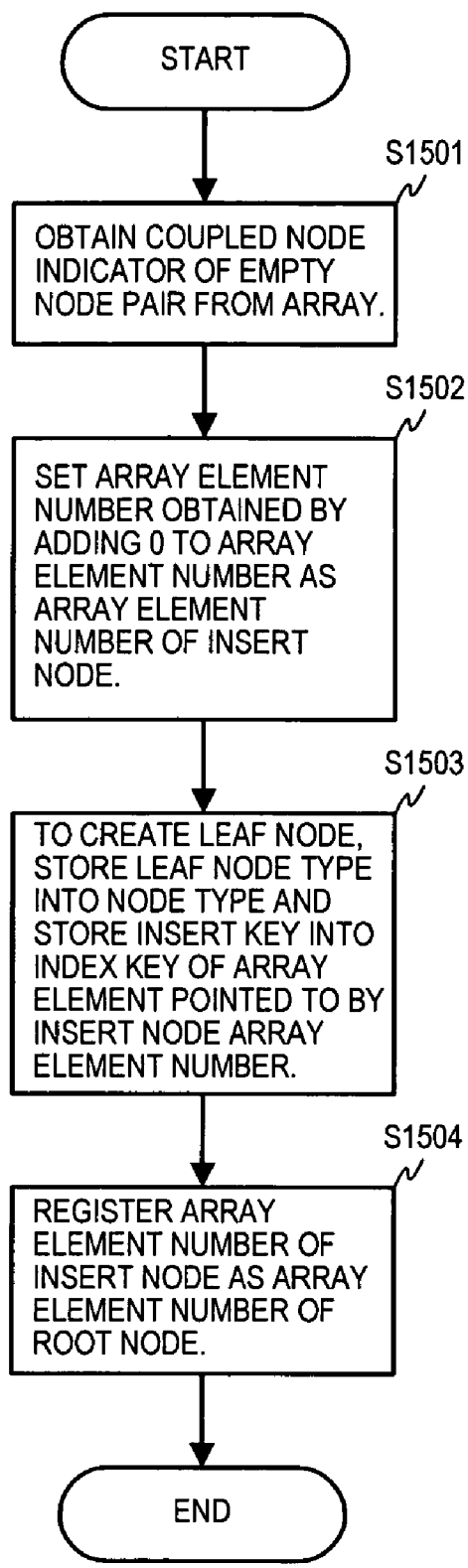
FIG. 15A is a flowchart describing the root node setting processing flow in the second embodiment.

FIG. 15A is a flowchart describing the root node setting processing of step S1403 shown in FIG. 14.

First, at step S1501, the coupled node indicator of an empty node pair is obtained from the array.

Next, at step S1502, the array element number obtained by adding "0" to the coupled node indicator obtained at step S1501 is set as the array element number of the insertion node.

Proceeding to step S1503, in order to form a leaf node, the node type is set to leaf and the index key is set to the insertion key, and storage is done into the array element having the array element number set at step S11502.

Next, at step S1504, the array element number of the insertion node is registered as the array element number of the root node, and processing is ended.

The processing from step S1501 to step S1504 corresponds to the steps S102 to S105 for the case in which, in generating a coupled node tree described with reference to FIG. 10, the array element number of the root node has not been registered.

Figure 15B:
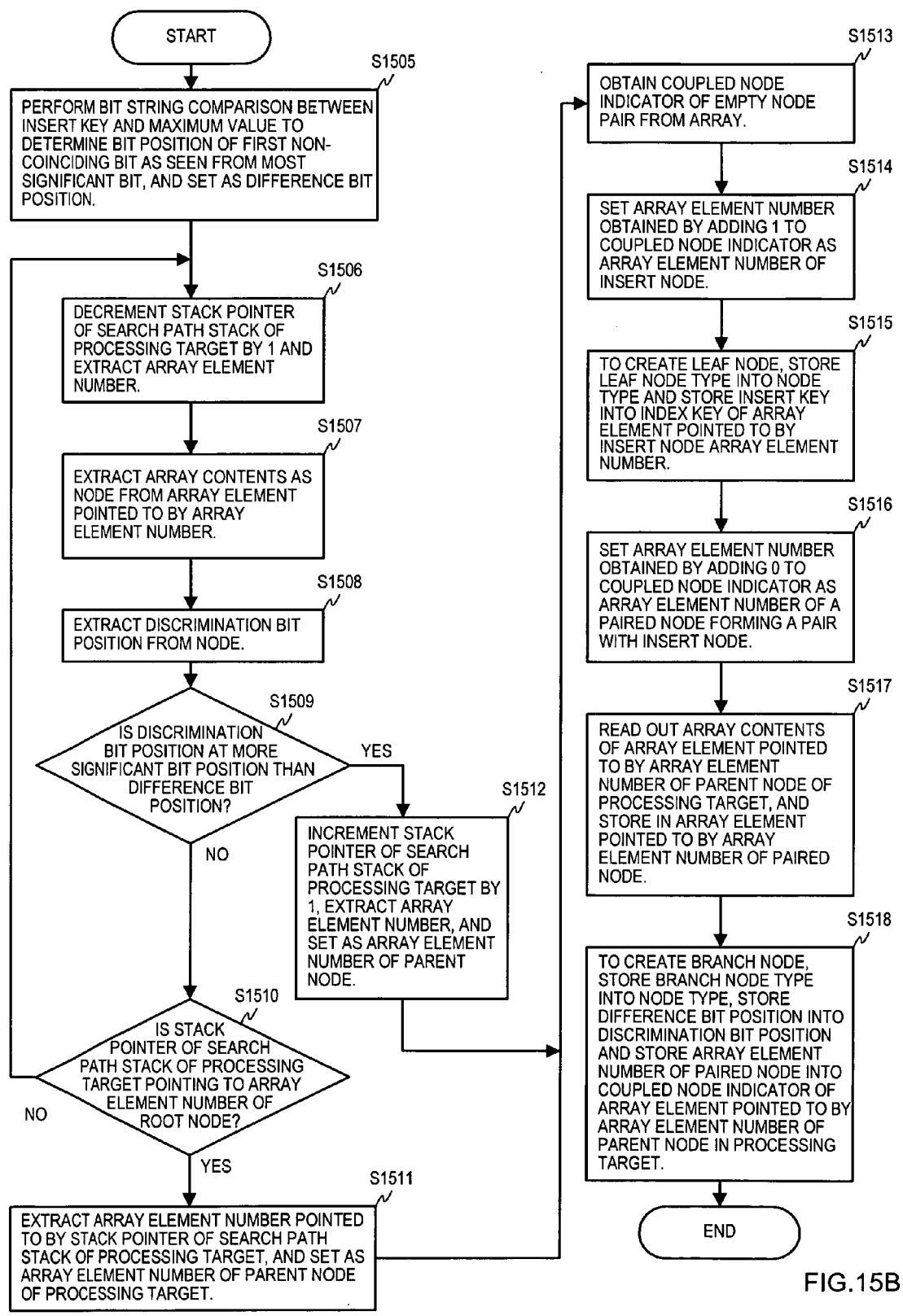
FIG. 15B is a flowchart describing the processing flow for inserting a node pair including an insertion key, into the parent node in the second embodiment.

FIG. 15B is a flowchart describing the processing for determining the parent node of the processing target into which a node pair is to be inserted and inserting a node pair including the insertion key into the parent node, corresponding to the step S1409 of FIG. 14. The flow shown in FIG. 15B is an application of the insertion processing proposed in Japanese Patent Application 2006-187872, previously filed by the applicant of the present invention, and the processing at step S1505 of comparing the insertion key and the maximum value as bit strings and determining the position of the first non-coinciding bit as seen from the most significant, 0th, bit, and the processing of setting the determined position into the area for storage of the difference bit position correspond to the processing of step S916 and step S917 shown in FIG. 9C.

After step S1505 processing proceeds to step S1506. The processing from step S1506 to step S1512 corresponds to that of step S918 to step S923 shown in FIG. 9C, and the processing from step S1513 to step S1518 corresponds to that of step S924 to S928 shown in FIG. 9C.

At step S1506, the stack pointer of the search path stack of the processing target is decremented by 1 and the array element number is extracted.

Next, at step S1507, the contents of the array element pointed to by the array element number are extracted as a node.

Next, at step S1508, the discrimination bit position is extracted from the node extracted at step S1507.

Continuing to step S1509, a comparison is performed between the difference bit position set at step S1505 and the discrimination bit position extracted at step S1508 to determine whether or not the discrimination bit position is a more significant position than the difference bit position.

As a result of this determination, if the discrimination bit position is of higher order than the difference bit position, processing proceeds to step S1512, at which the stack pointer of the search path stack of the processing target is incremented by 1 and the array element number is read out, this being set into the parent node array element number area, after which processing proceeds to step S1513.

If, however, the result of the determination at step S1509 is that the discrimination bit position is not a more significant bit position than the difference bit position, processing proceeds to step S1510.

At step S1510, a determination is made as to whether or not the stack pointer of the search path stack of the processing target is pointing to the array element number of the root node.

If the result of the determination is that the stack pointer of the search path stack of the processing target is not pointing to the array element number of the root node, return is made to step S1506.

If, however, the determination is that the stack pointer of the search path stack of the processing target is pointing to the array element number of the root node, at step S1511 the array element number pointed to by the stack pointer is extracted from the search path stack of the processing target and set into the area for storage of the array element number of the parent node of the processing target, and processing proceeds to step S1513.

At step S1513, the coupled node indicator of an empty node pair is obtained from the array.

Next, at step S1514, the array element number obtained by adding 1 to the coupled node indicator is stored in the area for storage of the array element number of the insertion node.

Next, at step S1515, in order to form a leaf node, the node type is set to leaf, and the insertion key is set as the index key and stored in the array element having the array element number set at step S1514.

Next, at step S1516, the array element number obtained by adding 0 to the coupled node indicator is stored in an area for storage of the array element number of a paired node forming a pair with the insertion node.

Next, at step S1517, the contents of the array element pointed to by the array element number of the parent node of the processing target set at step S1511 or step S1512 are read out and stored in an array element pointed to by the array element number of the paired node set at step S1516.

Next, at step S1518, to form a branch node the node type is set to branch, the difference bit position set at step S1505 is set as the discrimination bit position, the array element number of the paired node set at step S1516 is set as the coupled node indicator and stored into the array element pointed to by the array element number of the parent node of the processing target set at step S1511 or step S1512, and processing is ended.

Figure 16:
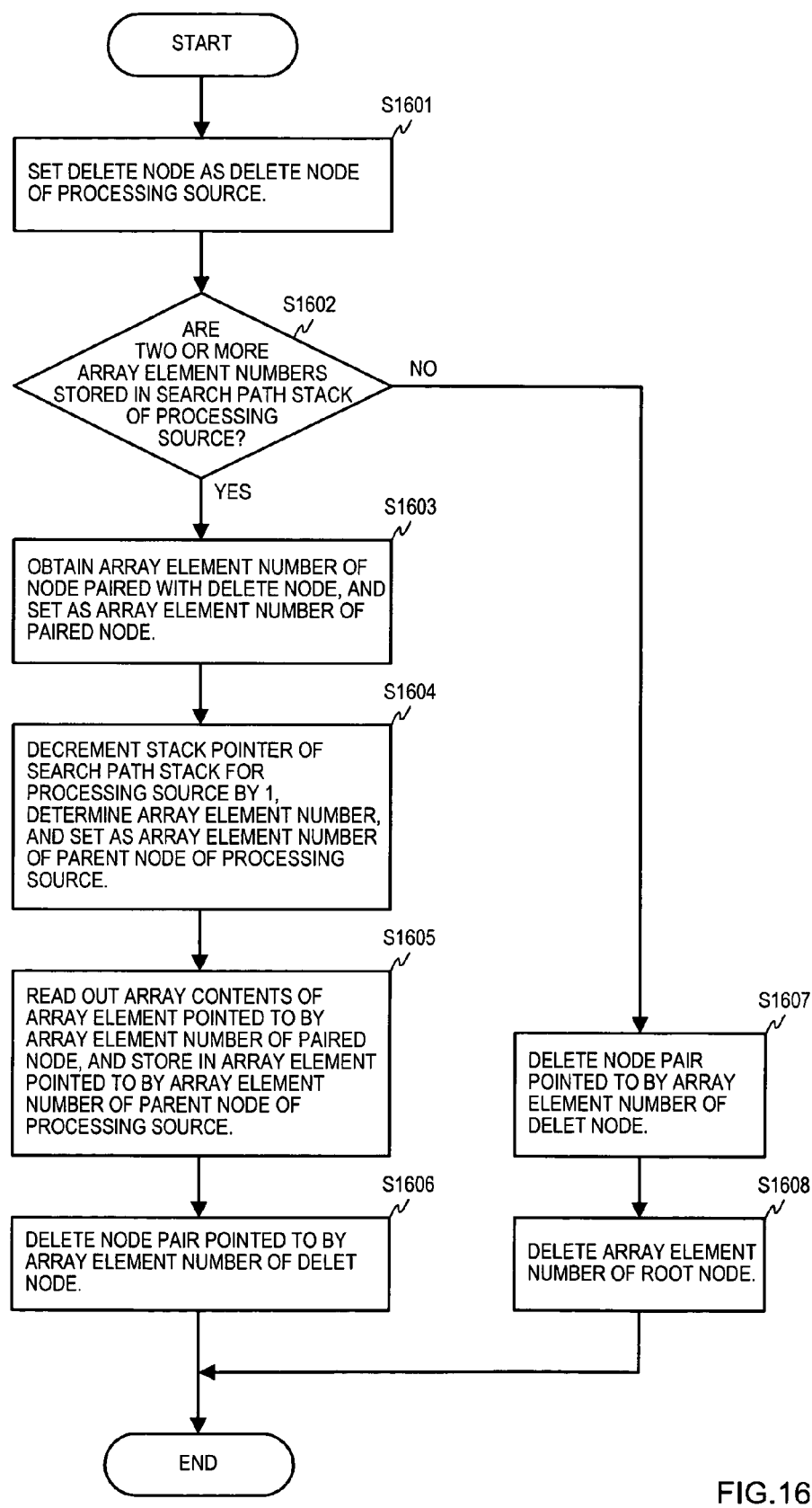
FIG. 16 is a flowchart describing the processing for deletion in the second embodiment.

FIG. 16 is a drawing showing an example of the processing flow that describes the deletion processing in the processing flow shown in FIG. 13.

The first step S1601 corresponds to step S1308 shown in FIG. 13. Because the deletion key included in the deletion node is determined by the search for the minimum value in step S1304 shown in FIG. 13, since the array element number of the array element in which the deletion key is stored is stacked on the search path stack of the processing source, that array element number is read out and set into an area for storing the deletion node.

Next, at step S1602, a determination is made as to whether or not two or more array element numbers are stored in the search path stack of the processing source. After step S1602, the processing up until step S1608 corresponds to the latter processing for deletion proposed in the Japanese Patent Application 2006-187872, which was previously filed by the applicant of the present invention.

If two or more array element numbers are not stored in the search path stack of the processing source, processing proceeds to step S1607, at which the node pair pointed to by the array element number of the deletion node set at step S1601 is deleted, and processing proceeds to step S1608, at which the array element number of the root node is deleted (that is, the registration thereof is deleted), and processing is ended.

If two or more array element numbers are stored in the search path stack of the processing source, processing proceeds to step S1603, at which the array element number of a node that forms a pair with the deletion node set at step S1601 is determined, the array element number of the paired node being set into the area for storage of the array element number of the paired node.

Next, at step S1604, the stack pointer of the search path stack of the processing source is decremented by 1 and the array element number is extracted and stored in the array element number storage area of the parent node of the processing source, which is the branch node in the immediately high order position above the deletion node.

Next, at step S1605, the contents of the array element pointed to by the array element number of the paired node set at step S1603 are read out and stored in the array element pointed to by the array element number of the parent node of the processing source set at step S1604.

Next, at step S1606, the node pair pointed to by the array element number of the deletion node is deleted, and processing is ended.

While the above is a description of tree splitting processing in the second embodiment, in the second embodiment as well, similar to the first embodiment, it is possible to perform successive deletion from the maximum index key value.

Also, similar to the case of the first embodiment, it is possible to use the processing flow of splitting for the conjoining of trees. By setting one of the two trees to be conjoined as the processing source tree and performing deletion processing of the processing source tree with the split key either equal to or larger than the maximum value or equal to or less than the minimum value of the index key of the processing source tree, the deleted node can be inserted into the processing target tree.

Third Embodiment

In contrast to the splitting processing in the above-described first embodiment and second embodiment, which is performed by insertion and deletion in units of index keys, the third embodiment to be described next is a splitting/conjoining method in which the sequential nature of the coupled node tree is utilized, and insertion and deletion are performed in units of subtrees which satisfy a prescribed condition.

Figure 17:
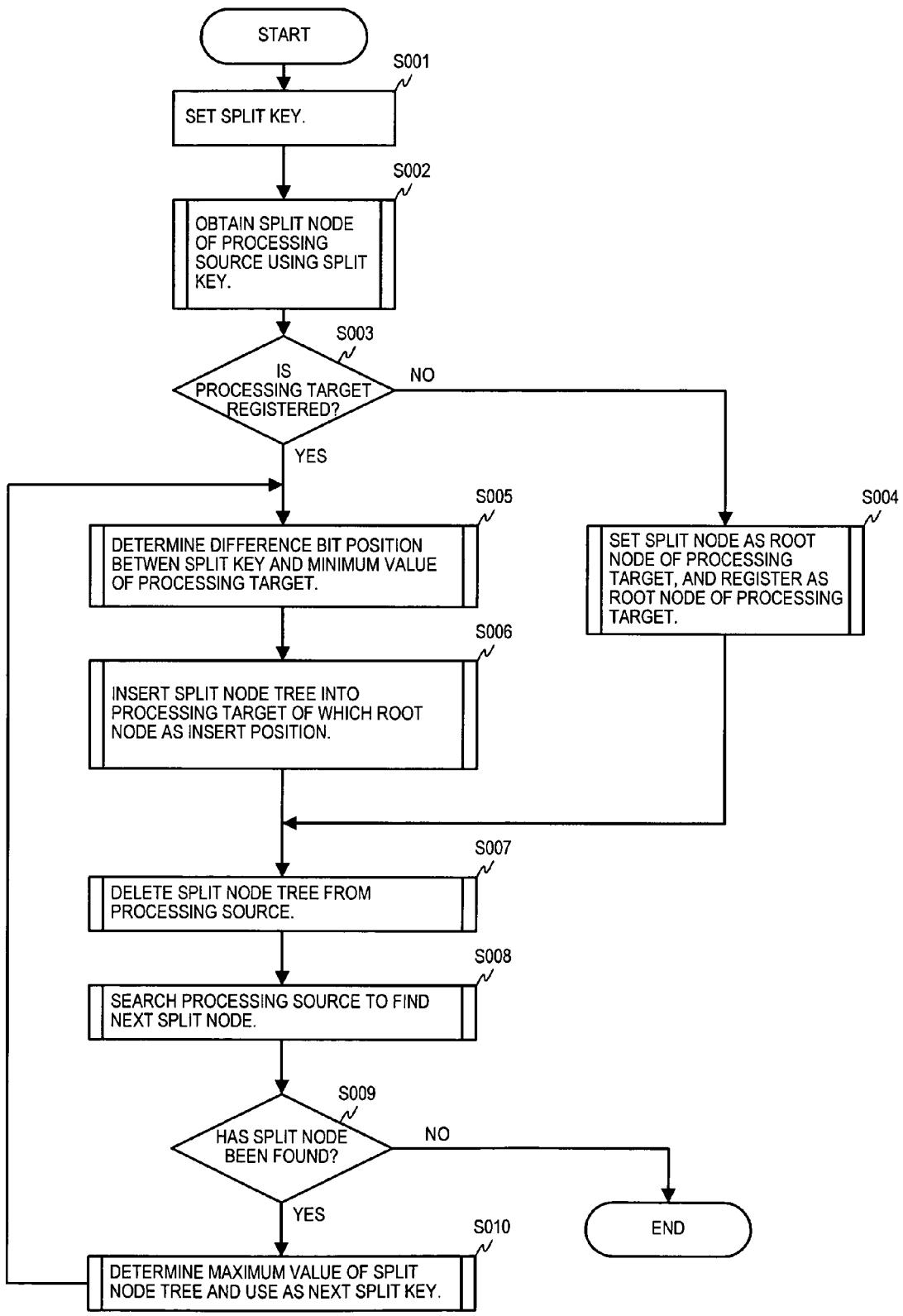
FIG. 17 is a flowchart describing the processing flow for splitting a coupled node tree in the third embodiment.
Figure 30A:
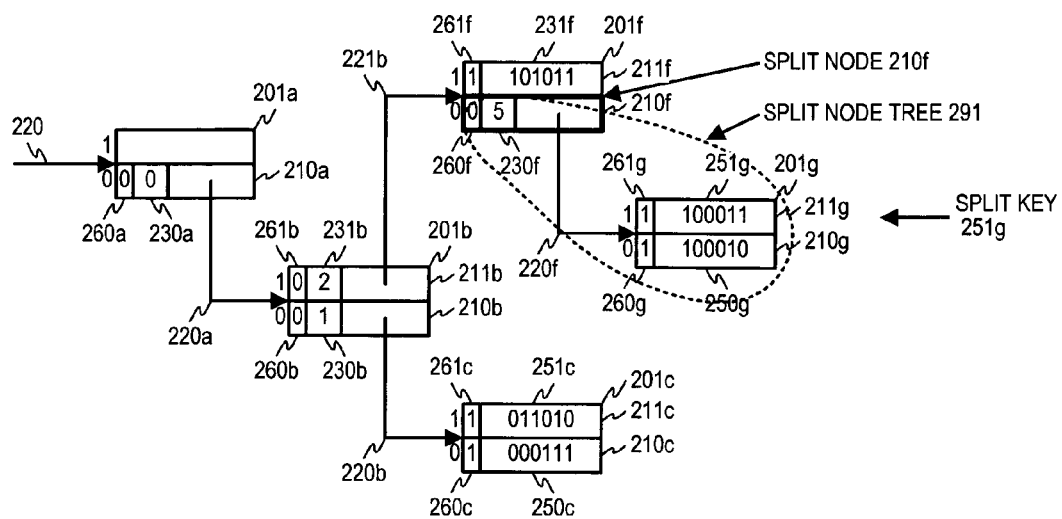
FIG. 30A is a drawing describing an example of a tree structure before splitting.
Figure 30B:
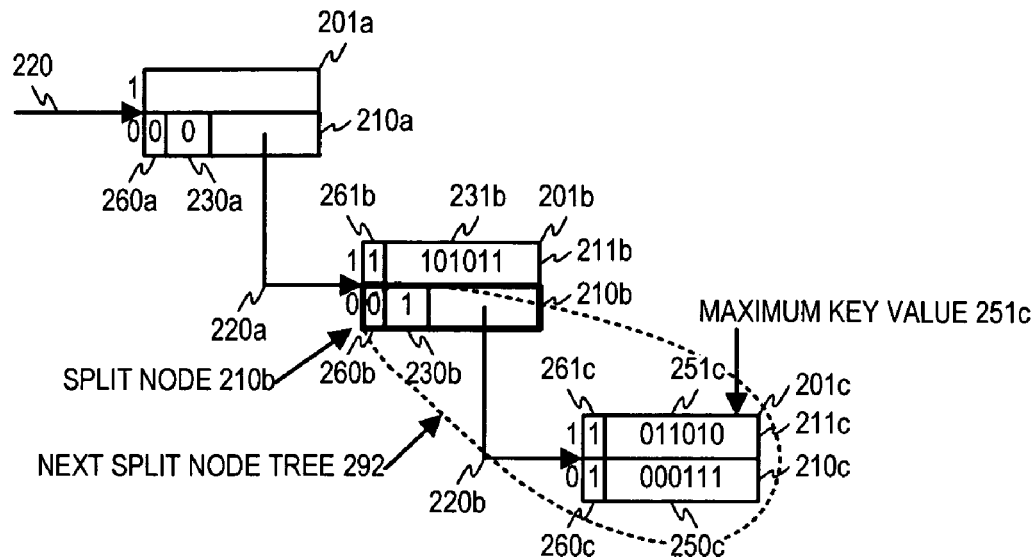
FIG. 30B is a drawing describing an example of a tree structure after the first splitting.
Figure 30B:
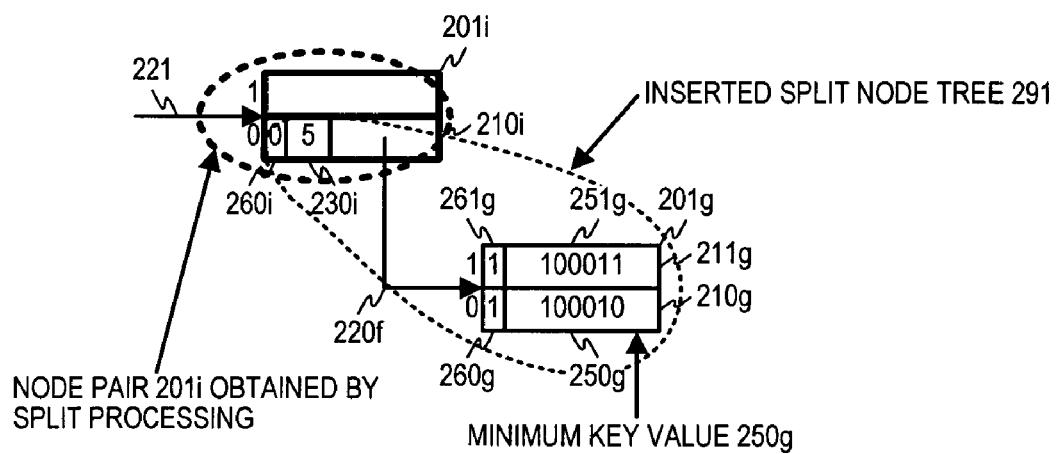
Figure 30C:
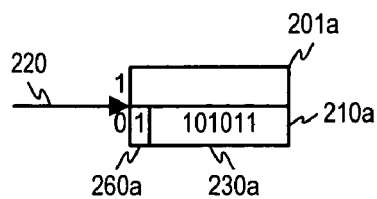
FIG. 30C is a drawing describing an example of a tree structure after the next splitting.
Figure 30C:
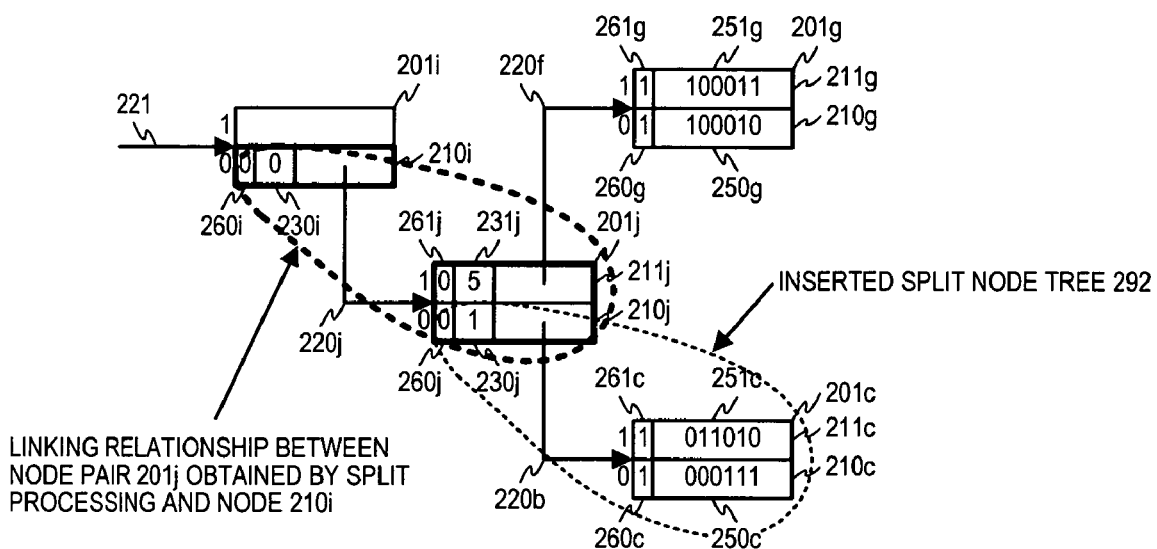

FIG. 17 is a drawing describing the splitting processing flow for a coupled node tree in the third embodiment. FIG. 30A to FIG. 30C are drawings describing the above-noted splitting processing, providing an example of a tree that is similar to the coupled node tree shown by example in FIG. 2B. FIG. 30A shows an example of the structure of the tree before splitting, FIG. 30B shows an example of the tree after the first splitting, and FIG. 30C shows an example of the structure of the tree after the next splitting.

First, as shown in FIG. 17, at step S001 the split key is obtained and set into an area for storing the split key. In the example shown in FIG. 30A, the split key is equal to the "100011" of the index key 251g of the node 211g. As noted above, although it is not necessary that the obtained split key be included in the processing source, as will be described below, it is necessary in this embodiment that the upper limit value or lower limit value be determined by the obtained split key, and that the index key included in the processing source be taken as the new split key. In the description to follow, therefore, the assumption is that the split key is included in the processing source.

Next, at step S002 the split node of the processing source is determined using the split key. The split node is the root node of the largest of the subtrees that includes the split key as the maximum value (hereinafter referred to as the split node tree). In the example shown in FIG. 30A, the node 210f is the split node, and the subtree enclosed in the dotted line is the split node tree 291. Details of the processing for determining the split node are described below with reference to FIG. 18 and FIG. 19.

Next, proceeding to step S003, a determination is made of whether or not the processing target has been registered. If it has not been registered, processing proceeds to step S004, at which the split node determined at step S002 is set as the root node of the processing target and the root node of the processing target is registered, after which processing proceeds to step S007, at which processing to delete the split node tree is executed. Details of the processing at step S004 are described below with reference to FIG. 20.

In the example shown in FIG. 30A, the splitting processing has just begun and, as shown at (b) of FIG. 30A, because the processing target does not exist and has not been registered, processing proceeds to step S004, at which setting and registration is done of the contents of the split node 210f into the primary node 210i of the node pair 201i obtained anew as the root node of the processing target. As a result, as shown at (b) of FIG. 30B, a tree of the processing target formed by the inserted split node tree 291 is generated.

The tree structure with the split node tree 291 deleted when the node 210f of the processing source is taken as the split node is shown at (a) of FIG. 30B, in which the next split node tree 292 in which the split node 210b is taken as the root node is shown enclosed in dotted lines.

If the determination at step S003 is that the registration had already been done, processing proceeds to step S005. At step S005, the difference bit position of the split node that is the maximum value of the next split node tree set at step S010 described below and the minimum value of the processing target is determined. Details of the processing to determine the difference bit position are described below with reference to FIG. 21.

In the example shown in FIG. 30B, because the maximum value of the next split node tree 292 is the index key 251c "011010," and the minimum value of the processing target is the index key 250g "100010," the difference bit position is "0."

Proceeding to step S006, the split node tree is inserted into the processing target with the root node as the insertion position, and processing proceeds to step S007.

At step S007, the split node tree is deleted from the processing source, and then, processing proceeds to step S008, at which the next split node is determined.

In the example shown at (b) of FIG. 30C, the tree structure shown is one in which the next split node tree 292 is inserted via the newly obtained node pair 201j into the processing target with the root node 210i as the insertion position. FIG. 30C (a) shows the structure in which the next split node tree 292 has been deleted from the tree structure shown in FIG. 30B (a).

Details of the split node tree insertion processing at step S006, the deletion processing at step S007, and the processing for determining the next split node at step S008 will be described later, with references made to FIG. 22, FIG. 23, and FIG. 24.

After step S008, at step S009 a determination is made as to whether or not a split node had been found at step S008. If the split node had not been found, the splitting processing is ended.

If a split node had been found, however, at step S010, the maximum value of the split node tree that is a subtree having that split node as the root node is determined and used as the next split key, and return is made to step S005, the processing to insert and delete the next split node tree and find yet the next split node being repeated.

Details of the processing of determining and taking as the next split node the maximum value of the split node at step S010 are described below with reference to FIG. 25.

In this embodiment, because the deletion and insertion processing is performed in units of split node trees as described above, the number of processing steps is reduced.

Figure 18:
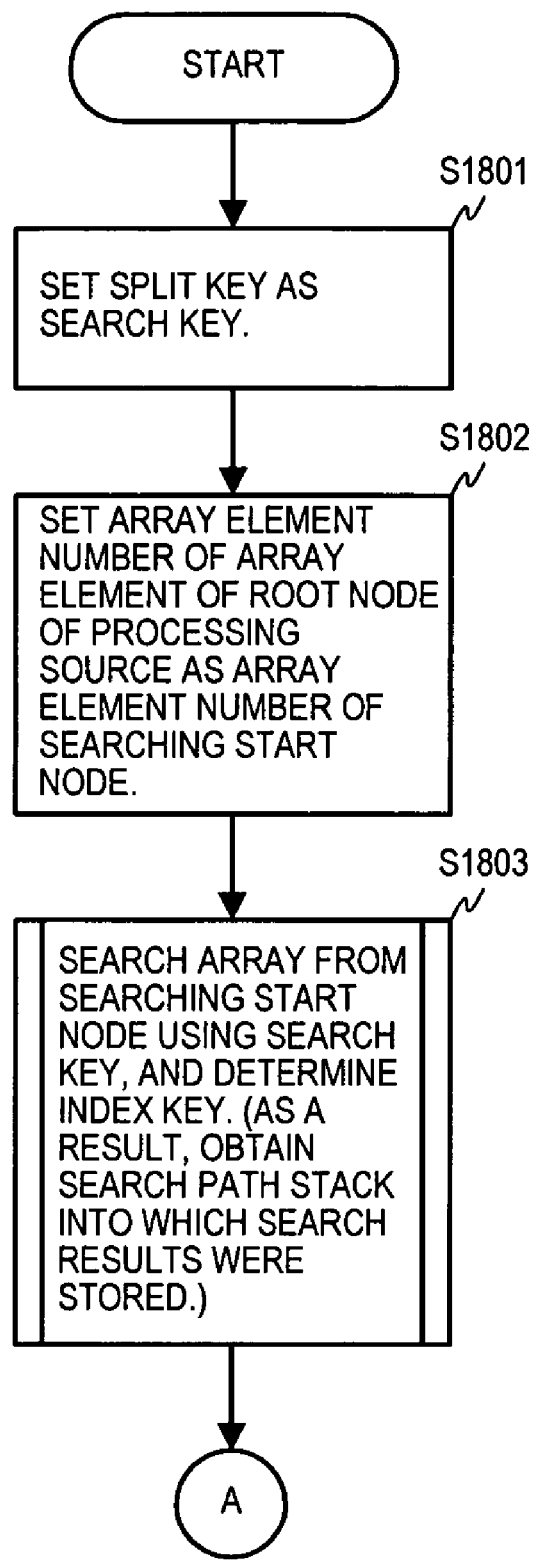
FIG. 18 is a flowchart describing the beginning stage of the processing flow for determining the first split node.
Figure 19:
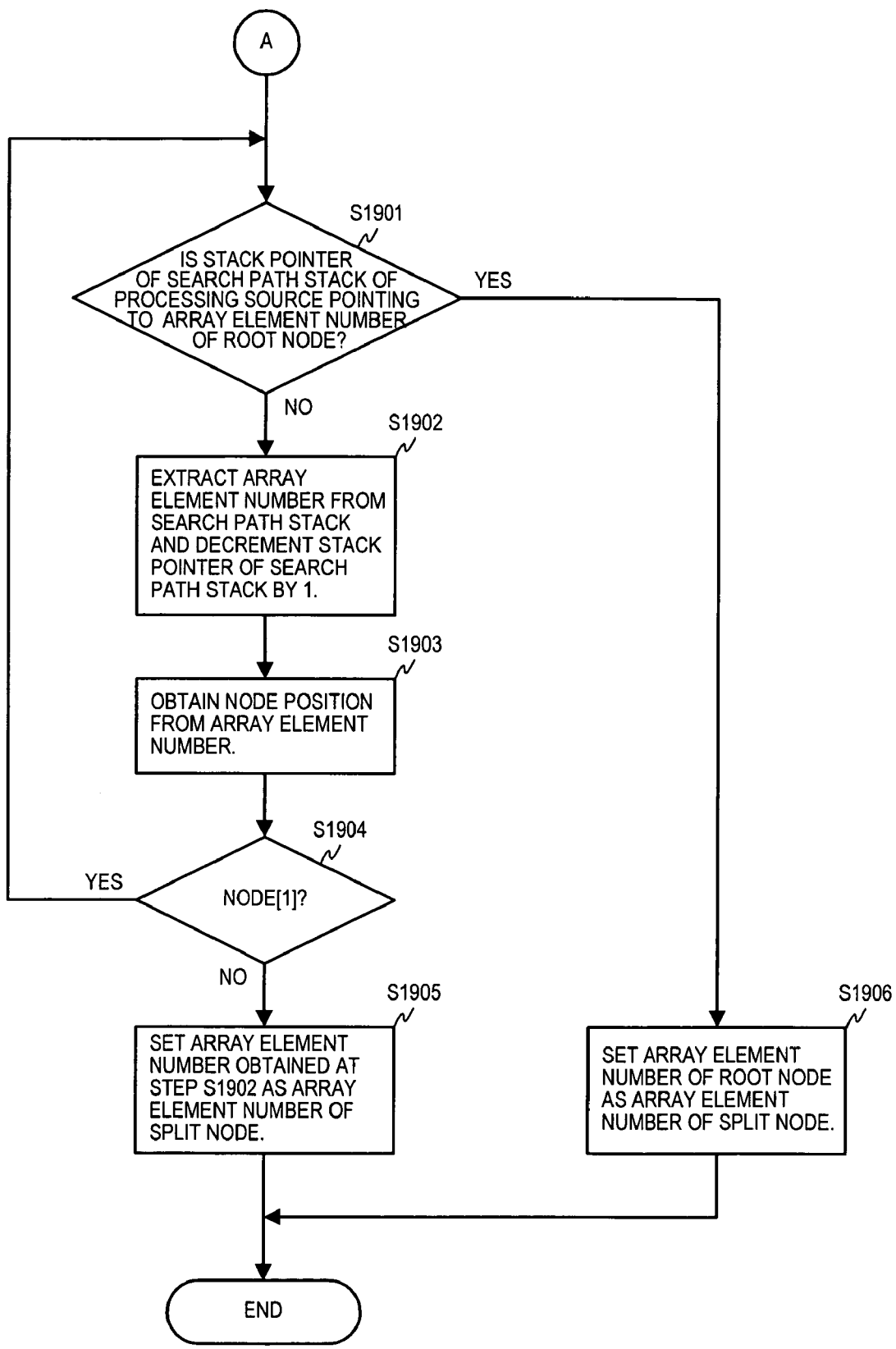
FIG. 19 is a flowchart describing the latter stage of the processing flow for determining the first split node.

Next, referring to FIG. 18 and FIG. 19, the processing to determine the split node in step S002 shown in FIG. 17 is described in detail.

FIG. 18 is a drawing describing the beginning stage of the processing flow for determining the first split node.

As shown in FIG. 18, at step S1801 the split key is set as the search key, and, at step S1802, the array element number of the array element in which the root node of the processing source is stored is set as the array element number of the searching start node.

Next, proceeding to step S1803, the search processing shown in FIG. 4 is executed, as a result of which the index key that is equal to the split key is obtained, and the beginning stage of the processing is ended, at which point processing proceeds to the latter stage of the processing shown in FIG. 19.

The latter stage of processing will be described with reference to FIG. 19, but first, referring again to FIG. 30A, the necessity in this embodiment of having the split key as an index key that is included in the processing source will be described.

Assume that the processing source shown in FIG. 30A is to be split at the split key "100001." If the search processing of step S1803 is executed with this split key, the resulting index key that is obtained is the index key 251g, "100011." This is because the index key that should be used as the splitting point is either the upper limit value "011010" stored in the leaf node 211c by the upper limit key "100001", or the lower limit value "100010" stored in the leaf node 210g by the lower limit key "100001", and in either case there is non-coincidence with the results obtained by searching with the split key "100001."

Therefore, before determining the split node, it is necessary to determine the split key as an index key that is included in the processing source, in accordance with the definition thereof.

FIG. 19 is a drawing describing the latter stage of processing flow for determining the first split node. In this latter stage of processing, the search path stack of the processing source is back-traced to determine the array element number of the first node [0], which is set as the array element number of the split node.

As shown in FIG. 19, at step S1901 a determination is made as to whether or not the stack pointer of the search path stack points to the array element number of the root node. If the stack pointer of the search path stack is pointing to the root node array element number, processing proceeds to step S1906, at which the array element number of the root node is set as the array element number of the split node and the processing is ended.

If the stack pointer of the search path stack is not pointing to the root node array element number, however, processing proceeds to step S1902, at which the array element number is extracted from the search path stack and the stack pointer is decremented by 1.

Next, at step S1903 a determination is made from the array element number extracted at step S1902 of which node side of the node pair the node in the array element having that array element number is positioned.

Then, at step S1904, a determination is made as to whether or not the node position obtained at step S1903 is node [1].

If the result of the determination is that the node position is the node [1] side, processing returns to step S1901, but if the determination is that the node position is node [0], processing proceeds to step S1905, at which the array element number extracted at step S1902 is set as the array element number of the split node, and processing is ended.

In the example shown in FIG. 30A, when the root node 210a is used as the searching start node and searching processing is executed by the split key "100011," the index key 251g is obtained as a result of the search, and the array element numbers 220, 220a+1, 221b, and 220f+1 are successively stacked onto the search path stack.

Therefore, when the first processing of step S1901 shown in FIG. 19 is performed, the stack pointer of the search path stack points to the array element number 220f+1, and by the result of the step S1904 processing returns to step S1901, and next time at the step S1904 the node position of node 210f of the once back-traced array element number 221b is determined, after which processing proceeds to step S1905, at which the array element number 221b of the node 210f is set as the array element number of the split node.

At this point, before entering into a further description of splitting processing, it will be noted that the split key is the maximum value of the split node tree, and that the split node tree is the largest subtree of the subtrees of the processing source having the split key as the maximum value or, stated differently, the subtree that has a discrimination bit position of the root node that is the highest order.

As is clear from the foregoing description, the split node is the first node [0] that is found in back-tracking the path up until the split key when searching using the split key.

If a leaf node that includes the split key as the index key is a node [0], that leaf node is the split node itself, and the split node tree is formed by only one leaf node. The index keys of the leaf nodes existing at the node [1] side that forms a pair with that leaf node, by virtue of the sequential nature of the coupled node tree, will always be larger than the split key. Therefore, in the current case, because the split key cannot be the maximum value in a subtree in which a branch node having an order that is higher than the split key is taken as the root node, the split key is the maximum value of the split node tree, and the subtree is the largest subtree of the processing source having the split key as the maximum index key value.

In the case in which the leaf node including the split key as the index key is a node [1], as long as back-tracking is done along the nodes [1] of the tree, by virtue of the sequential nature of the coupled node tree, in any subtree having a node [1] as the root node, the split key is the maximum value of these subtrees. When back-tracking is done up until a node [0], beneath any higher-order node there exists a node of lower order than the node [1] forming a pair with the above-noted node [0], and in these nodes there exists a leaf node including an index key that is larger than the above-noted split key.

Therefore, a subtree having the above-noted node [0], that is, the split node as the root node is the largest subtree including the split key as the maximum value.

The description of the splitting processing is continued below, with reference made to FIG. 20 and thereafter.

Figure 20:
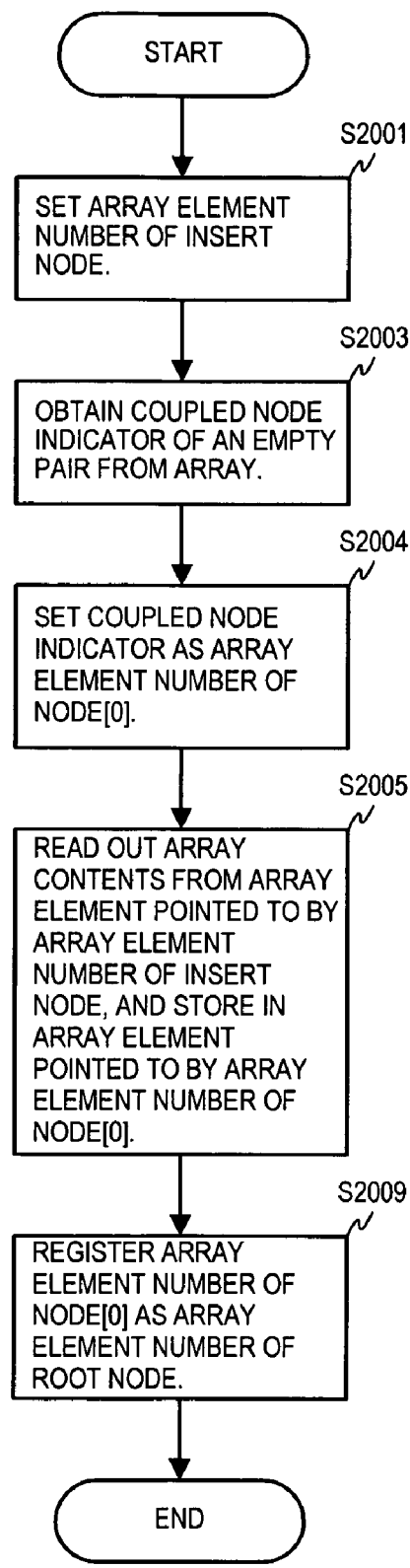
FIG. 20 is a flowchart describing the processing flow for insertion of a root node of the processing target.

FIG. 20 is a drawing describing the processing flow for inserting the root node of the processing target at step S004 shown in FIG. 17. At step S2001, the array element number of the array element into which the split node determined at step S002 in the processing flow shown in FIG. 17 is set as the array element number of the insertion node.

Next, at step S2003, the coupled node indicator of an empty node pair is obtained from the array.

Next, at step S2004, the coupled node indicator obtained at step S2003 is set as the array element number of the node [0].

Next, at step S2005, the contents of the array element pointed to by the array element number of the insertion node set at step S2001 are read out and stored in the array element pointed to by the array element number of the node [0] set at step S2004.

Finally, at step S2009, the array element number of the node [0] is registered as the array element number of the root node of the processing target, and the root node insertion processing is ended.

In the example shown in FIG. 30A and FIG. 30B, the array element number 221b of the array element into which is stored the split node 210f is set as the array element number of the insertion node, and the coupled node indicator 220' of the empty node pair 201i that is obtained is set as the array element number of node [0].

Then, the contents of the array element pointed to by the array element number 221b, that is, the contents of the split node 210f, are stored in the array element pointed to by the array element number 220', that is, into node 210i, and the array element number 220' is registered as the array element number of the root node of the processing target.

Figure 21:
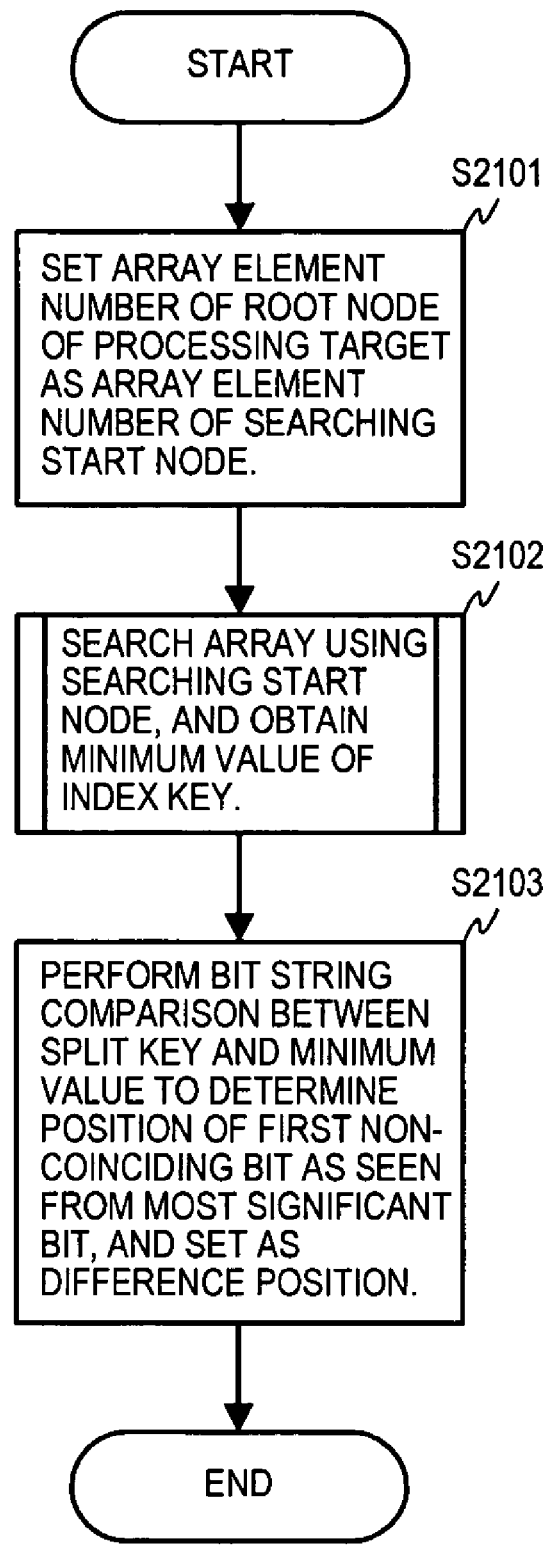
FIG. 21 is a flowchart describing the processing flow for determining the difference bit position in the splitting processing.

FIG. 21 is a drawing that describes the processing flow in step S005 shown in FIG. 17 for determining the difference bit position using the split key and the minimum value of the processing target.

As shown in FIG. 21, at step S2101 the array element number of the root node of the processing target is set as the array element number of the searching start node.

Next, at step S2102, the minimum value search shown in FIG. 5 is executed, and the minimum value of the index key of the processing target is obtained.

Next, at step S2103, the split key set at step S010 shown in FIG. 17 and the minimum value obtained at step S2103 are compared as bit strings to determine the first non-coinciding bit position as seen from the uppermost order 0th bit, which is set as the difference bit position.

Although in the above-noted step S2101, the array element number of the root node of the processing target is set as the array element number of the searching start node, because it is clear that the split node tree that is inserted last into the processing target includes the minimum value of the processing target, it is possible to set the array element number of the last inserted split node, for example, the array element number 220j of the node 210j at the processing target indicated by example in FIG. 30C at (b), as the array element number of the searching start node, to reduce the amount of processing for searching for the minimum value.

Figure 22:
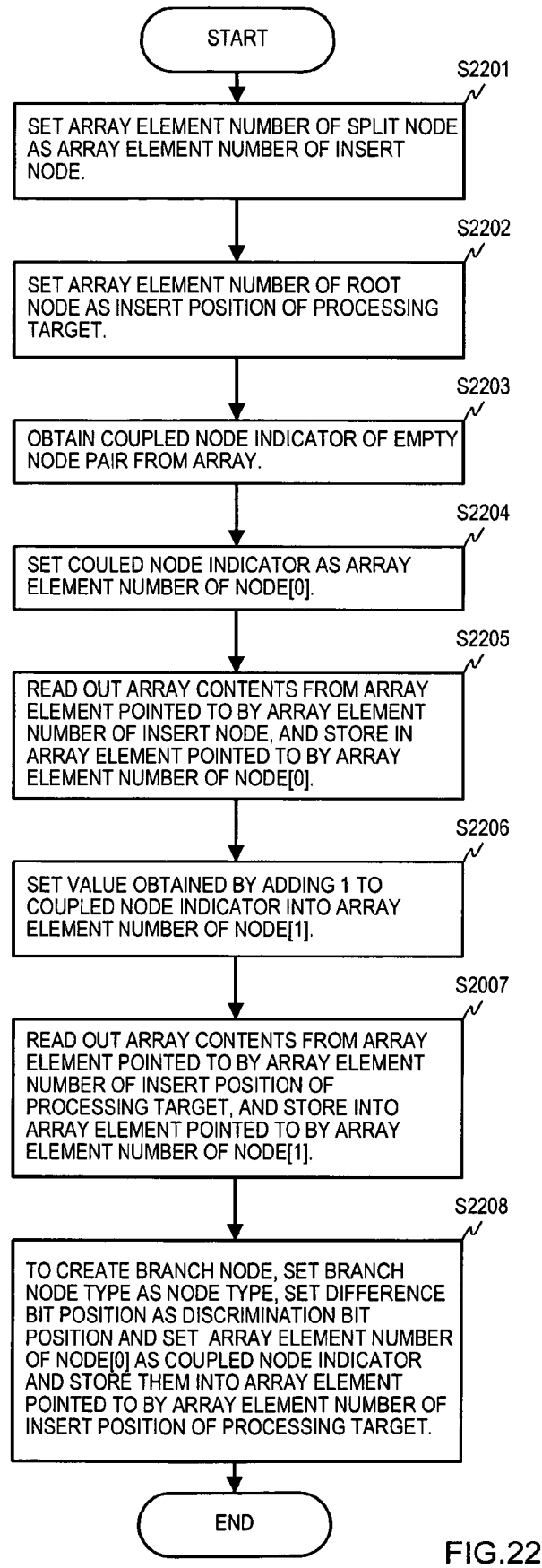
FIG. 22 is a flowchart describing the processing flow for insertion processing other than the root node.

FIG. 22 is a drawing describing the processing flow for insertion into a processing target of other than a root node in step S006 of FIG. 17.

First, at step S2201, the array element number of the array element in which is stored the split node determined at step S008 of the processing flow shown in FIG. 17 is set as the array element number of the insertion node. This step S2201 differs from step S2001 shown in FIG. 20 in that the processing step of the determination of the split node is step S008.

Next, at step S2202, the root node array element number is set as the insertion position of the processing target.

The next steps S2203 to S2205 are similar to the step S2003 to step S2005 for processing to insert a root node as shown in FIG. 20.

At step S2203, the coupled node indicator of an empty node pair is obtained from the array, and at the next step S2204, the coupled node indicator obtained at step S2203 is set as the array element number of the node [0], and then at step S2205 the contents of the array element pointed to by the array element number of the insertion node set at step S2201 are stored in the array element pointed to by the array element number of the node [0] set at step S2204.

Next, proceeding to step S2206, the value obtained by adding 1 to the coupled node indicator obtained at step S2203 is set as the array element number of the node [1].

Next, at step S2207, the contents of the array element pointed to by the array element number of the insertion position of the processing target set at step S2202 are read out and stored into the array element pointed to by the array element number of the node [1] set at step S2206.

Finally, at step S2208, the node type is set to branch, the difference bit position determined at step S005 shown in FIG. 17 is set as the discrimination bit position, and the array element number of the node [0] set at step S2204 is set as the coupled node indicator, thereby forming a branch node, and stored into the array element pointed to be the array element number of the insertion position of the processing target set at step S2202, and the processing is ended.

In the example shown in FIG. 30B and FIG. 30C, the array element number 220a of the array element in which the split node 210b is stored is set as the array element number of the insertion node, and the array element number 220' of the root node 210i is set as the insertion position of the processing target. The coupled node indicator 220j of the obtained empty node pair 201j is set as the array element number of the node [0].

Then, the contents of the array element pointed to by the array element number 220a of the insertion node, that is, the contents of the split node 210b are stored into the array element pointed to by the array element number of the node [0], that is, into the node 210j.

The contents of array element pointed to by the array element number 220' of the insertion position of the processing target, that is, the contents of the root node 210i shown in FIG. 30B at (b) are stored into the array element pointed at by the array element number 220j+1 obtained by adding 1 to the coupled node indicator 220j, that is into the node 211j.

The difference bit position "0" between the index key 251c, "011010," which is the maximum value of the split node tree 292 as described earlier by example with reference to S005 of FIG. 17, and the index key 250g, "100010," which is the minimum value of the processing target is stored in the discrimination bit position 230i of the root node 210i shown at (b) in FIG. 30C.

As is understood from the foregoing description, the insertion processing after the insertion target is generated inserts a node pair formed by branch nodes immediately below the root node in the processing target, and makes connection to the subtree below the root node of the processing target already existing below the node [1] of that node pair, connecting the split node tree to the node [0]. It is clear that, by this processing, that the sequential nature of the processing target after the insertion of the split node tree is maintained.

Figure 23:
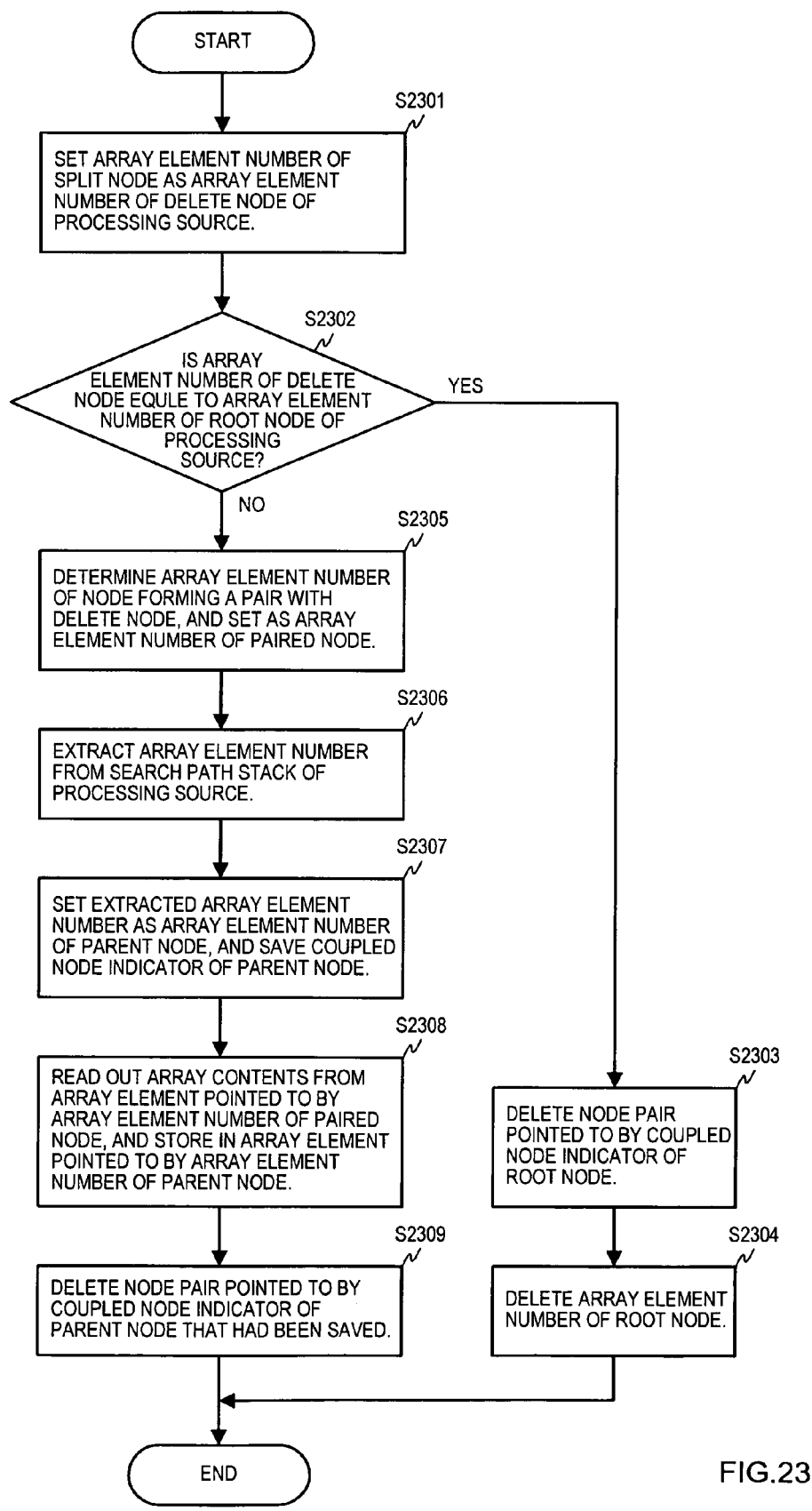
FIG. 23 is a flowchart describing the processing flow for deletion processing in the third embodiment.

FIG. 23 is a drawing describing the processing flow for deleting a split node tree in step S007 shown in FIG. 17. Although there is similarity in that this is deletion processing, there is the difference that, in contrast to the deletion of the deletion node, which is a leaf node stored in the deletion key in the deletion processing of FIG. 16, what is shown in FIG. 23 is basically deletion of a split node that is a branch node, in which the split node tree having its root node as the split node is deleted from the processing source.

First, at step S2301, the array element number of the split node determined at either step S002 or step S008 shown in FIG. 17 is set as the array element number of the deletion node of the processing source.

Next, a determination is made as to whether or not the array element number of the deletion node set at step S2301 coincides with the array element number of the root node of the processing source. If the array element number of the deletion node coincides with the array element number of the root node of the processing source, processing proceeds to step S2303, at which the node pair pointed to by the coupled node indicator of the root node of the processing source is deleted, and at the next step S2304, the registration of the array element number of the root node of the processing source is deleted and the processing is ended.

If the result of the determination processing at step S2302 is that the array element number of the deletion node does not coincide with the array element number of the root node of the processing source, processing proceeds to step S2305, at which the array element number of the node that forms a pair with the deletion node set at step S2301 is determined and set as the array element number of the paired node.

Next, at step S2306, the array element number is extracted from the search path stack of the processing source, and the extracted array element number is set as the array element number of the parent node at step S2307 and the coupled node indicator of the parent node is saved. By the processing of step S1902 shown in FIG. 19 or the processing of step S2402 shown in FIG. 24 that is explained below, the array element number of the parent node, which is immediately higher in order than the split node, is stored in search path stack of the processing source.

Next, at step S2308, the contents of the array element pointed to by the array element number of the paired node set at step S2305 are read out and stored in the array element pointed to by the array element number of the parent node set at step S2307.

Finally, at step S2309, the node pair pointed to by the coupled node indicator of the parent node saved in step S2307 are deleted, and processing is ended.

Figure 24:
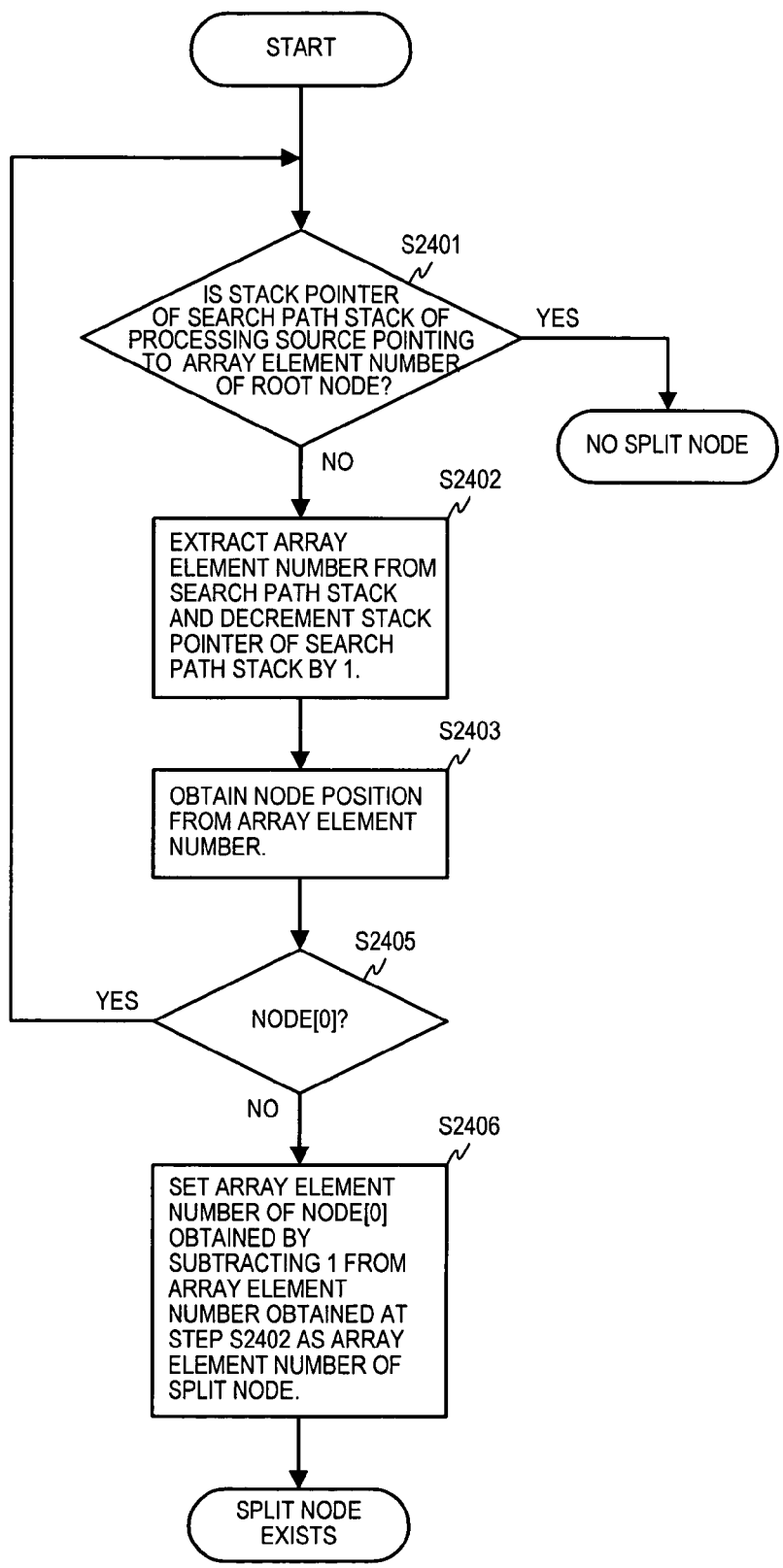
FIG. 24 is a flowchart describing the processing flow for determining the next split node.

FIG. 24 is a drawing describing the processing flow for determining the next split node at step S008 shown in FIG. 17.

At step S2401, a determination is made as to whether or not the stack pointer of the search path stack of the processing source points to the array element number of the root node. If the stack pointer of the search path stack of the processing source is pointing to the array element number of the root node, "no split node" is returned.

If the stack pointer of the search path stack of the processing source is not pointing to the array element number of the root node, however, processing proceeds to step S2402, at which the array element number is extracted from the search path stack and the stack pointer of the search path stack is decremented by 1.

Next, proceeding to step S2403, the node position of the node stored in the array element pointed to by that array element number extracted at step S2402 is obtained from that array element number.

Next, at step S2404, a determination is made as to whether or not the node position obtained at step S2403 is the node [0] side. If it is the node [0] side, return is made to step S2401. However, if it is the node [1] side, processing proceeds to step S2406, at which the array element number of the node [0] obtained by subtracting 1 from the array element number extracted at step S2402 is set as the array element number of the split node, and "split node exists" is returned.

In the example shown in FIG. 30A and FIG. 30B, at the stage of determining the next split node, because the stack pointer of the search path stack of the processing source points to 220a+1, which is the array element number of the parent node of the split node 210f and the node position is the node [1] side, the node 210b positioned at the node [0] side that forms a pair therewith is the next split node, and 220a, which is the array element number of the array element stored therein, is set as the array element number of the split node.

Also, in the example shown in FIGS. 30B and 30C, at the stage of further determining the next split node, because the stack pointer of the search path stack of the processing source points to the array element number 220 of the root node 210a, which is the parent node of the node 210b, the result of the determination made at step S2401 is the return of "no split node." That is, when the parent node of the split node becomes the root node, a next split node does not exist. This is only natural, by virtue of the sequential nature of the coupled node tree.

Figure 25:
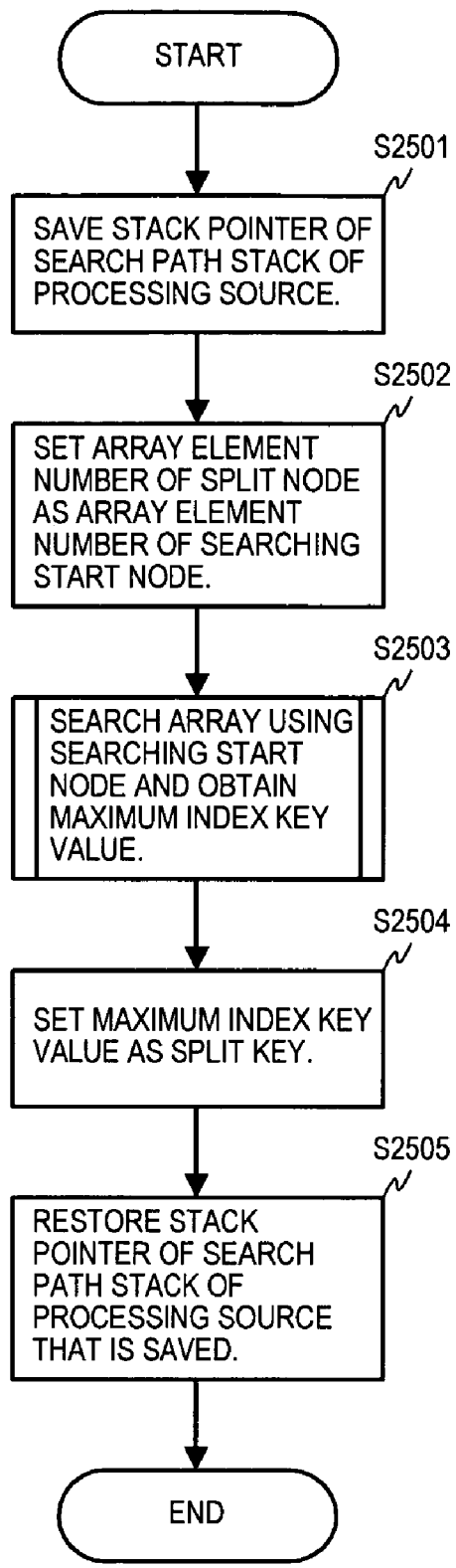
FIG. 25 is a flowchart describing the processing flow for determining the maximum value of a split node tree and setting as the split key.

FIG. 25 is a drawing describing the processing flow for step S010, which determines the maximum value of the split node tree having, as the root node, the split node determined at step S008 shown in FIG. 17 and takes the maximum value as the next split key.

First, at step S2501, the stack pointer of the search path stack of the processing source is saved. The reason for doing this is that the value of the stack pointer of the processing source that points to the array element number of the parent node of the split node according to the processing of step S1902 in FIG. 19 or the processing of step S2402 in FIG. 24 changes because of the maximum value search at step S2503, to be described below, making it unusable in step S2306 shown in FIG. 23.

Next, at step S2502, the array element number of the split node set at step S2406 in FIG. 24 is set as the array element number of the searching start node.

Then, at step S2503, the search for the maximum value shown in FIG. 6 is executed, and the maximum value of the index key is determined.

Next, proceeding to step S2504, the maximum value obtained at step S2503 is set as a split key.

Finally, at step S2505, the value that is saved at step S2501 is restored as the value of the stack pointer of the search path stack of the processing source, and processing is ended.

As can be seen from the above-described detailed description with reference to FIG. 24 and FIG. 25, the relationship between the next split node determined at step S008 of FIG. 17 and the next split key determined at step S010 is similar to the earlier-described relationship between the split key set at step S001 and the split node or the split node tree determined at step S002.

It is obvious that the next split key determined at step S010 is the maximum value of the split node tree having the next split node determined at step S008 as its root node. It is also clear, from the sequential nature of the coupled node tree, that because the next split node determined at step S008 is the node [0], a subtree having a root node that is higher in order includes a leaf node into which is stored an index key that is larger than the next split key determined at step S010.

The foregoing is a description of the details of the processing for splitting a coupled node tree according to the third embodiment, according to which splitting processing is performed in units of split node trees. That is, a split node is separated from the processing source, and the paired node of the split node is copied into the parent node, so that the split node tree is deleted from the processing source, the split node being inserted into the processing target, thereby completing the split node tree insertion.

Therefore, as long as the same array is used, processing with regard to nodes other than the split node is unnecessary, resulting in a yet smaller number of executed processing steps than in the case of the second embodiment.

Next, processing for conjoining a coupled node tree according to the third embodiment, which performs processing in units of subtrees, similar to the case of splitting processing will be described. In the conjoining processing of this embodiment, which differs greatly from the conjoining processing of the first embodiment and the second embodiment, in contrast to the conjoining processing of the first embodiment and the second embodiment, in which the conjoining processing is performed in units of index keys or, stated differently, in units of nodes, in the conjoining processing of the third embodiment, units of subtrees satisfying a prescribed condition are split from the processing source and conjoined with the processing target. In contrast with the first embodiment and the second embodiment, in which the split key is selected to enabling application of splitting processing as is, if conjoining processing is done in units of subtrees, as is done in this embodiment, simple application of splitting processing is not possible.

This is because each of the processing source and the processing target have internal structures that are dependent upon the different bit positions of the index keys stored therewithin, and it is not necessarily possible to insert the processing source itself as is into the processing target as a split node tree.

Figure 26:
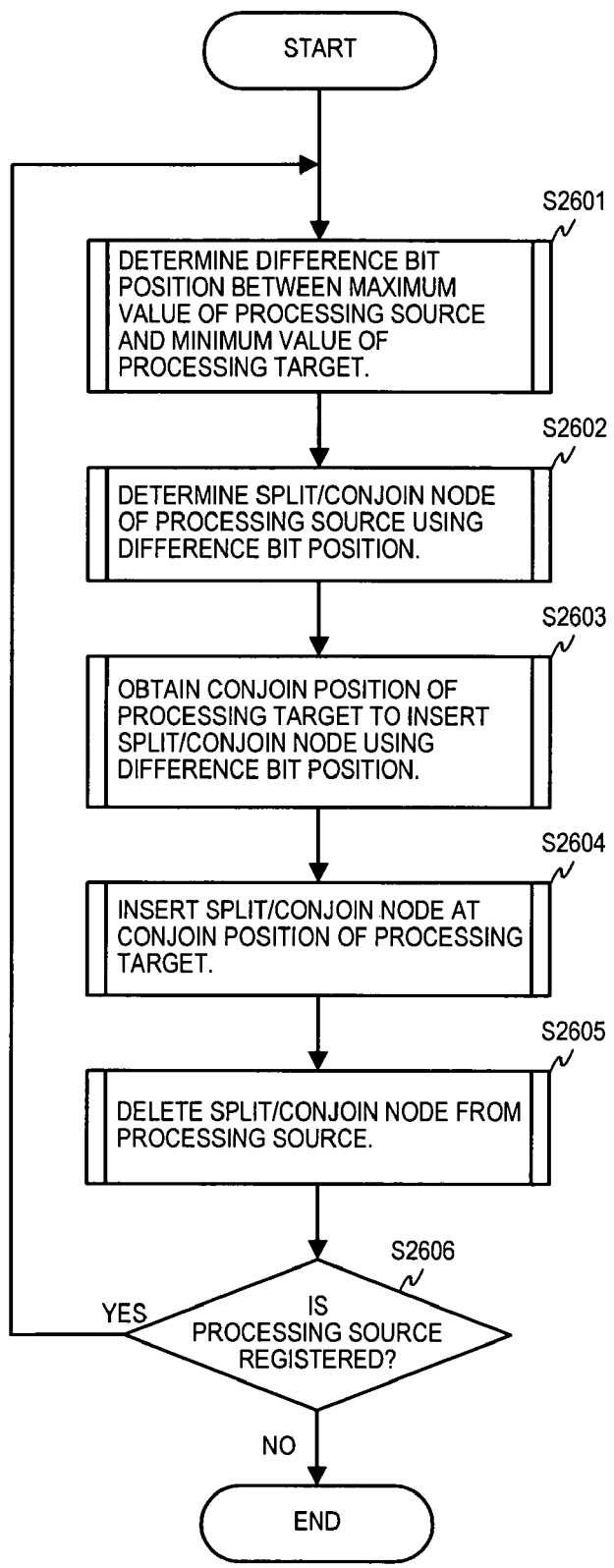
FIG. 26 is a flowchart describing in general the processing flow for conjoining a coupled node tree in the third embodiment.

FIG. 26 is a drawing describing the processing flow for conjoining a coupled node tree in the third embodiment. In the description that follows, although the index key of the processing target is taken to be larger than the index key of the processing source, it can be easily understood from the description to follow that it is possible to perform the same type of processing in the reverse case.

Figure 31A:
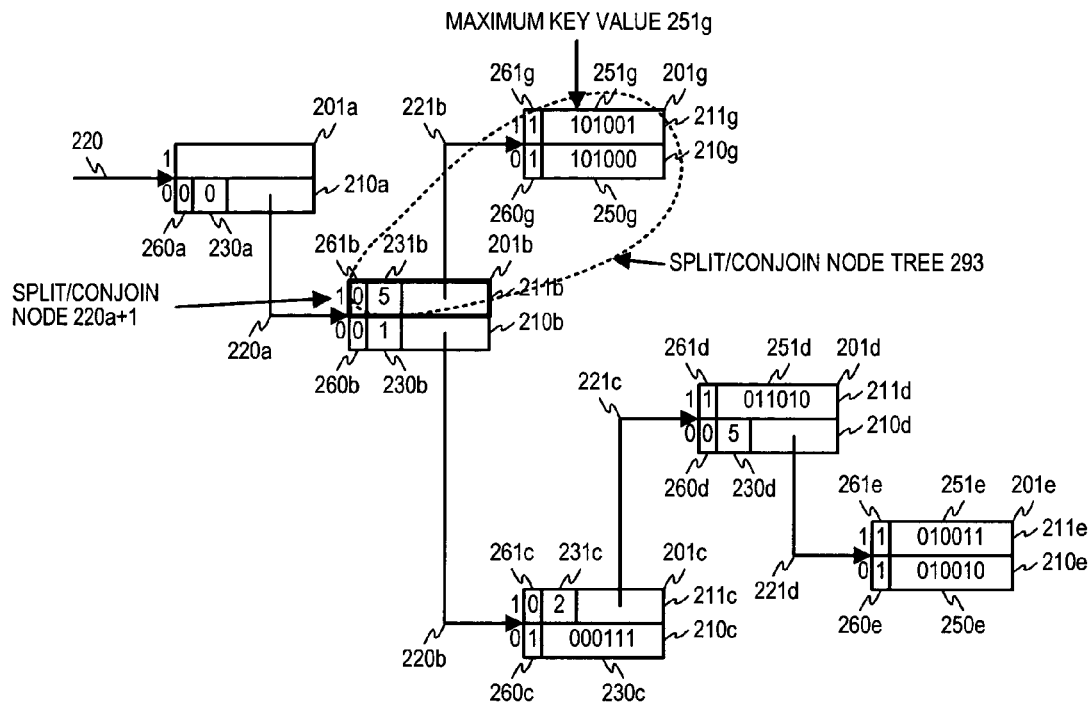
FIG. 31A is a drawing describing an example of a tree structure before the first conjoining processing.
Figure 31A:
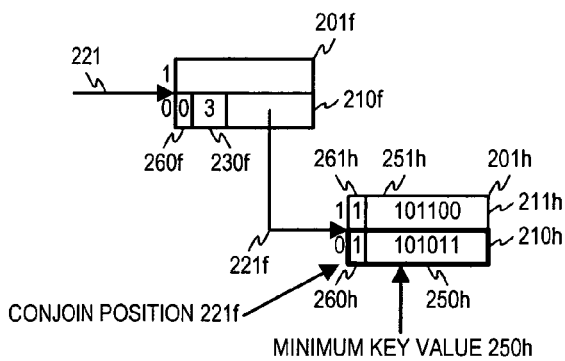
Figure 31B:
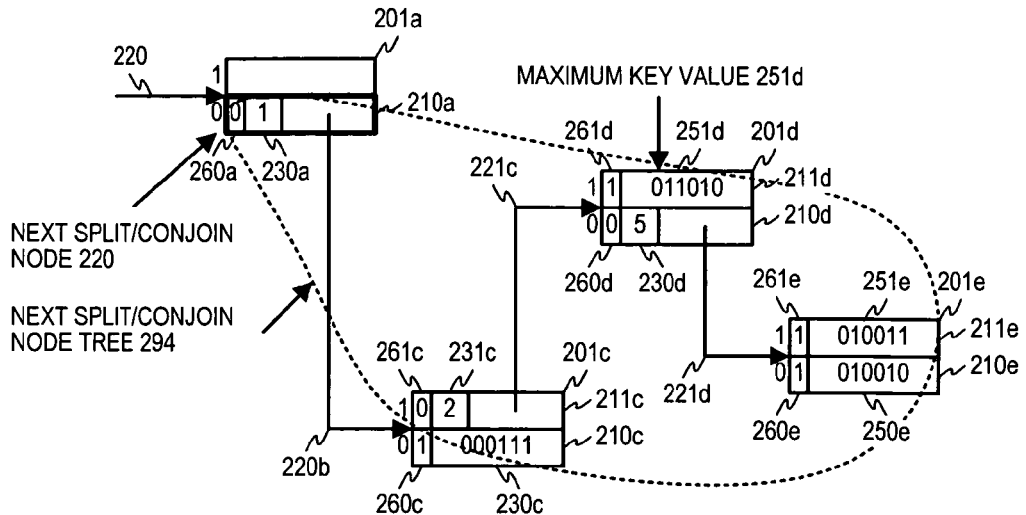
FIG. 31B is a drawing describing an example of a tree structure after the first conjoining processing.
Figure 31B:
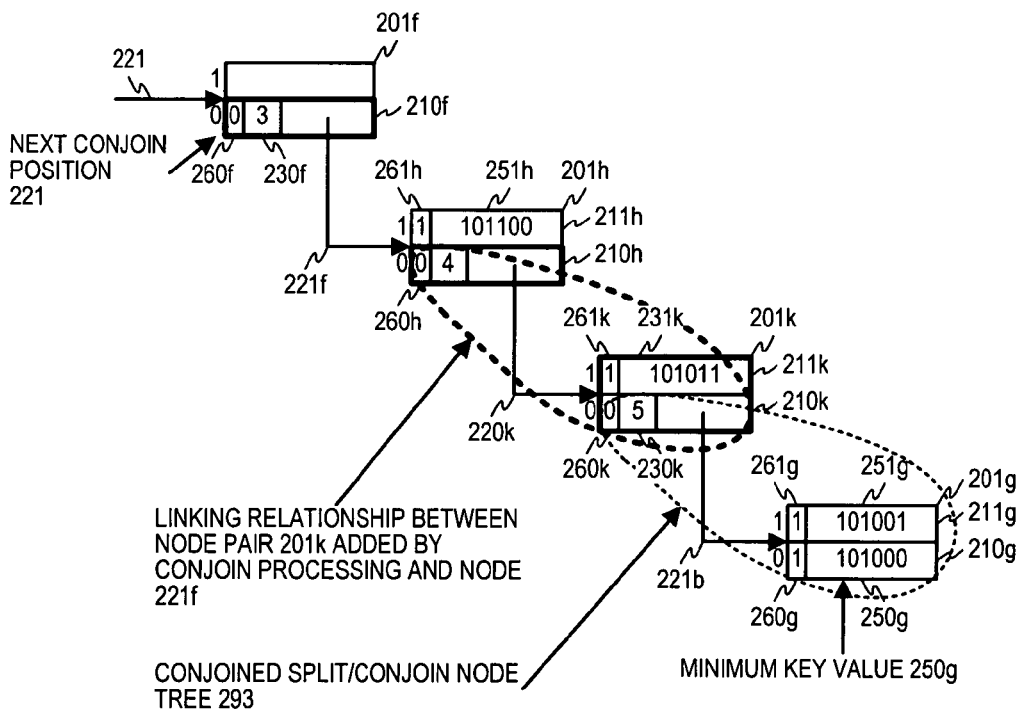
Figure 31C:
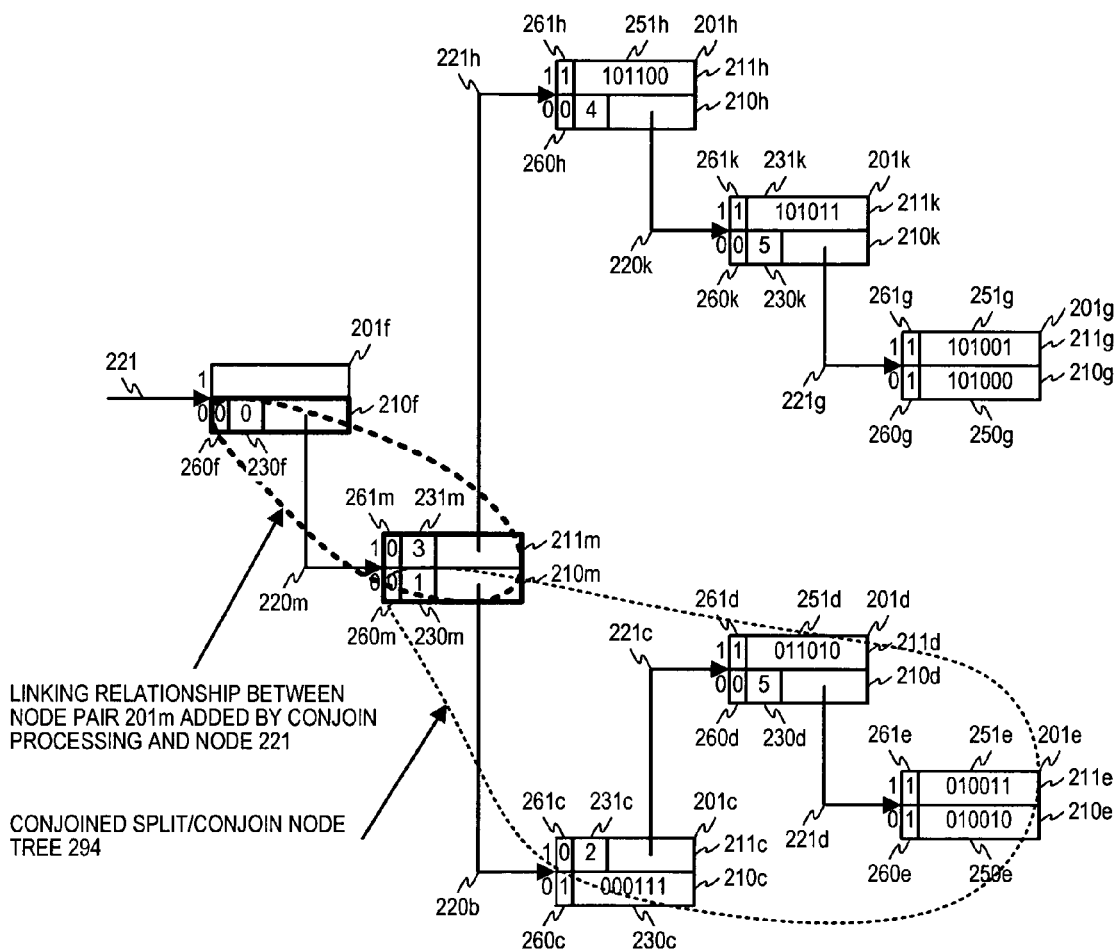
FIG. 31C is a drawing describing an example of a tree structure after the next conjoining processing.

FIG. 31A to FIG. 31C are drawings describing an actual example of the above-noted conjoining processing, in which a tree having a structure similar to the subtree of the coupled node tree shown by example in FIG. 2B is shown as an example.

FIG. 31A is a drawing showing an example of the tree structures of the processing source and the processing target before the start of the conjoining processing. At (a) of FIG. 31A is shown an example of a processing source. There are shown a split/conjoin node to which its array element number's reference numeral 220a+1 is applied and a subtree having that node as its root node, the split/conjoin node tree 293 that is the subtree that is the unit of conjoining processing. Hereinunder, the reference numeral showing a node is sometimes expressed as the array element number of the array element at which that node is located, which is stacked on the search path stack when that node is traversed when search processing is done on that node.

At (b) of FIG. 31A is shown an example of a processing target, in which the node that is the conjoining position has the reference numeral 221f applied thereto. FIG. 31A shows that the maximum value of the processing source is the index key 251*g*, "101001," and also that the minimum value of the processing target is the index key 250*h*, "101011."

FIG. 31B is a drawing showing the tree structure in which the split/conjoin node tree 293 shown in FIG. 31A is inserted into the processing target and deleted from the processing source. At (a) of FIG. 31B, the next split/conjoin node tree 294 of the processing source is shown enclosed in a dotted line, and the maximum value is shown to be the index key 251*d*, "011010." At (b) of FIG. 31B, the split node tree 293 conjoined to the processing target and the linking relationships between the node pair 201*k* added by the conjoining processing and the node 221*f* are each shown enclosed in dotted lines, the next conjoining position shown to be the node 221.

FIG. 31C is a drawing showing the tree structure of the split/conjoin node tree 294 shown in FIG. 31B inserted into the processing target and deleted from the processing source. Because the next split/conjoin node 220 of the processing source shown at (a) of FIG. 31B is the root node, the root node of the processing source is deleted, and therefore nothing is shown at (a) of FIG. 31C. At (b) of FIG. 31C, the linking relationships between the split node tree 294 conjoined to the processing target, the node pair 201*m* added by the conjoining processing, and the node 221 are each shown enclosed by dotted lines.

The conjoining processing in this embodiment is generally described below, with references made to FIG. 26 and FIG. 31A to FIG. 31C.

At step S2601 in FIG. 26, the difference bit position between the maximum value of the processing source and the minimum value of the processing target is determined. In the example shown in FIG. 31A, the difference bit position 4 is determined between the maximum value of the processing source, "101001," and the minimum value of the processing target, "101011." The details of the processing to determine the difference bit position are described later, with reference made to FIG. 27. In the description to follow, the difference bit position determined at step S2601 will sometimes be referred to simply as the difference bit position.

Next, at step S2602, the split/conjoin node of the processing source is determined using the difference bit position determined at step S2601. In the example shown in FIG. 31A, the determination is the split/conjoin node 220*a*+1. The details of this processing are described later, with reference made to FIG. 28.

Next, proceeding to step S2603, the difference bit position determined at step S2601 is used to determine the conjoining position of the processing target for inserting the split/conjoin node determined at S2602. In the example shown in FIG. 31A, the conjoining position 221*f* is determined. The details of this processing are described later, with reference made to FIG. 29.

Next, at step S2604, the split/conjoin node determined at step S2602 is inserted at the conjoining position determined at step S2603. This processing is implemented in the insertion processing described with reference to FIG. 22 by setting the array element number of the split/conjoin node determined at step S2602 as the array element number of the insertion node in step S2201, and setting the array element number of the conjoining position determined at step S2603 as the insertion position of the processing target in step S2202, to execute insertion processing.

In the example shown in FIG. 31A and FIG. 31B, at step S2201 of FIG. 22, the array element number 220*a*+1 of the split/conjoin node 220*a*+1 is set into the insertion node setting area, and at step S2202, the array element number 221*f* of the conjoining position 221*f* is set into the insertion position setting area. Next, at step S2203, the empty node pair 201*k* is obtained, the coupled node indicator 220*k* thereof being set as the array element number of the node [0] at step S2204.

Then, at step S2205, the contents of the array element pointed to by the array element number 220*a*+1 that is set into the insertion node setting area, that is, the contents of the split/conjoin node 221*b*, are read out and are stored into the array element pointed to by the array element number 220*k* set as the array element number of the node [0], that is, into the node 210*k*.

Additionally, at step S2206, 220*k*+1, which is the value obtained by adding 1 to the coupled node indicator 220*k*, is set as the array element number of the node [1]. Then, at step S2207, the array element pointed to by the array element number 221*f* set as the insertion position, that is, the contents of the node 210*h*, are read out and stored into the array element pointed to by the array element number 220*k*+1 set as the array element number of the node [1], that is, into node 221*k*.

Finally, at step S2208, into the array element pointed to by the array element number 221*f* set as the insertion position, that is, into the node 210*h* position, 0 is set as the node type, the difference bit position 4 determined at step S2601 of FIG. 26 is set into the discrimination bit position, and the array element number 220*k* set as the array element number of the node [0] is set as the coupled node indicator, so as to generate a new branch node, thereby obtaining the processing target structure after the conjoining, as shown at (b) in FIG. 31B.

Next, returning to the description of the tree conjoining processing in accordance with FIG. 26, at step S2605, the split/conjoin node is deleted from the processing source. This processing is implemented by executing the deletion processing described with reference to FIG. 23, reading the split node as the split/conjoin node.

Next, proceeding to step S2606, a determination is made as to whether or not the processing source is registered. If it is registered, return is made to step S2601 and processing is repeated. However, if it is not registered, because conjoining processing is complete, processing is ended.

Next, conjoining processing in this embodiment is described in detail below, with references made to FIG. 27 to FIG. 29.

Figure 27:
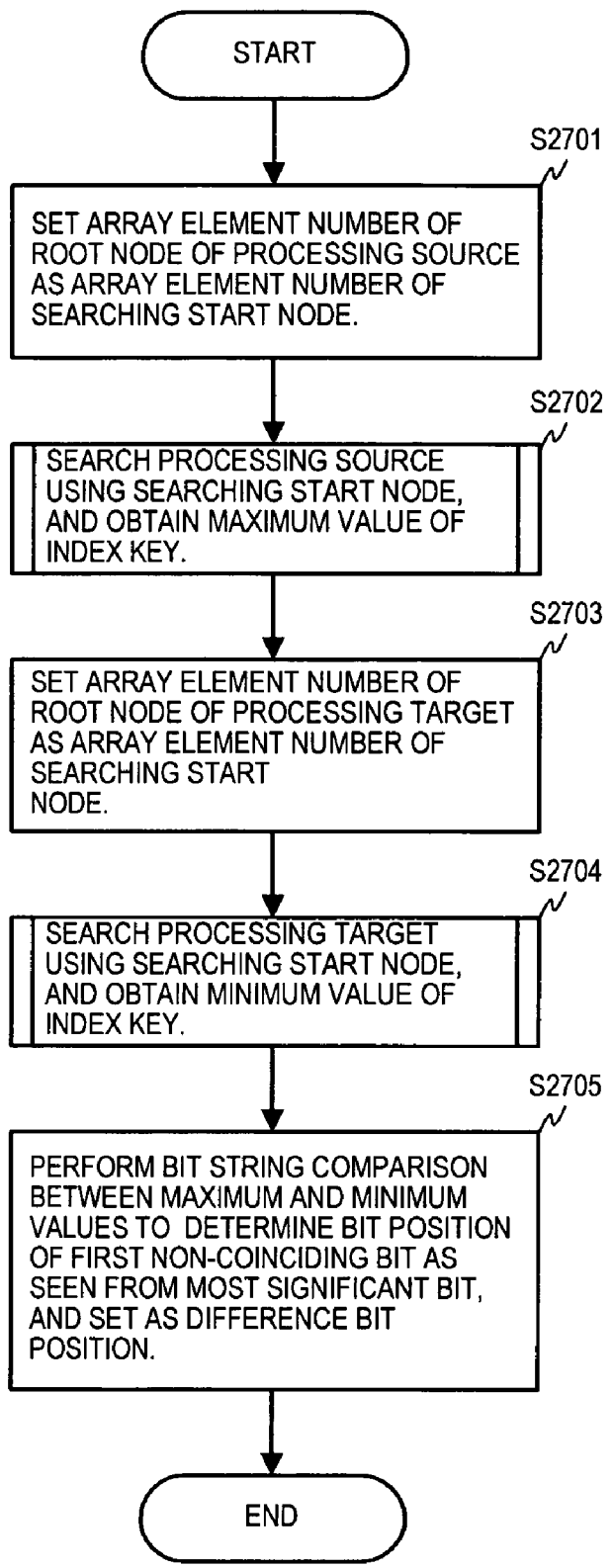
FIG. 27 is a flowchart describing the processing flow for determining the difference bit position in the conjoining processing.

FIG. 27 is a drawing describing the detailed processing flow in the processing for determining the difference bit position at step S2601 shown in FIG. 26. First, at step S2701, the array element number of the root node of the processing source is set as the array element number of the searching start node. Next, at step S2702, the maximum index key value of the processing source is determined by the search processing shown in FIG. 6.

Next, proceeding to step S2703, the array element number of the root node of the processing target is set as the array element number of the searching start node. Next, at step S2704, the minimum index key value of the processing target is determined by the search processing shown in FIG. 5.

Next, at step S2705, a bit string comparison is performed between the maximum value determined at step S2702 and the minimum value determined at step S2704, and the first non-coinciding bit as seen from the most significant 0th bit is determined and set as the difference bit position, at which point the processing is ended.

As noted above, in the example shown in FIG. 31A, the difference bit position 4 between the maximum value "101001" of the processing source and the minimum value "101011" of the processing target is determined. In both the processing source and the processing target, there is no branch node having a discrimination bit position that is equal to this difference bit position.

The reason for this is that, because the minimum value of the processing target is larger than the maximum value of the processing source, the bit value of the difference bit position of the maximum value of the processing source is 0, and if there were to be a branch node in the processing source that has a discrimination bit position equal to the difference bit position, the maximum value of the processing source would be a node [0], this being inconsistent with it being the maximum value. The same applies to the processing target.

Next, the processing for determining the split/conjoin node of the processing source will be described. The split/conjoin node, except for the case in which the processing source is a root node only, is the highest positioned branch node, of the branch nodes traverse in the maximum value search, having a discrimination bit position that is lower in order than the difference bit position determined in step S2601.

If the subtree of the processing source having the split/conjoin node as its root node is named as the split/conjoin node tree, the conjoining processing of this embodiment is processing that performing conjoining in units of split/conjoin node trees.

Figure 28:
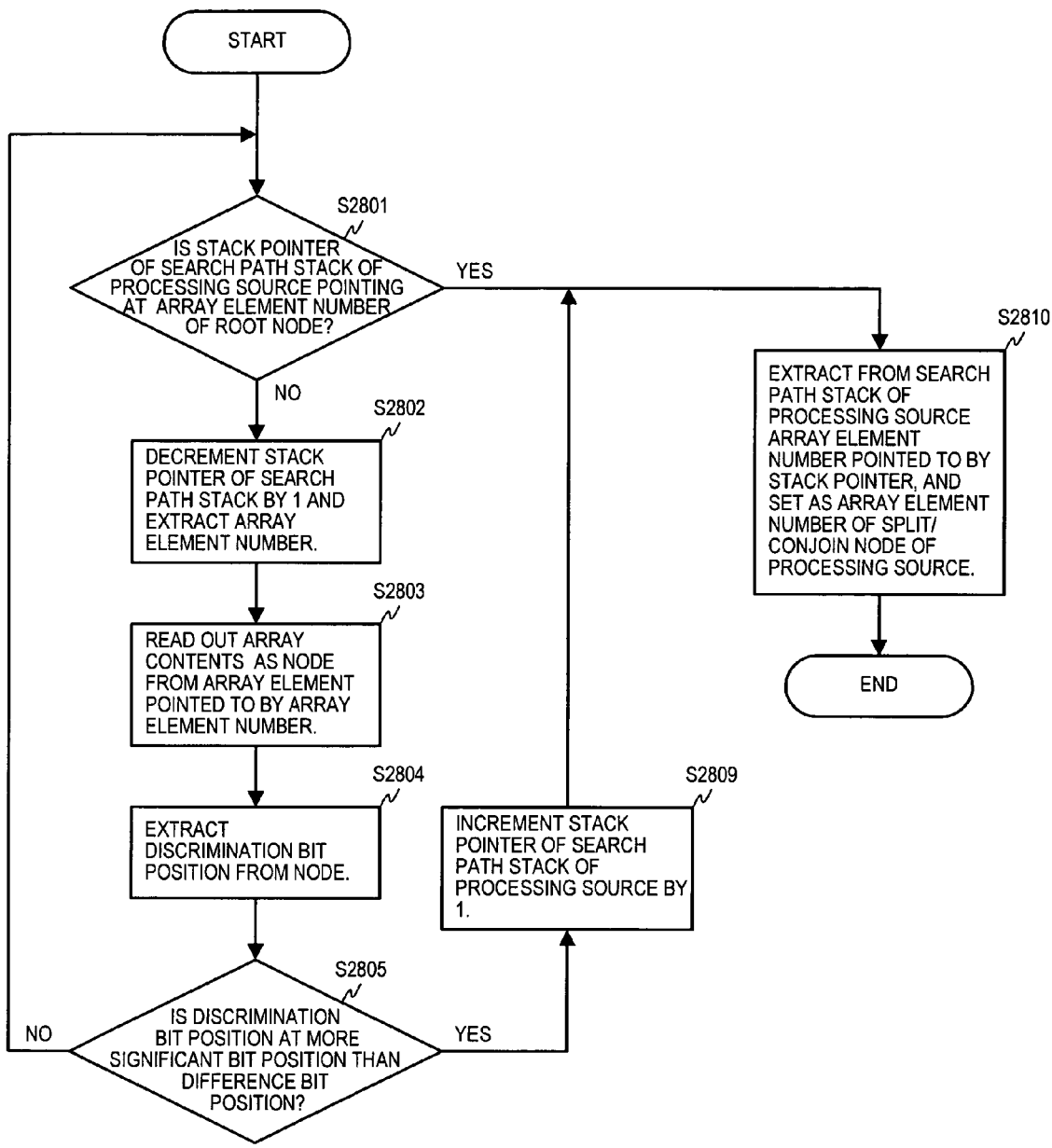
FIG. 28 is a flowchart describing the processing flow for determining the split/conjoin node of the processing source.

FIG. 28 is drawing describing the processing flow for determining split/conjoin node of the processing source at step S2602 shown in FIG. 26. At the start of the processing for determining the split/conjoin node, as a result of the search for the maximum value in step S2601 shown in FIG. 26, the stack pointer of the search path stack of the processing source points to the array element number of a leaf node into which the maximum index key is stored.

At step S2801, a determination is made as to whether or not the stack pointer of the search path stack of the processing source points to the array element number of the root node. If the stack pointer of the search path stack of the processing source is pointing to the array element number of the root node, processing proceeds to step S2810. If the stack pointer of the search path stack of the processing source does not point to the array element number of the root node, however, processing proceeds to step S2802.

At step S2802, the stack pointer of the search path stack is decremented by 1, the array element number pointed to by the stack pointer is extracted, and processing proceeds to step S2803.

At step S2803, the contents of the array element pointed to by the array element number extracted at step S2802 are extracted as a node and, at step S2804, the discrimination bit position of the extracted node is obtained.

Next, at step S2805, a determination is made as to whether or not the discrimination bit position obtained at step S2804 is higher in order than the difference bit position. If the position is of lower order, return is made to step S2801. If the position is of higher order, processing proceeds to step S2809. As noted above, the above-described discrimination bit position would not be equal to the difference bit position.

At step S2809, the stack pointer of the search path stack of the processing source is incremented by 1, and processing proceeds to step S2810.

At step S2810, the array element number pointed to by the stack pointer is extracted from the search path stack of the processing source, and is set as the array element number of the split/conjoin node, at which the processing is ended. In the description to follow, the array element number set at this step is sometimes referred to simply as the split/conjoin node array element number.

The above-noted processing is described below, with references made to FIG. 31A and FIG. 31B.

In the example shown in FIG. 31A, when backtracking is done along the search path from the node 211g, into which the maximum key value is stored, because the stack pointer at first points to the array element number 221b of the node 211g, the determination made at step S2801 is "no," and processing is repeated from step S2801, and because the difference bit position is 4, the processing at step S2802 reaches the root node 210a. Because the discrimination bit position of the root node 210a is 0, which is higher in order than the difference bit position, the determination processing at step S2805 results in branching to step S2809, and the processing of step S2809 causes an advance of one step along the search path, thereby determining the split/conjoin node 220a+1.

In the example shown in FIG. 31B, when backtracking is done along the search path from node 211d, into which the maximum key value is stored, because the difference bit position is 0, the processing of step S2802 reaches the root node 210a. Because the discrimination bit position of the root node 210a is 1, which is lower in order than the difference bit position, the determination processing at step S2805 results in branching to step S2801, at which the determination of the node being a root node is made, branching being done to step S2810, at which the root node 210a is determined as the split/conjoin node.

Next, the processing for determining the conjoining position of the processing target will be described. Because the leaf node into which the maximum value of the index key of the processing source is stored is inserted into the processing target after the conjoining processing, there exists a new branch node that has a discrimination bit position that is equal in value to the difference bit position. That is, a branch node having a discrimination bit position with a value that is equal to difference bit position is inserted into the path traversed in the minimum value search, this insertion position being the conjoining position of the processing target.

In a coupled node tree, because the discrimination bit position of a lower-order branch node is of lower order than the discrimination bit position of a higher-order branch node, the position of a child node of a branch node having a discrimination bit position that is immediately above the difference bit position or, in an exceptional case that there is not a branch node having an upper-order discrimination bit position, the root node is the conjoining position.

On the node [1] side of a child node pair of a branch node inserted at the conjoining position, a leaf node exists into which is stored the minimum value of the index key of the processing target before conjoining, and the node [0] is the split/conjoin node.

Figure 29:
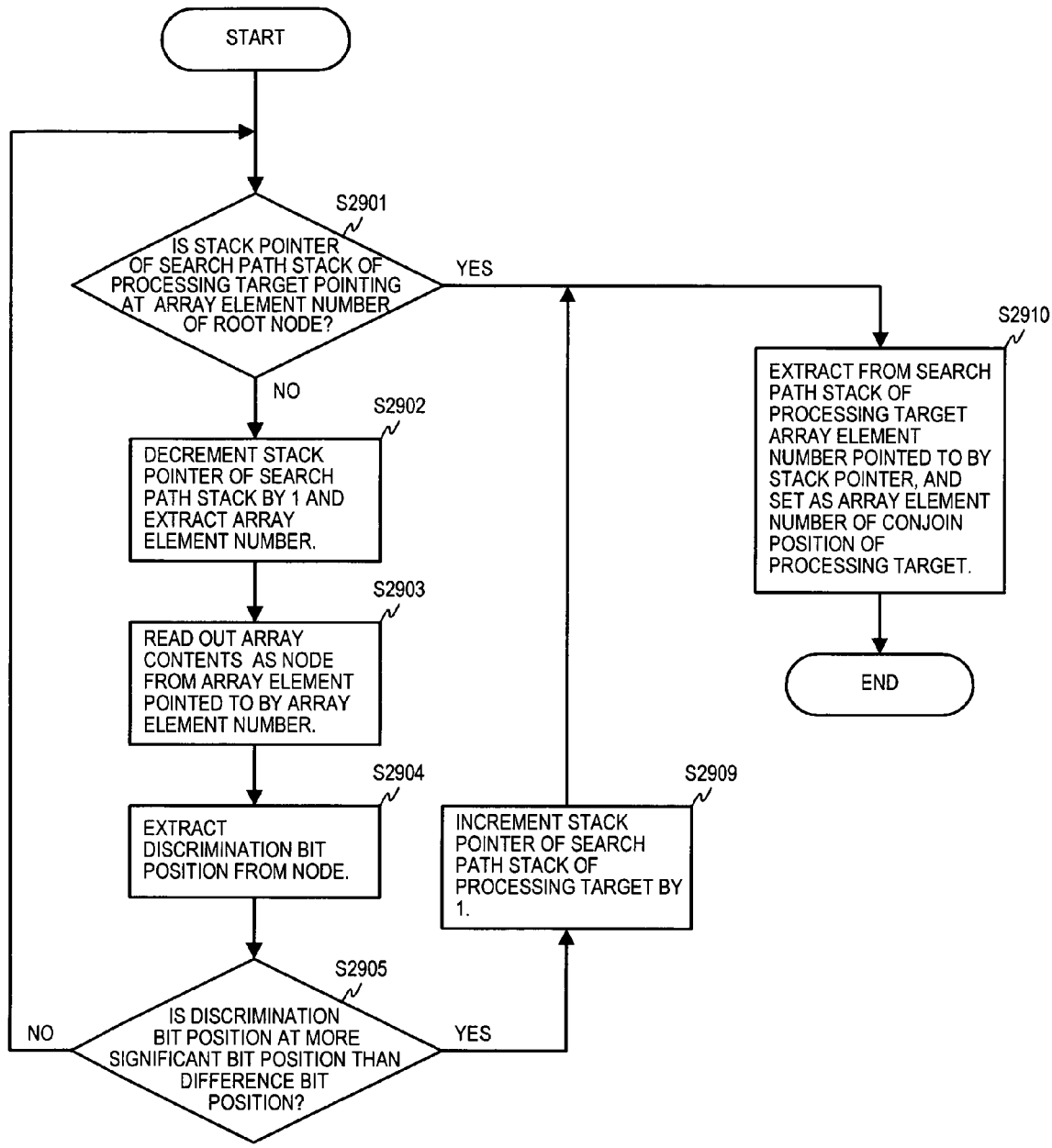
FIG. 29 is a flowchart describing the processing flow for determining the conjoining position of the processing target.

FIG. 29 is a drawing describing the processing flow for determining the conjoining position of the above-noted processing target. As shown in FIG. 29, the flow of processing for determining the conjoining position of the processing target has the same structure as the processing flow for determining the split/conjoin node of the processing source shown in FIG. 28. The only difference is that the processing flow of FIG. 29 is with regard to the processing target, and what is determined is the conjoining position. Also, when the processing to determine the conjoining position of the processing target is started, the stack pointer of the search path stack of the processing target, as a result of the minimum value search in step S2601 shown in FIG. 26, points to the array element number of the leaf node in which the maximum key value is stored.

At step S2901, a determination is made as to whether or not the stack pointer of the search path stack of the processing target points to the array element number of the root node. If the stack pointer of the search path stack of the processing target is pointing to the array element number of the root node, processing proceeds to step S2910. If the stack pointer of the search path stack of the processing target does not point to the array element number of the root node, however, processing proceeds to step S2902.

At step S2902, the stack pointer of the search path stack is decremented by 1, the array element number is extracted, and processing proceeds to step S2903.

At step S2903, the contents of the array element pointed to by the array element number extracted at step S2902 are extracted as a node and, at step S2904, the discrimination bit position of the extracted node is obtained.

Next, at step S2905, a determination is made as to whether or not the discrimination bit position obtained at step S2904 is higher in order than the difference bit position. If the position is of lower order, return is made to step S2901. If the position is of higher order, processing proceeds to step S2909. As noted above, the above-described discrimination bit position would not be equal to the difference bit position.

At step S2909, the stack pointer of the search path stack of the processing target is incremented by 1, and processing proceeds to step S2910.

At step S2910, the array element number pointed to by the stack pointer is extracted from the search path stack of the processing target, and is set as the array element number of the conjoining position of the processing target, and then the processing is ended. In the description to follow, the array element number set at this step is sometimes referred to simply as the conjoining position array element number.

The above-noted processing is described below, with references made to FIG. 31A and FIG. 31B.

In the example shown in FIG. 31A, when backtracking is done along the search path from the node 210*h*, into which the minimum key value is stored, because the difference bit position is 4 and the discrimination bit position of the root node 210*f* extracted at step S2904 is 3, at step S2905 there is branching to step S2909, and the processing of step S2909 causes an advance of one step along the search path, thereby determining the array element number 221*f* of the conjoining position.

In the example shown in FIG. 31B, when backtracking is done along the search path from node 210*g*, into which the minimum key value is stored, because the difference bit position is 0, the root node 210*f* is reached, and at step S2901, the determination is made that this is the root node, and branching is done to step S2910, the array element number 221 of the root node 210*f* being determined as the array element number of the next conjoining position.

The foregoing is a description of the details of the processing for conjoining a coupled node tree in the third embodiment, according to which conjoining processing is performed in units of split/conjoin node trees. That is, a split/conjoin node is separated from the processing source, the paired node of the split/conjoin node is copied into the parent node, so that the split/conjoin node tree is deleted from the processing source, the split/conjoin node being conjoined to the processing target, thereby completing the conjoining of the split/conjoin node tree.

Therefore, as long as the same array is used, processing with regard to nodes other than the split/conjoin nodes is unnecessary, resulting in a yet smaller number of executed processing steps than in the case of the second embodiment.

Although the foregoing is a detailed description of a preferred mode of embodying the present invention, the embodiments of the present invention are not limited in this manner, and it will be clear to a person skilled in the art that a variety of modifications thereof are possible.

It is clear that the splitting/coupling processing for a coupled node tree according to the above-described embodiments and equivalents thereto can be implemented by a program that a computer is caused to execute, which performs the coupled node tree splitting method and conjoining method of the present invention.

Therefore, the above-noted programs, and a computer-readable storage medium into which the programs are stored are encompassed by the embodiments of the present invention.

What is claimed is:

1. A coupled node tree splitting method, which is executed by a computer, for splitting a coupled node tree being used in a bit string search and having a root node as a starting point of the tree and node pairs which are configurational elements of the tree and which are two nodes, a primary node and a secondary node, arranged in adjacent areas of storage,
wherein
the nodes have an area that holds a node type, which indicates whether the node is a branch node or a leaf node, and
the branch node having, in addition to the node type, an area that holds a discrimination bit position of a search key with which a bit string search is performed and an area holding position information that indicates a position of a primary node of a node pair that is a link target, but not having an area holding an index key composed of a bit string that is an object of searches, and
the leaf node having, in addition to the node type, an area holding the index key composed of a bit string that is the object of searches but not having an area that holds a discrimination bit position of the search key nor an area holding the position information that indicates the position of a primary node of a node pair that is a link target,
the method comprising:
a step of obtaining a split key that establishes an index key that splits a processing source coupled node tree that is to be split;
a processing source minimum value or maximum value obtaining step that determines a minimum value or a maximum value of the index keys of the processing source coupled node tree, by performing sub-steps of
a search-start-node read-out sub-step obtaining position information indicating a position of the root node of the processing source coupled node tree as a searching start node and reading out the searching start node by means of the position information indicating the position of the searching start node,
a node type determination sub-step reading out the node type from the area that holds the node type of the node and determining whether the node type indicates a leaf node or a branch node,
an index key read-out sub-step reading out the index key from the area in the leaf node holding the index key,
a link sub-step reading out the position information indicating the position of a primary node of a node pair that is a link target from the area holding the position information indicating the position of the primary node of a node pair that is a link target, and reading out as a link target node only the primary nodes stored in the area indicated by the position information indicating the primary node of the node pair of the link target that is read out, or reading out as the link target node only the secondary nodes stored in the area the position whereof obtained by a calculation based on the position information indicating the primary node of the node pair of the link target that is read out, and wherein making, by the node type determination sub-step, a determination of the node type of the searching start node read out by the search-start-node read-out sub-step, and if the node type indicates a leaf node, reading out, by the index key read-out sub-step, the index key from the leaf node, and if the node type indicates a branch node, processes of reading out reading out the link target node by the link sub-step and the determination of the node type, by the node type determination sub-step, of the link target node read out are repeated, until the node type indicates a leaf node, and reading out, by the index key read-out sub-step, the index key from the leaf node, and obtaining an index key stored in the leaf node read out in the index key read out sub-step as a search result key, which is a minimum or maximum value of the index keys of the processing source coupled node tree;

a comparing step of comparing the split key with either the minimum value or the maximum value and, if the minimum value is larger than the split key or if the maximum value is smaller than the split key, ending processing;

a generating step of, if the result of the comparison is that the minimum value is not larger than the split key or the maximum value is not smaller than the split key, inserting the minimum value or maximum value index key, so as to generate a new processing target coupled node tree;

a deleting step of deleting the minimum value or maximum value index key from the processing source coupled node tree; and wherein by making the processing source coupled node tree from which has been deleted the minimum value or maximum value index key into a new processing source coupled node tree, the processing source minimum value or maximum value obtaining step, the comparing step, the generating step, and the deleting step are repeated until the minimum value or maximum value obtained by the processing source minimum value or maximum value obtaining step becomes larger than or smaller than the split key respectively.

2. The coupled node tree splitting method according to claim 1, wherein the coupled node tree is stored in an array, and the position information is an array element number of an array element of the array in which a node corresponding to the position information is stored, the array element number of the array element in which the searching start node is stored and the array element numbers of the array elements in which is stored the link target from the searching start node up until the leaf node are successively held in a stack, wherein the generating step includes a step that sets the minimum value or maximum value determined by the processing source minimum value or maximum value obtaining step as the insertion key of the processing target coupled node tree, executes a processing target maximum value or minimum value obtaining step that obtains the maximum value or the minimum value of the index keys of the processing target coupled node tree, performs a bit string comparison between the insertion key and the maximum value or the minimum value of the index keys to determine a highest order bit position at which a bit value differs, establishes, from the relative position relationship between the highest order bit position and a discrimination bit position of the branch node of the array element number stored in the stack, a processing target parent node that is the insertion position of a node pair that includes the leaf node that holds the insertion key, and stores the array element number of the array element into which is stored the primary node of a node pair that includes the leaf node holding the insertion key into the position information of the processing target parent node.

3. The coupled node tree splitting method according to claim 2, wherein the generating step includes a further step for setting the processing target parent node as an inserted node into which the leaf node including the insertion key is inserted, and wherein the processing target maximum value or minimum value obtaining step obtains the maximum value or the minimum value of the index keys of the processing target coupled node tree with the inserted node as the searching start node.

4. The coupled node tree splitting method according to claim 3, wherein the deleting step includes a step that sets as a deletion node of the processing source coupled node tree the leaf node that includes the minimum value or the maximum value determined by the processing source minimum value or maximum value obtaining step as the index key, stores the contents of the node forming the same node pair with the deletion node into the branch node of the link source of that node pair, and deletes the node pair.

5. A computer-readable storage medium storing the program according to claim 1.

6. A coupled node tree conjoining method, which is executed by a computer, for conjoining two coupled node trees each of which is used in a bit string search and having a root node as a starting point of the tree and node pairs which are configurational elements of the tree and which are two nodes, a primary node and secondary node, arranged in adjacent areas of storage, wherein the nodes have an area that holds a node type, which indicates whether the node is a branch node or a leaf node, and the branch node having, in addition to the node type, an area that holds a discrimination bit position of a search key with which a bit string search is performed and an area holding information that indicates a position of a primary node of a node pair that is a link target, but not having an area holding an index key composed of a bit string that is an object of searches, and the leaf node having, in addition to the node type, an area holding the index key composed of a bit string that is the object of searches but not having an area that holds a discrimination bit position of the search key nor an area holding information that indicates the position of a primary node of a node pair that is a link target, the method comprising:

a processing source minimum value or maximum value obtaining step that determines a minimum value or a maximum value of the index keys of a processing source coupled node tree, that is, one of two coupled node trees, by performing sub-steps of a search-start-node read-out sub-step obtaining information indicating a position of the root node of the processing source coupled node tree as a searching start node and reading out the searching start node by means of the information indicating the position of the searching start node, a node type determination sub-step reading out the node type from the area that holds the node type of the node and determining whether the node type indicates a leaf node or a branch node, an index key read-out sub-step reading out the index key from the area in the leaf node holding the index key, a link sub-step reading out the information indicating the position of a primary node of a node pair that is a link target from the area in the branch node holding the information indicating the position of the primary node of a node pair that is a link target, and reading out as a link target node only the primary nodes stored in the area indicated by the position information indicating the primary node of the node pair of the link target that is read out, or reading out as the link target node only the secondary nodes stored in the area the position whereof obtained by a calculation based on the position information indicating the primary node of the node pair of the link target that is read out, and wherein making, by the node type determination sub-step, a determination of the node type of the searching start node read out by the search-start-node read-out sub-step, and if the node type indicates a leaf node, reading out, by the index key read-out sub-step, the index key from the leaf node, and if the node type indicates a branch node, processes of reading out the link target node by the link sub-step and the determination of the node type, by the node type determination sub-step, of the link target node read out are repeated, until the node type indicates a leaf node, and reading out, by the index key read-out sub-step, the index key from the leaf node, and obtaining an index key stored in the leaf node read out in the index key read out sub-step as a search result key, which is the minimum or maximum value of the index keys of the processing source coupled node tree;

an inserting step that inserts the minimum value or the maximum value into a processing target coupled node tree, that is, the other coupled node tree of the two coupled node trees;

a deleting step that deletes the minimum value or the maximum value from the processing source coupled node tree; and wherein by making the processing source coupled node tree from which has been deleted the minimum value or maximum value index key into a new processing source coupled node tree, the processing source minimum value or maximum value obtaining step, the inserting step, and the deleting step are repeated until the processing source coupled node tree is completely deleted.

7. The coupled node tree conjoining method according to claim 6, wherein the two coupled node tree is are stored in an array or two, and the position information is an array element number of an array element of the array in which a node corresponding to the position information is stored, and the array element number of an array element in which the searching start node is stored and the array element numbers of the array elements in which is stored the link target from the searching start node up until the leaf node are successively stored in a stack, and the inserting step includes a step that sets the minimum value or the maximum value as the insertion key of the processing target coupled node tree, executes a processing target maximum value or minimum value obtaining step that obtains a maximum value or a minimum value of the index keys of the processing target coupled node tree, performs a bit string comparison between the insertion key and the maximum value or the minimum value of the index keys of the processing target coupled node tree and determines a highest order bit position at which a bit value differs, establishes a parent node, which is an insertion point of a node that includes a leaf node holding the insertion key, from the relative positional relationship between the highest order bit position and the discrimination bit position of the branch node of the array element number stored in the stack, and stores the array element number of the array element into which is stored the primary node of a node pair that includes the leaf node holding the insertion key into the position information of the parent node.

8. The coupled node tree conjoining method according to claim 7, wherein the deleting step includes a step that sets the leaf node that includes the minimum value or the maximum value obtained by the processing source minimum value or maximum value obtaining step as a deletion node of the processing source coupled node tree, and stores the contents of the node forming the same pair with the deletion node into the branch node of a link source of that node pair, and deletes the node pair.

9. A computer-readable storage medium storing the program according to claim 6.

10. A coupled node tree splitting method, which is executed by a computer, for splitting a coupled node tree being used in a bit string search and having a root node as a starting point of the tree and node pairs which are configurational elements of the tree and which are two nodes, a primary node and secondary node, arranged in adjacent areas of storage, wherein the nodes have an area that holds a node type, which indicates whether the node is a branch node or a leaf node, and the branch node having, in addition to the node type, an area that holds a discrimination bit position of a search key with which a bit string search is performed and an area holding position information that indicates a position of a primary node of a node pair that is a link target, but not having an area holding an index key composed of a bit string that is an object of searches, and the leaf node having, in addition to the node type, an area holding the index key composed of a bit string that is the object of searches but not having an area that holds a discrimination bit position of the search key nor an area holding the position information that indicates the position of a primary node of a node pair that is a link target, the method comprising:

a step of obtaining a split key that establishes an index key that splits a processing source coupled node tree that is to be split;

a search step that obtains the split key as a search result key using the split key as a search key and the root node of the processing source coupled node tree as a search start node, through performing sub-steps of a search-start-node read-out sub-step obtaining position information indicating a position of the root node of the processing source coupled node tree as a searching start node and reading out the searching start node by means of the position information indicating the position of the searching start node, a node type determination sub-step reading out the node type from the area that holds the node type of the node and determining whether the node type indicates a leaf node or a branch node, an index key read-out sub-step reading out the index key from the area in the leaf node holding the index key, a link sub-step reading out the discrimination bit position and the information indicating the position of one node of a node pair that is a link target from the area in the branch node holding the discrimination bit position and from the area holding the information indicating the position of one node of a node pair that is a link target respectively, and obtaining information indicating a node position by a calculation with a bit value in the search key for the discrimination bit position read out and the information indicating the position of one node of a node pair that is a link target, and reading out a node at the node position indicated by the obtained information as a link target node, and wherein the node type determination sub-step makes a determination of the node type of the root node read out by the root node read-out sub-step, and if the node type indicates a leaf node, the index key read-out sub-step reads out the index key from the leaf node, and if the node type indicates a branch node, reading out the link target node by the link sub-step and the determination of the node type, by the node type determination sub-step, of the link target node read out are repeated, until the node type indicates a leaf node, and the index key read-out sub-step reads out the index key from the leaf node as the search result key while position information for the area in which the search start node is positioned and the position information for the areas in which the link target nodes from the link start node to the leaf node are all successively stored in a stack;

a split node obtaining step that reads out the position information from the stack until the position information of the primary node or secondary node is obtained, then obtains, as a split node, the primary node or secondary node whose position information has been read out;

a generating step that generates a new processing target coupled node tree by inserting a split node tree that is a subtree having the split node as the root node; and a deleting step that deletes the split node tree from the processing source coupled node tree.

11. The coupled node tree splitting method according to claim 10, wherein the coupled node tree is stored in an array and the position information is an array element number of an array element of the area in which the node corresponding to the position information is stored, and the array element number of the array element in which the searching start node is stored and the array element numbers of the array elements in which the link target from the searching start node up until the leaf node is stored are successively stored in the stack.

12. The coupled node tree splitting method according to claim 11, further comprising a next split node obtaining step that successively reads out array element numbers stored before the array element number of the array element in which the split node is stored until reaching the array element number of the array element in which a secondary node is stored or until reaching the array element number of the array element in which a primary node is stored, and obtains, as a next split node, a primary node paired with the secondary node which is stored in the array element whose array element number is read out or a secondary node paired with the primary node which is stored in the array element whose array element number is read out, and wherein the generating step and deleting step are executed using the next split node as the split node.

13. A computer-readable storage medium storing the program according to claim 10.

14. A coupled node tree conjoining method, which is executed by a computer, for conjoining two coupled node trees each of which is used in a bit string search and having a root node as a starting point of the tree and node pairs which are configurational elements of the tree and which are two nodes, a primary node and a secondary node, arranged in adjacent areas of storage, wherein the nodes have an area that holds a node type, which indicates whether the node is a branch node or a leaf node, and the branch node having, in addition to the node type, an area that holds a discrimination bit position of a search key with which a bit string search is performed and an area holding information that indicates a position of a primary node of a node pair that is a link target, but not having an area holding an index key composed of a bit string that is an object of searches, and the leaf node having, in addition to the node type, an area holding the index key composed of a bit string that is the object of searches but not having an area that holds a discrimination bit position of the search key nor an area holding information that indicates the position of a primary node of a node pair that is a link target, the method comprising:

a processing source maximum value or minimum value obtaining step that determines a maximum value or a minimum value of the index keys of a processing source coupled node tree, that is, one of two coupled node trees, by performing sub-steps of a search-start-node read-out sub-step obtaining information indicating a position of the root node of the processing source coupled node tree as a searching start node and reading out the searching start node by means of the information indicating the position of the searching start node, a node type determination sub-step reading out the node type from the area that holds the node type of the node and determining whether the node type indicates a leaf node or a branch node, an index key read-out sub-step reading out the index key from the area in the leaf node holding the index key, a link sub-step reading out the information indicating the position of a primary node of a node pair that is a link target from the area in the branch node holding the information indicating the position of the primary node of a node pair that is a link target, and reading out as a link target node only the secondary nodes stored in the area the position whereof obtained by a calculation based on the position information indicating the primary node of the node pair of the link target that is read out, or reading out as the link target node only the primary nodes stored in the area indicated by the position information indicating the primary node of the node pair of the link target that is read out, and wherein
making, by the node type determination sub-step, a determination of the node type of the searching start node read out by the search-start-node read-out sub-step, and if the node type indicates a leaf node,
reading out, by the index key read-out sub-step, the index key from the leaf node, and if the node type indicates a branch node, processes of
reading out the link target node by the link sub-step and the determination of the node type, by the node type determination sub-step, of the link target node read out are repeated, until the node type indicates a leaf node, and reading out, by the index key read-out sub-step, the index key from the leaf node, and obtaining an index key stored in the leaf node read out in the index key read out sub-step as a search result key, which is the maximum or minimum value of the index keys of the processing source coupled node tree;

a processing target minimum value or maximum value obtaining step that determines a minimum value or a maximum value of the index keys of a processing target coupled node tree, that is, another of two coupled node trees, by performing sub-steps of a search-start-node read-out sub-step obtaining information indicating a position of the root node of the processing source coupled node tree as a searching start node and reading out the searching start node by means of the information indicating the position of the searching start node, a node type determination sub-step reading out the node type from the area that holds the node type of the node and determining whether the node type indicates a leaf node or a branch node, an index key read-out sub-step reading out the index key from the area in the leaf node holding the index key, a link sub-step reading out the information indicating the position of a primary node of a node pair that is a link target from the area in the branch node holding the information indicating the position of the primary node of a node pair that is a link target, and reading out as a link target node only the primary nodes stored in the area indicated by the position information indicating the primary node of the node pair of the link target that is read out, or reading out as the link target node only the secondary nodes stored in the area the position whereof obtained by a calculation based on the position information indicating the primary node of the node pair of the link target that is read out, and wherein
making, by the node type determination sub-step, a determination of the node type of the searching start node read out by the search-start-node read-out sub-step, and if the node type indicates a leaf node,
reading out, by the index key read-out sub-step, the index key from the leaf node, and if the node type indicates a branch node, processes of
reading out the link target node by the link sub-step and the determination of the node type, by the node type determination sub-step, of the link target node read out are repeated, until the node type indicates a leaf node, and reading out, by the index key read-out sub-step, the index key from the leaf node, and obtaining an index key stored in the leaf node read out in the index key read out sub-step as a search result key, which is the minimum or maximum value of the index keys of the processing source coupled node tree;

a difference bit position obtaining step that determines a difference bit position between the maximum value of the index keys of the processing source coupled node tree determined by the processing source maximum value or minimum value obtaining step and the minimum value of the index keys of the processing target coupled node tree determined by the processing target minimum value or maximum value obtaining step or between the minimum value of the index keys of the processing source coupled node tree determined by the processing source maximum value or minimum value obtaining step and the maximum value of the index keys of the processing target coupled node tree determined by the processing target minimum value or maximum value obtaining step;

a split/conjoin node obtaining step that determines a split/conjoin node, which is the root node of a subtree that is to be split from the processing source coupled node tree and conjoined to the processing target coupled node tree, based on the difference bit position obtained by the difference bit position obtaining step;

a conjoining position obtaining step that determines a processing target conjoining position for conjoining the split/conjoin node determined by the split/conjoin node obtaining step, based on the difference bit position determined by the difference bit position obtaining step;

an inserting step that inserts the split/conjoin node determined by the split/conjoin node obtaining step at the processing target conjoining position determined by the conjoining position obtaining step;

a deleting step that deletes the split/conjoin node determined by the split/conjoin node obtaining step from the processing source coupled node tree; and wherein by making the processing source coupled node tree from which has been deleted the split/conjoin node into a new processing source coupled node tree,
the processing source maximum value or minimum value obtaining step,
the processing target minimum value or maximum value obtaining step,
the difference bit position obtaining step,
the split/conjoin node obtaining step, the conjoining position obtaining step,
the inserting step, and
the deleting step
are repeated until the processing source coupled node tree is completely deleted.

15. The coupled node tree conjoining method according to claim 14, wherein
the processing source and the processing target coupled node tree are stored in an array, and the position information is an array element number of an array element in which a node corresponding to the position information is stored, and
the array element number of the array element in which the searching start node at the processing source maximum value or minimum value obtaining step and the processing target minimum value or maximum value obtaining step are stored and the array element numbers of the array elements in which the link target from the searching start node up until the leaf node at the processing source maximum value or minimum value obtaining step and the processing target minimum value or maximum value obtaining step are stored are successively stored respectively in a processing source stack and a processing target stack.

16. The coupled node tree conjoining method according to claim 15, wherein
the split/conjoin node obtaining step reads out from the array element number stored one position before the array element number of the array element stored in the processing source stack until the discrimination bit position of the branch node stored in the array element of the array element number is higher position than the difference bit position, and obtains a node stored in the array element having the array element number stored in the processing source stack next to the read-out array element number as the split/conjoin node, and
the conjoining position obtaining step reads out from the array element number stored one position before the array element number of the array element stored in the processing target stack until the discrimination bit position of the branch node stored in the array element of the array element number is higher position than the difference bit position, and obtains a node stored in the array element having the array element number stored in the processing target stack next to the read-out array element number as the conjoining position.

17. A computer-readable storage medium storing the program according to claim 14.

* * * * *